United States Patent
Su et al.

(10) Patent No.: US 12,349,062 B2
(45) Date of Patent: Jul. 1, 2025

(54) REFERENCE SIGNAL SENDING METHOD, REFERENCE SIGNAL RECEIVING METHOD, DEVICE, AND SYSTEM

(71) Applicant: HUAWEI TECHNOLOGIES CO., LTD., Guangdong (CN)

(72) Inventors: Yuwan Su, Shenzhen (CN); Xiaolei Tie, Shanghai (CN); Zhihu Luo, Beijing (CN); Xiang Mi, Beijing (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 610 days.

(21) Appl. No.: 17/186,790

(22) Filed: Feb. 26, 2021

(65) Prior Publication Data
US 2021/0195518 A1    Jun. 24, 2021

Related U.S. Application Data

(63) Continuation of application No. PCT/CN2018/115759, filed on Nov. 15, 2018.

(30) Foreign Application Priority Data

Aug. 31, 2018  (WO) ............... PCT/CN2018/103666

(51) Int. Cl.
*G08C 17/00*    (2006.01)
*H04L 5/00*    (2006.01)
(Continued)

(52) U.S. Cl.
CPC ....... *H04W 52/0212* (2013.01); *H04L 5/0048* (2013.01); *H04W 72/044* (2013.01); *H04W 72/23* (2023.01); *H04W 76/28* (2018.02)

(58) Field of Classification Search
CPC .......... H04W 52/0212; H04W 72/044; H04W 72/23; H04W 76/28; H04W 68/025;
(Continued)

(56) References Cited

U.S. PATENT DOCUMENTS

| | | | | |
|---|---|---|---|---|
| 7,567,545 B2* | 7/2009 | Cho | ........................ | H04L 5/026 370/344 |
| 8,837,313 B2* | 9/2014 | Adachi | ............. | H04W 52/0238 370/252 |

(Continued)

FOREIGN PATENT DOCUMENTS

| | | |
|---|---|---|
| CN | 103493411 A | 1/2014 |
| CN | 103945497 A | 7/2014 |

(Continued)

OTHER PUBLICATIONS

LG Electronics, "Discussion on NRS on an a non-anchor carrier," 3GPP TSG RAN WG1 Meeting #94, R1-1808479, Gothenburg, Sweden, Aug. 20-24, 2018, 2 pages.
(Continued)

*Primary Examiner* — Amancio Gonzalez
(74) *Attorney, Agent, or Firm* — Fish & Richardson P.C.

(57) ABSTRACT

Example reference signal sending methods and apparatus are described. In one example method, a terminal device detects whether a paging scheduling message exists in a PDCCH search space whose starting subframe is a subframe corresponding to a paging occasion (PO), and/or detects whether a wake-up signal (WUS) exists before a PO. A network device determines a time domain resource in first duration based on a quantity of paging occasions in a discontinuous reception period, where the time domain resource is a time domain resource in a time-frequency
(Continued)

US 12,349,062 B2

Page 2 resource used to transmit a reference signal. The network device sends the reference signal to a terminal device on the time domain resource.

20 Claims, 19 Drawing Sheets

(51) Int. Cl.
  *H04W 52/02* (2009.01)
  *H04W 72/044* (2023.01)
  *H04W 72/23* (2023.01)
  *H04W 76/28* (2018.01)
(58) Field of Classification Search
  CPC ............ H04W 52/0216; H04L 5/0048; H04L 5/0094; Y02D 30/70
  USPC ........................................................ 370/311
  See application file for complete search history.

(56) References Cited

U.S. PATENT DOCUMENTS

| | | | |
|---|---|---|---|
| 8,953,477 B2 * | 2/2015 | Lee ................ | H04W 52/0216 455/458 |
| 9,674,886 B2 * | 6/2017 | Yang ..................... | H04W 28/18 |
| 9,699,760 B2 * | 7/2017 | Cui ....................... | H04W 64/00 |
| 9,854,623 B2 | 12/2017 | Jha et al. | |
| 9,894,610 B2 * | 2/2018 | Lee ....................... | H04W 76/28 |
| 10,085,234 B2 * | 9/2018 | Basu Mallick ....... | H04W 68/02 |
| 10,193,719 B2 * | 1/2019 | Xue ....................... | H04W 16/02 |
| 10,257,748 B2 * | 4/2019 | Kim ...................... | H04W 80/02 |
| 10,485,023 B2 * | 11/2019 | Azarian Yazdi .... | H04W 74/002 |
| 10,491,447 B2 * | 11/2019 | Yeo ...................... | H04L 5/0035 |
| 10,581,574 B2 * | 3/2020 | Sun ...................... | H04L 5/0051 |
| 10,764,009 B2 * | 9/2020 | Kazmi .................. | H04L 5/0098 |
| 10,841,881 B2 * | 11/2020 | Ouchi .................. | H04W 52/325 |
| 10,863,473 B2 * | 12/2020 | Wong ................... | H04W 52/0209 |
| 10,880,895 B2 * | 12/2020 | Gordaychik .......... | H04W 52/18 |
| 10,917,152 B2 * | 2/2021 | Yoshimura ............ | H04W 16/28 |
| 11,057,259 B2 * | 7/2021 | Yeo ....................... | H04L 5/026 |
| 11,139,876 B2 * | 10/2021 | Pawar ................... | H04L 1/1614 |
| 11,147,037 B2 * | 10/2021 | Persson ............. | H04W 74/0833 |
| 11,165,532 B2 * | 11/2021 | Siomina ............... | H04B 17/104 |
| 11,171,755 B2 * | 11/2021 | Su ........................ | H04W 72/04 |
| 11,202,259 B2 * | 12/2021 | Ji ......................... | H04W 68/005 |
| 11,206,634 B2 * | 12/2021 | Islam ................... | H04W 68/005 |
| 11,218,967 B2 * | 1/2022 | Sun ....................... | H04W 68/00 |
| 11,224,029 B2 * | 1/2022 | Rune .................... | H04W 68/005 |
| 11,229,022 B2 * | 1/2022 | Lin ........................ | H04L 5/0094 |
| 11,239,982 B2 * | 2/2022 | Siomina ............... | H04W 76/36 |
| 11,240,759 B2 * | 2/2022 | Andgart ............... | H04W 52/143 |
| 11,246,141 B2 * | 2/2022 | Zhou .................. | H04W 72/0453 |
| 11,265,919 B2 * | 3/2022 | Roy ........................ | H04L 5/001 |
| 11,283,537 B2 * | 3/2022 | Ouchi .................... | H04W 52/38 |
| 11,310,788 B2 * | 4/2022 | Parkvall ............... | H04L 5/0051 |
| 11,330,456 B2 * | 5/2022 | Zhou .................... | H04W 76/19 |
| 11,350,364 B2 * | 5/2022 | Sun ...................... | H04L 12/2803 |
| 11,363,562 B2 * | 6/2022 | Tang ..................... | H04W 68/02 |
| 11,374,723 B2 * | 6/2022 | Yi ......................... | H04W 24/10 |
| 11,452,132 B2 * | 9/2022 | Stern-Berkowitz ......................... H04W 72/0453 | |
| 11,490,334 B2 * | 11/2022 | Zhou ..................... | H04L 1/1614 |
| 11,503,544 B2 * | 11/2022 | Ahmad ................. | H04W 72/23 |
| 11,533,142 B2 * | 12/2022 | Thangarasa ........... | H04W 48/16 |
| 11,564,249 B2 * | 1/2023 | Talarico ................ | H04L 1/1607 |
| 11,582,001 B2 * | 2/2023 | Thangarasa .......... | H04J 11/0086 |
| 11,622,383 B2 * | 4/2023 | Tang ..................... | H04W 16/14 370/330 |
| 11,664,870 B2 * | 5/2023 | Lee ...................... | H04B 7/2125 370/335 |
| 11,683,734 B2 * | 6/2023 | Chen .................. | H04W 36/0085 73/31.05 |
| 11,696,254 B2 * | 7/2023 | Rune .................... | H04L 5/0053 370/329 |
| 11,706,736 B2 * | 7/2023 | Rune .................... | H04W 76/28 370/329 |
| 11,722,960 B2 * | 8/2023 | Freda ................ | H04W 52/0232 370/311 |
| 11,832,213 B2 * | 11/2023 | Agiwal ................. | H04W 68/02 |
| 11,895,584 B2 * | 2/2024 | Zhou .................... | H04W 52/143 |
| 11,910,309 B2 * | 2/2024 | Yi ......................... | H04L 1/1893 |
| 11,963,189 B2 * | 4/2024 | Yi ......................... | H04L 5/0044 |
| 11,985,727 B2 * | 5/2024 | Zhou .................... | H04W 52/0235 |
| 12,075,356 B2 * | 8/2024 | Islam ................... | H04W 52/0229 |
| 2013/0223402 A1 * | 8/2013 | Feng ..................... | H04W 72/23 370/336 |
| 2013/0308533 A1 * | 11/2013 | Murakami ............ | H04W 56/00 370/328 |
| 2017/0303235 A1 | 10/2017 | Deogun et al. | |
| 2018/0092063 A1 * | 3/2018 | Azarian Yazdi ...... | H04W 68/10 |
| 2018/0124644 A1 | 5/2018 | Rico Alvarino et al. | |
| 2019/0174428 A1 * | 6/2019 | Shao .................... | H04W 52/281 |
| 2020/0029302 A1 * | 1/2020 | Cox ..................... | H04W 52/0216 |
| 2020/0100184 A1 * | 3/2020 | Zhang ............... | H04W 52/0216 |
| 2020/0146107 A1 * | 5/2020 | Xiong ................... | H04W 72/23 |
| 2020/0266952 A1 * | 8/2020 | Chatterjee ............. | H04W 48/00 |
| 2021/0185652 A1 * | 6/2021 | Rune ................. | H04W 72/0446 |
| 2021/0203468 A1 * | 7/2021 | Yi ..................... | H04W 72/0453 |
| 2023/0013355 A1 * | 1/2023 | Li ......................... | H04W 76/11 |

FOREIGN PATENT DOCUMENTS

| | | |
|---|---|---|
| CN | 104813722 A | 7/2015 |
| CN | 106549745 A | 3/2017 |
| CN | 106550455 A | 3/2017 |
| CN | 106961729 A | 7/2017 |
| CN | 107888361 A | 4/2018 |
| CN | 108012329 A | 5/2018 |
| WO | 2011103309 A2 | 8/2011 |
| WO | 2017171454 A1 | 10/2017 |

OTHER PUBLICATIONS

Office Action issued in Japanese Application No. 2021-510793 on May 24, 2022, 6 pages (with English translation).
Huawei, HiSilicon, Neul, "Further consideration on narrowband measurement accuracy improvement," 3GPP TSG RAN WG1 Meeting #89, R1-1707024, Hangzhou, China, May 15-19, 2017, 3 pages.
Office Action issued in Chinese Application No. 201880097070.X on Aug. 18, 2021, 8 pages.
Office Action issued in Indian Application No. 202117010119 on Mar. 7, 2022, 6 pages.
Ericsson, "Presence of NRS on a non anchor carrier for paging in NB-IoT," 3GPP TSG-RAN WG1 Meeting #94. R1-1808048, Gothenburg, Sweden, Aug. 20-24, 2018, 3 pages.
Extended European Search Report issued in European Application No. 18931472.7 on Nov. 12, 2021, 11 pages.
Huawei et al., "NRS presence on non-anchor carriers for paging," 3GPP TSG RAN WG1 Meeting #94bis, R1-1810087, Chengdu, China, Oct. 8-12, 2018, 4 pages.
Qualcomm Europe Inc (Spain), "Presence of NRS on a non-anchor for paging (feature lead summary)," 3GPP TSG-RAN WG1 Meeting #94bis, R1-1811326, Chengdu, China, Oct. 8-12, 2018, 4 pages.
Samsung, "Discussion on NRS presence on non-anchor carrier," 3GPP TSG RAN WG1 Meeting #94, R1-1808741, Gothenburg, Sweden, Aug. 20-24, 2018, 2 pages.
3GPP TS 36.211 V14.7.0 (Jun. 2018), "3rd Generation Partnership Project; Technical Specification Group Radio Access Network; Evolved Universal Terrestrial Radio Access (E-UTRA); Physical channels and modulation (Release 14)," Jun. 2018, 197 pages.
3GPP TS 36.213 V13.10.0 (Jun. 2018), "3rd Generation Partnership Project; Technical Specification Group Radio Access Network; Evolved Universal Terrestrial Radio Access (E-UTRA); Physical layer procedures (Release 13)," Jun. 2018, 395 pages.
3GPP TS 36.304 V14.6.0 (Mar. 2018), "3rd Generation Partnership Project; Technical Specification Group Radio Access Network; Evolved Universal Terrestrial Radio Access (E-UTRA); User Equipment (UE) procedures in idle mode (Release 14)," Mar. 2018, 50 pages.

(56) References Cited

OTHER PUBLICATIONS

3GPP TS 36.331 V13.10.0 (Jun. 2018), "3rd Generation Partnership Project; Technical Specification Group Radio Access Network; Evolved Universal Terrestrial Radio Access (E-UTRA); Radio Resource Control (RRC); Protocol specification (Release 13)," Jun. 2018, 645 pages.
Ericsson, Huawei, "New WID on Rel-16 enhancements for NB-IoT," 3GPP TSG RAN Meeting #80, RP-181451, La Jolla, USA, Jun. 11-14, 2018, 4 pages.
PCT International Search Report and Written Opinion issued in International Application No. PCT/CN2018/103666 on May 14, 2019, 17 pages (with English translation).
PCT International Search Report and Written Opinion issued in International Application No. PCT/CN2018/115759 on May 29, 2019, 17 pages (with English translation).
Samsung, "PO Determination for Paging Reception," 3GPP TSG-RAN WG2 Meeting #97bis, R2-1702893, Spokane, USA, Apr. 3-7, 2017, 3 pages.

* cited by examiner

REFERENCE SIGNAL SENDING METHOD, REFERENCE SIGNAL RECEIVING METHOD, DEVICE, AND SYSTEM

CROSS-REFERENCE TO RELATED APPLICATIONS

This application is a continuation of International Application No. PCT/CN2018/115759, filed on Nov. 15, 2018, which claims priority to International Application No. PCT/CN2018/103666, filed on Aug. 31, 2018. The disclosures of the aforementioned applications are hereby incorporated by reference in their entireties.

TECHNICAL FIELD

This application relates to the field of communications technologies, and in particular, to a reference signal sending method, a reference signal receiving method, a device, and a system.

BACKGROUND

In a wireless communications system, a terminal device has two states. One is a connected state, which indicates that the terminal device has established a connection to a network device and can directly perform communication. One is an idle state, or referred to as a sleep state, which indicates that the terminal device cannot directly communicate with the network device. When the terminal device has no service data to send or receive, the terminal device may enter the idle state to reduce power consumption. When the network device needs to send service data to the terminal device or requires the terminal device to report some service data, the network device may notify the terminal device by using a paging mechanism. The terminal device in the idle state periodically wakes up to monitor a physical downlink control channel (physical downlink control channel, PDCCH), and detects whether a paging scheduling message exists in the PDCCH. If a paging scheduling message exists and paging scheduling is specific to the terminal device, the terminal device in the idle state switches to the connected state, to send or receive service data. A location at which the terminal device wakes up is referred to as a paging occasion (paging occasion, PO).

However, in current internet of things, many services are of an active reporting type, that is, uplink transmission is mainly performed, and a paging probability is relatively low. Therefore, the network device does not send a corresponding paging scheduling message in most PDCCH search spaces whose starting subframes are subframes corresponding to POs, but the terminal device still needs to start to monitor the PDCCH at each PO corresponding to the terminal device. In a PDCCH search space whose starting subframe is a subframe corresponding to each PO, the terminal device performs blind detection on all candidate locations starting from the $1^{st}$ candidate location of the PDCCH search space, and then determines that no paging scheduling message exists. This causes extra power consumption of the terminal device.

Based on this, in the current technology, the network device may transmit a wake-up signal (wakeup signal, WUS) to the terminal device before a PO, and the WUS is used to indicate whether the terminal device needs to monitor the PDCCH. When the terminal device detects a WUS before the PO, the terminal device needs to continue monitoring the PDCCH. If the terminal device does not detect a WUS before the PO, it indicates that the network device does not send a corresponding paging scheduling message in a PDCCH search space whose starting subframe is a subframe corresponding to the PO, and the terminal device does not need to monitor the PDCCH.

However, when the terminal device detects whether a WUS exists before the paging occasion, even if the network device does not send a WUS before the paging occasion, the terminal device needs to start to perform monitoring from a starting subframe of a WUS, and only after maximum WUS duration (maximum WUS duration) ends, the terminal device knows that no WUS exists. This also causes extra power consumption of the terminal device.

Therefore, how to reduce power consumption of a terminal device when the terminal device detects whether a paging scheduling message exists in a PDCCH search space whose starting subframe is a subframe corresponding to a PO, and/or detects whether a WUS exists before a PO is a problem that urgently needs to be resolved currently.

SUMMARY

Embodiments of this application provide a reference signal receiving method, a reference signal sending method, a device, and a system, to reduce power consumption of a terminal device.

To achieve the foregoing objective, the following technical solutions are used in the embodiments of this application.

According to a first aspect, a reference signal sending method is provided, including: A network device determines a time domain resource in first duration based on the quantity of paging occasions in a discontinuous reception period, where the time domain resource is a time domain resource in a time-frequency resource used to transmit a reference signal. The network device sends the reference signal to a terminal device on the time domain resource. In other words, in this embodiment of this application, regardless of whether the network device sends a corresponding paging scheduling message at a paging occasion, the network device sends the reference signal to the terminal device on the time-frequency resource corresponding to the time domain resource in the first duration that is determined based on the quantity of paging occasions in the discontinuous reception period. Therefore, according to the reference signal sending method provided in this embodiment of this application, in one aspect, when detecting whether a paging scheduling message exists in a PDCCH search space whose starting subframe is a subframe corresponding to a paging occasion, and waking up at the paging occasion to monitor a PDCCH, the terminal device may perform measurement by using several reference signals in the first duration. Therefore, when a measurement result satisfies a specific condition, the terminal device may be considered as a terminal device with a good channel condition. Further, in the PDCCH search space whose starting subframe is the subframe corresponding to the paging occasion, the terminal device may determine whether a paging scheduling message exists by performing blind detection only on some candidate locations, without performing blind detection on all candidate locations, thereby reducing power consumption of the terminal device. In another aspect, when detecting whether a WUS exists before a paging occasion, the terminal device may perform measurement by using several reference signals in the first duration. Therefore, when a measurement result satisfies a specific condition, the terminal device may be considered as a terminal device with a good channel condition. The terminal device starts to perform monitoring from a starting subframe of a WUS, and may terminate WUS monitoring in advance, without waiting until maximum WUS duration ends to know that no WUS exists, thereby reducing power consumption of the terminal device.

According to a second aspect, a reference signal receiving method is provided. The method includes: A terminal device determines a time domain resource in first duration based on a quantity of paging occasions in a discontinuous reception period, where the time domain resource is a time domain resource in a time-frequency resource used to transmit the reference signal. The terminal device receives the reference signal from a network device on the time-frequency resource. In other words, in this embodiment of this application, regardless of whether the network device sends a corresponding paging scheduling message at a paging occasion, the terminal device receives the reference signal from the network device on the time-frequency resource corresponding to the time domain resource in the first duration that is determined based on the quantity of paging occasions in the discontinuous reception period. Therefore, according to the reference signal receiving method provided in this embodiment of this application, power consumption of the terminal device can be reduced when the terminal device detects whether a paging scheduling message exists in a PDCCH search space whose starting subframe is a subframe corresponding to a paging occasion, and/or detects whether a WUS exists before a paging occasion. For analysis of related technical effects, refer to the first aspect. Details are not described herein again.

With reference to the first aspect or the second aspect, in a possible design, for example, a frequency domain resource in the time-frequency resource may be a frequency domain resource in a time-frequency resource in which a paging occasion or a wake-up signal is currently located. In other words, the frequency domain resource in the time-frequency resource for transmitting the reference signal and the frequency domain resource in the time-frequency resource in which the paging occasion or the wake-up signal is currently located may be a same frequency domain resource.

Alternatively, with reference to the first aspect or the second aspect, in a possible design, the frequency domain resource may be alternatively not a frequency domain resource in a time-frequency resource in which a paging occasion or a wake-up signal is currently located. In other words, the frequency domain resource in the time-frequency resource for transmitting the reference signal and the frequency domain resource in the time-frequency resource in which the paging occasion or the wake-up signal is currently located may be different frequency domain resources. In this case, the network device may indicate, to the terminal device by using a first frequency domain resource indication parameter, the frequency domain resource in the time-frequency resource for transmitting the reference signal. This is not specifically limited in this embodiment of this application.

With reference to the first aspect or the second aspect, in a possible design, the time domain resource includes at least one of a first time domain resource and a second time domain resource. The first time domain resource includes at least one of a subframe corresponding to one or more paging occasions in the first duration, X1 subframes before a subframe corresponding to each of the one or more paging occasions, or Y1 subframes after the subframe corresponding to each of the one or more paging occasions, where X1 is an integer greater than or equal to 0, Y1 is an integer greater than or equal to 0, and a sum of X1 and Y1 is related to the quantity of paging occasions in the DRX period. In a specific implementation, the first time domain resource includes a subframe corresponding to one or more paging occasions in the first duration, X1 subframes before a subframe corresponding to each of the one or more paging occasions, and Y1 subframes after the subframe corresponding to each of the one or more paging occasions, where X1 is an integer greater than or equal to 0. Y1 is an integer greater than or equal to 0, and a sum of X1 and Y1 is related to the quantity of paging occasions in the discontinuous reception period. The second time domain resource includes at least one of a starting subframe of one or more wake-up signals in the first duration, X2 subframes before a starting subframe of each wake-up signal in the one or more wake-up signals, or Y2 subframes after the starting subframe of each wake-up signal in the one or more wake-up signals, where X2 is an integer greater than or equal to 0, Y2 is an integer greater than or equal to 0, and a sum of X2 and Y2 is related to the quantity of paging occasions in the DRX period. In a specific implementation method, the second time domain resource includes a starting subframe of one or more wake-up signals in the first duration, X2 subframes before a starting subframe of each of the one or more wake-up signals, and Y2 subframes after the starting subframe of each of the one or more wake-up signals, where X2 is an integer greater than or equal to 0, Y2 is an integer greater than or equal to 0, and a sum of X2 and Y2 is related to the quantity of paging occasions in the discontinuous reception period.

With reference to any one of the foregoing possible designs of the first aspect or the second aspect, in a possible design, the X1 subframes are X1 consecutive subframes that are before and consecutive to the subframe corresponding to each paging occasion, and the Y1 subframes are Y1 consecutive subframes that are after and consecutive to the subframe corresponding to each paging occasion. Alternatively, the X1 subframes are first X1 (consecutive) subframes in Z subframes before the subframe corresponding to each paging occasion, and the Y1 subframes are Y1 consecutive subframes that are after and consecutive to the subframe corresponding to each paging occasion.

With reference to any one of the foregoing possible designs of the first aspect or the second aspect, in a possible design, a subframe on the first time domain resource may include a normal subframe, or may include a valid (valid) subframe. This is not specifically limited in this embodiment of this application. When all subframes on the first time domain resource are valid subframes, a subframe corresponding to a paging occasion may be a subframe in which the paging occasion is located, or may be the $1^{st}$ valid subframe after the paging occasion, the X1 (consecutive) subframes are X1 (consecutive) valid subframes, and the Y1 (consecutive) subframes are Y1 (consecutive) valid subframes. Consecutive valid subframes mean that no other valid subframe exists between two valid subframes.

With reference to any one of the foregoing possible designs of the first aspect, in a possible design, the method further includes: The network device sends first configuration information of the reference signal to the terminal device. The first configuration information includes at least one of X1. Y1, a first period, the first duration, an offset of the first duration in the first period, and a quantity of repetitions of the first duration. The first period is a period related to the discontinuous reception period. The first duration is a period of time in the first period.

With reference to any one of the foregoing possible designs of the second aspect, in a possible design, the method further includes: The terminal device receives first configuration information of the reference signal from the network device. The first configuration information includes at least one of X1, Y1, a first period, the first duration, an offset of the first duration in the first period, and a quantity of repetitions of the first duration. The first period is a period related to the discontinuous reception period. The first duration is a period of time in the first period. In this way, after receiving the first configuration information from the network device, the terminal device may determine the time domain resource in the first duration or a time domain resource in the first period based on the first configuration information and the quantity of paging occasions in the discontinuous reception period. For example, assuming that the first configuration information includes the first duration and at least one of X1 and Y1, the terminal device may determine the time domain resource in the first duration based on the first configuration information and the quantity of paging occasions in the discontinuous reception period. Alternatively, for example, assuming that the first configuration information includes at least one of X1 and Y1, at least one of the offset of the first duration in the first period and the quantity of repetitions of the first duration, the first period, and the first duration, the terminal device may determine the time domain resource in the first period based on the first configuration information and the quantity of paging occasions in the discontinuous reception period. This is not specifically limited in this embodiment of this application.

With reference to any one of the foregoing possible designs of the first aspect or the second aspect, in a possible design, the X2 subframes are X2 consecutive subframes that are before and consecutive to the starting subframe of each wake-up signal, and the Y2 subframes are Y2 consecutive subframes that are after and consecutive to the starting subframe of each wake-up signal. Alternatively, the X2 subframes are first X2 consecutive subframes in Z2 subframes before the starting subframe of each wake-up signal, and the Y2 subframes are Y2 consecutive subframes that are after and consecutive to the starting subframe of each wake-up signal.

With reference to any one of the foregoing possible designs of the first aspect or the second aspect, in a possible design, a subframe on the second time domain resource may include a normal subframe, or may include a valid (valid) subframe. This is not specifically limited in this embodiment of this application. Because a starting subframe of a wake-up signal is a valid subframe, when all subframes on the second time domain resource are valid subframes, the X2 (consecutive) subframes are X2 (consecutive) valid subframes, and the Y2 (consecutive) subframes are Y2 (consecutive) valid subframes. Consecutive valid subframes mean that no other valid subframe exists between two valid subframes.

With reference to any one of the foregoing possible designs of the first aspect, in a possible design, the method further includes: The network device sends second configuration information of the reference signal to the terminal device. The second configuration information includes at least one of X2, Y2, a first period, the first duration, an offset of the first duration in the first period, or a quantity of repetitions of the first duration. The first period is a period related to the discontinuous reception period. The first duration is a period of time in the first period.

With reference to any one of the foregoing possible designs of the second aspect, in a possible design, the method further includes: The terminal device receives second configuration information of the reference signal from the network device. The second configuration information includes at least one of X2. Y2, a first period, the first duration, an offset of the first duration in the first period, or a quantity of repetitions of the first duration. The first period is a period related to the discontinuous reception period. The first duration is a period of time in the first period. In this way, after receiving the second configuration information from the network device, the terminal device may determine the time domain resource in the first duration or a time domain resource in the first period based on the second configuration information and the quantity of paging occasions in the discontinuous reception period. For example, assuming that the second configuration information includes the first duration and at least one of X2 and Y2, the terminal device may determine the time domain resource in the first duration based on the second configuration information and the quantity of paging occasions in the discontinuous reception period. Alternatively, for example, assuming that the second configuration information includes at least one of X2 and Y2, at least one of the offset of the first duration in the first period and the quantity of repetitions of the first duration, the first period, and the first duration, the terminal device may determine the time domain resource in the first period based on the second configuration information and the quantity of paging occasions in the discontinuous reception period. This is not specifically limited in this embodiment of this application.

With reference to any one of the foregoing possible designs of the first aspect or the second aspect, in a possible design, the one or more paging occasions in the first duration may be represented by an F1-bit bitmap, where each bit in the F1-bit bitmap is used to indicate whether the reference signal is transmitted in a subframe corresponding to each of F1 paging occasions, and F1 is a quantity of all paging occasions in the first duration.

Alternatively, with reference to any one of the foregoing possible designs of the first aspect or the second aspect, in a possible design, the one or more paging occasions in the first duration include N1 paging occasions in every M1 paging occasions of all the paging occasions in the first duration, where M1 is an integer greater than or equal to 1, N1 is an integer greater than or equal to 1, and M1 is greater than or equal to N1.

With reference to any one of the foregoing possible designs of the first aspect or the second aspect, in a possible design, the N1 paging occasions are first N1 consecutive paging occasions in every M paging occasions; or the N1 paging occasions are last N1 consecutive paging occasions in every M1 paging occasions; or the N1 paging occasions are represented by an M1-bit bitmap, where each bit in the M1-bit bitmap is used to indicate whether the reference signal is transmitted in a subframe corresponding to each of every M1 paging occasions.

With reference to any one of the foregoing possible designs of the first aspect, in a possible design, the method further includes: The network device sends third configuration information of the reference signal to the terminal device. The third configuration information includes M1 and N1, or includes the M1-bit bitmap.

With reference to any one of the foregoing possible designs of the second aspect, in a possible design, the method further includes: The terminal device receives third configuration information of the reference signal from the network device. The third configuration information includes M1 and N1, or includes the M1-bit bitmap. In this way, the terminal device may determine the time domain resource in the first duration with reference to the third configuration information.

With reference to any one of the foregoing possible designs of the first aspect or the second aspect, in a possible design, the one or more wake-up signals in the first duration may be represented by an F2-bit bitmap, where each bit in the F2-bit bitmap is used to indicate whether the reference signal is transmitted in a starting subframe of each of F2 wake-up signals, and F2 is a quantity of all wake-up signals in the first duration.

With reference to any one of the foregoing possible designs of the first aspect or the second aspect, in a possible design, the one or more wake-up signals in the first duration include N2 wake-up signals in every M2 wake-up signals of all the wake-up signals in the first duration, where M2 is an integer greater than or equal to 1, N2 is an integer greater than or equal to 1, and M2 is greater than or equal to N2.

With reference to any one of the foregoing possible designs of the first aspect or the second aspect, in a possible design, the N2 wake-up signals are first N2 consecutive wake-up signals in every M2 wake-up signals; or the N2 wake-up signals are last N2 consecutive wake-up signals in every M2 wake-up signals; or the N2 wake-up signals are represented by an M2-bit bitmap, where each bit in the M2-bit bitmap is used to indicate whether the reference signal is transmitted in a starting subframe of each of every M2 wake-up signals.

With reference to any one of the foregoing possible designs of the first aspect, in a possible design, the method further includes: The network device sends fourth configuration information of the reference signal to the terminal device. The fourth configuration information includes M2 and N2, or includes the M2-bit bitmap.

With reference to any one of the foregoing possible designs of the second aspect, in a possible design, the method further includes: The terminal device receives fourth configuration information of the reference signal from the network device. The fourth configuration information includes M2 and N2, or includes the M2-bit bitmap. In this way, the terminal device may determine the time domain resource in the first duration with reference to the fourth configuration information.

With reference to any one of the foregoing possible designs of the first aspect or the second aspect, in a possible design, that a sum of X1 and Y1 is related to the quantity of paging occasions in the discontinuous reception period includes: The sum of X1 and Y1 is a specified value corresponding to the quantity of paging occasions in the discontinuous reception period; or the sum of X1 and Y1 is determined by the network device based on the quantity of paging occasions in the discontinuous reception period, the discontinuous reception period, and a first specified value.

With reference to any one of the foregoing possible designs of the first aspect or the second aspect, in a possible design, X1 and Y1 satisfy the following formula: $X1+Y1=\min\{4T/nB, a\}-1$, where nB indicates the quantity of paging occasions in the discontinuous reception period. T indicates the discontinuous reception period, and a is the first specified value.

With reference to any one of the foregoing possible designs of the first aspect or the second aspect, in a possible design, that a sum of X2 and Y2 is related to the quantity of paging occasions in the discontinuous reception period includes: The sum of X2 and Y2 is a specified value corresponding to the quantity of paging occasions in the discontinuous reception period; or the sum of X2 and Y2 is determined by the network device based on the quantity of paging occasions in the discontinuous reception period, the discontinuous reception period, and a second specified value.

With reference to any one of the foregoing possible designs of the first aspect or the second aspect, in a possible design, X2 and Y2 satisfy the following formula: $X2+Y2=\min\{4T/nB, b\}-1$, where nB indicates the quantity of paging occasions in the discontinuous reception period, T indicates the discontinuous reception period, and b is the second specified value.

With reference to any one of the foregoing possible designs of the first aspect, in a possible design, the method further includes: The network device sends first indication information to the terminal device. The first indication information is used to indicate that the network device supports determining the time domain resource in the first duration based on the quantity of paging occasions in the first duration.

With reference to any one of the foregoing possible designs of the second aspect, in a possible design, the method further includes: The terminal device receives first indication information from the network device. The first indication information is used to indicate that the network device supports determining the time domain resource in the first duration based on the quantity of paging occasions in the first duration.

Certainly, in this embodiment of this application, alternatively, the first indication information may not be configured, but it is predetermined in a protocol that the network device supports determining the time domain resource in the first duration based on the quantity of paging occasions in the first duration. This is not specifically limited in this embodiment of this application.

With reference to any one of the foregoing possible designs of the first aspect, in a possible design, the method further includes: The network device receives second indication information from the terminal device. The second indication information is used to indicate that the terminal device is capable of terminating monitoring on at least one of a wake-up signal and a PDCCH in advance.

With reference to any one of the foregoing possible designs of the second aspect, in a possible design, the method further includes: The terminal device sends second indication information to the network device. The second indication information is used to indicate that the terminal device is capable of terminating monitoring on at least one of a wake-up signal and a PDCCH in advance.

With reference to any one of the foregoing possible designs of the first aspect or the second aspect, in a possible design, when the time domain resource in the first duration that is determined based on the quantity of paging occasions in the discontinuous reception period overlaps (overlap) a third time domain resource, the reference signal may be transmitted on a union set of the two time domain resources. The third time domain resource includes a time domain resource corresponding to a candidate location, T1 subframes before the 1 subframe at the candidate location, and T2 subframes after the last subframe at the candidate location, where T1 is an integer greater than or equal to 0, and T2 is an integer greater than or equal to 0. For example, in an NB-IoT system, T1 may be equal to 10, and T2 may be equal to 4. This is not specifically limited in this embodiment of this application.

With reference to any one of the foregoing possible designs of the first aspect or the second aspect, in a possible design, the time domain resource includes at least one of a third time domain resource or a fourth time domain resource. The third time domain resource includes at least one of subframes corresponding to N3 paging occasions in every M3 paging occasions of all paging occasions in the first duration, X5 subframes before a subframe corresponding to each of the N3 paging occasions in every M3 paging occasions, or Y5 subframes after the subframe corresponding to each of the N3 paging occasions in every M3 paging occasions, where M3 is an integer greater than or equal to 1, N3 is an integer greater than or equal to 1, M3 is greater than or equal to N3, X5 is an integer greater than or equal to 0, Y5 is an integer greater than or equal to 0, and M3 is related to the quantity of paging occasions in the discontinuous reception period. The fourth time domain resource includes at least one of starting subframes of N4 wake-up signals in every M4 wake-up signals of all wake-up signals in the first duration, X6 subframes before a starting subframe of each of the N4 wake-up signals in every M4 wake-up signals, or Y6 subframes after the starting subframe of each of the N4 wake-up signals in every M4 wake-up signals, where M4 is an integer greater than or equal to 1. N4 is an integer greater than or equal to 1, M4 is greater than or equal to N4, X6 is an integer greater than or equal to 0, Y6 is an integer greater than or equal to 0, and M4 is related to the quantity of paging occasions in the discontinuous reception period.

With reference to any one of the foregoing possible designs of the first aspect or the second aspect, in a possible design, the X5 subframes are X5 consecutive subframes that are before and consecutive to the subframe corresponding to each paging occasion, and the Y5 subframes are Y5 consecutive subframes that are after and consecutive to the subframe corresponding to each paging occasion.

With reference to any one of the foregoing possible designs of the first aspect or the second aspect, in a possible design, the X6 subframes are X6 consecutive subframes that are before and consecutive to the starting subframe of each wake-up signal, and the Y6 subframes are Y6 consecutive subframes that are after and consecutive to the starting subframe of each wake-up signal.

With reference to any one of the foregoing possible designs of the first aspect or the second aspect, in a possible design, the N3 paging occasions are first N3 consecutive paging occasions in every M3 paging occasions; or the N3 paging occasions are last N3 consecutive paging occasions in every M3 paging occasions; or the N3 paging occasions are represented by an M3-bit bitmap, where each bit in the M3-bit bitmap is used to indicate whether the reference signal is transmitted in a subframe corresponding to each of every M3 paging occasions.

With reference to any one of the foregoing possible designs of the first aspect or the second aspect, in a possible design, the N4 wake-up signals are first N4 consecutive wake-up signals in every M4 wake-up signals; or the N4 wake-up signals are last N4 consecutive wake-up signals in every M4 wake-up signals; or the N4 wake-up signals are represented by an M4-bit bitmap, where each bit in the M4-bit bitmap is used to indicate whether the reference signal is transmitted in a starting subframe of each of every M4 wake-up signals.

With reference to any one of the foregoing possible designs of the first aspect or the second aspect, in a possible design, that M3 is related to the quantity of paging occasions in the discontinuous reception period includes: M3 is a specified value corresponding to the quantity of paging occasions in the discontinuous reception period; or M3 is determined by the network device based on the quantity of paging occasions in the discontinuous reception period, the discontinuous reception period, and a fifth specified value.

With reference to any one of the foregoing possible designs of the first aspect or the second aspect, in a possible design. M3 satisfies the following formula: $M3=\max\{\text{alpha } 1\times(4/T)\times nB, 1\}$, where nB indicates the quantity of paging occasions in the discontinuous reception period, T indicates the discontinuous reception period, and alpha 1 is the fifth specified value.

With reference to any one of the foregoing possible designs of the first aspect or the second aspect, in a possible design, that M4 is related to the quantity of paging occasions in the discontinuous reception period includes: M4 is a specified value corresponding to the quantity of paging occasions in the discontinuous reception period; or M4 is determined by the network device based on the quantity of paging occasions in the discontinuous reception period, the discontinuous reception period, and a sixth specified value.

With reference to any one of the foregoing possible designs of the first aspect or the second aspect, in a possible design, M4 satisfies the following formula: $M4=\max(\text{alpha } 2\times(4/T)\times nB, 1)$, where nB indicates the quantity of paging occasions in the discontinuous reception period, T indicates the discontinuous reception period, and alpha 2 is the sixth specified value.

According to a third aspect, a reference signal sending method is provided, including: A network device sends information about a measurement subframe to a terminal device. The network device determines a time domain resource in first duration based on the information about the measurement subframe, where the time domain resource is a time domain resource in a time-frequency resource used to transmit a reference signal. The network device sends the reference signal to the terminal device on the time-frequency resource. In other words, regardless of whether the network device sends a corresponding paging scheduling message at a paging occasion, the network device sends the reference signal to the terminal device on the time-frequency resource corresponding to the time domain resource in the first duration that is determined based on the information about the measurement subframe. Therefore, according to the reference signal sending method provided in this embodiment of this application, power consumption of the terminal device can be reduced when the terminal device detects whether a paging scheduling message exists in a PDCCH search space whose starting subframe is a subframe corresponding to a paging occasion, and/or detects whether a WUS exists before a paging occasion. For analysis of related technical effects, refer to the first aspect. Details are not described herein again.

According to a fourth aspect, a reference signal receiving method is provided, including: A terminal device receives information about a measurement subframe from a network device. The terminal device determines a time domain resource in first duration based on the information about the measurement subframe, where the time domain resource is a time domain resource in a time-frequency resource used to transmit a reference signal. The terminal device receives the reference signal from the network device on the time-frequency resource. In other words, regardless of whether the network device sends a corresponding paging scheduling message at a paging occasion, the terminal device receives the reference signal from the network device on the time-frequency resource corresponding to the time domain resource in the first duration that is determined based on the information about the measurement subframe. Therefore, according to the reference signal receiving method provided in this embodiment of this application, power consumption of the terminal device can be reduced when the terminal device detects whether a paging scheduling message exists in a PDCCH search space whose starting subframe is a subframe corresponding to a paging occasion, and/or detects whether a WUS exists before a paging occasion. For analysis of related technical effects, refer to the first aspect. Details are not described herein again.

With reference to the third aspect or the fourth aspect, in a possible design, the measurement subframe is represented by an n-bit bitmap, where each bit in the n-bit bitmap is used to indicate whether the reference signal is transmitted in each of n subframes, and n is a positive integer.

With reference to any one of the foregoing possible designs of the third aspect or the fourth aspect, in a possible design, the information about the measurement subframe may include the bitmap.

With reference to any one of the foregoing possible designs of the third aspect or the fourth aspect, in a possible design, the information about the measurement subframe may further include at least one of a period of the bitmap, an offset of the bitmap, and a quantity of repetitions of the bitmap.

According to a fifth aspect, a reference signal sending method is provided, including: A network device determines a time domain resource in first duration, where the time domain resource is a time domain resource in a time-frequency resource used to transmit a reference signal. The network device sends the reference signal to a terminal device on the time domain resource. The time domain resource includes at least one of a first time domain resource and a second time domain resource. The first time domain resource includes a subframe corresponding to one or more paging occasions in the first duration, X3 subframes before a subframe corresponding to each of the one or more paging occasions, and Y3 subframes after the subframe corresponding to each of the one or more paging occasions, where X3 is an integer greater than or equal to 0, Y3 is an integer greater than or equal to 0, and a sum of X3 and Y3 is related to a third specified value. The second time domain resource includes a starting subframe of one or more wake-up signals in the first duration, X3 subframes before a starting subframe of each wake-up signal in the one or more wake-up signals, and Y3 subframes after the starting subframe of each wake-up signal in the one or more wake-up signals, where X3 is an integer greater than or equal to 0, Y3 is an integer greater than or equal to 0, and a sum of X3 and Y3 is related to a fourth specified value. In other words, regardless of whether the network device sends a corresponding paging scheduling message at a paging occasion, the network device sends the reference signal to the terminal device on the time-frequency resource corresponding to the determined time domain resource in the first duration. Therefore, according to the reference signal sending method provided in this embodiment of this application, power consumption of the terminal device can be reduced when the terminal device detects whether a paging scheduling message exists in a PDCCH search space whose starting subframe is a subframe corresponding to a paging occasion, and/or detects whether a WUS exists before a paging occasion. For analysis of related technical effects, refer to the first aspect. Details are not described herein again.

According to a sixth aspect, a reference signal receiving method is provided, including: A terminal device determines a time domain resource in first duration, where the time domain resource is a time domain resource in a time-frequency resource used to transmit a reference signal. The terminal device receives, on the time domain resource, the reference signal sent by a network device. The time domain resource includes at least one of a first time domain resource and a second time domain resource. The first time domain resource includes a subframe corresponding to one or more paging occasions in the first duration, X3 subframes before a subframe corresponding to each of the one or more paging occasions, and Y3 subframes after the subframe corresponding to each of the one or more paging occasions, where X3 is an integer greater than or equal to 0. Y3 is an integer greater than or equal to 0, and a sum of X3 and Y3 is related to a third specified value. The second time domain resource includes a starting subframe of one or more wake-up signals in the first duration, X3 subframes before a starting subframe of each wake-up signal in the one or more wake-up signals, and Y3 subframes after the starting subframe of each wake-up signal in the one or more wake-up signals, where X3 is an integer greater than or equal to 0, Y3 is an integer greater than or equal to 0, and a sum of X3 and Y3 is related to a fourth specified value. In other words, regardless of whether the network device sends a corresponding paging scheduling message at a paging occasion, the terminal device receives the reference signal from the network device on the time-frequency resource corresponding to the determined time domain resource in the first duration. Therefore, according to the reference signal receiving method provided in this embodiment of this application, power consumption of the terminal device can be reduced when the terminal device detects whether a paging scheduling message exists in a PDCCH search space whose starting subframe is a subframe corresponding to a paging occasion, and/or detects whether a WUS exists before a paging occasion. For analysis of related technical effects, refer to the first aspect. Details are not described herein again.

For related implementations of the fifth aspect or the sixth aspect, refer to the first aspect or the second aspect. For example, a difference lies in that, in the fifth aspect or the sixth aspect, a sum of X3 subframes before a subframe corresponding to a paging occasion and Y3 subframes after the subframe corresponding to the paging occasion is related to the third specified value, and a sum of X4 subframes before a starting subframe of a wake-up signal and Y4 subframes after the starting subframe of the wake-up signal is related to the fourth specified value; however, in the first aspect or the second aspect, a sum of X1 subframes before a subframe corresponding to a paging occasion and Y1 subframes after the subframe corresponding to the paging occasion is related to the quantity of paging occasions in the discontinuous reception period, and a sum of X2 subframes before a starting subframe of a wake-up signal and Y2 subframes after the starting subframe of the wake-up signal is related to the quantity of paging occasions in the discontinuous reception period. For other related descriptions, refer to the first aspect or the second aspect. Details are not described herein again.

Optionally, in this embodiment of this application, the third specified value and/or the fourth specified value may be configured by the network device for the terminal device by using a system message or higher layer signaling, or may be predetermined in a protocol. This is not specifically limited in this embodiment of this application. For example, the system message may be a SIB or a MIB, and the higher layer signaling may be RRC signaling. This is not specifically limited in this embodiment of this application.

According to a seventh aspect, a network device is provided. The network device has a function of implementing the method according to the first aspect, the third aspect, or the fifth aspect. The function may be implemented by hardware, or may be implemented by hardware executing corresponding software. The hardware or software includes one or more modules corresponding to the function.

According to an eighth aspect, a network device is provided, including a processor and a memory. The memory is configured to store a computer-executable instruction. When the network device runs, the processor executes the computer-executable instruction stored in the memory, so that the network device performs the reference signal sending method according to any one of the first aspect, the third aspect, or the fifth aspect.

According to a ninth aspect, a network device is provided, including a processor. The processor is configured to couple to a memory, read an instruction in the memory, and then perform, according to the instruction, the reference signal sending method according to any one of the first aspect, the third aspect, or the fifth aspect.

According to a tenth aspect, a computer-readable storage medium is provided. The computer-readable storage medium stores an instruction. When the instruction runs on a computer, the computer is enabled to perform the reference signal sending method according to any one of the first aspect, the third aspect, or the fifth aspect.

According to an eleventh aspect, a computer program product including an instruction is provided. When the computer program product runs on a computer, the computer is enabled to perform the reference signal sending method according to any one of the first aspect, the third aspect, or the fifth aspect.

According to a twelfth aspect, an apparatus (for example, the apparatus may be a chip system) is provided. The apparatus includes a processor, configured to support a network device in implementing a function in the first aspect, the third aspect, or the fifth aspect, for example, determining a time domain resource in first duration based on a quantity of paging occasions in a discontinuous reception period. In a possible design, the apparatus further includes a memory. The memory is configured to store a program instruction and data that are necessary for the network device. When the apparatus is a chip system, the chip system may include a chip, or may include a chip and another discrete device.

For a technical effect of any design manner in the seventh aspect to the twelfth aspect, refer to technical effects of different design manners in the first aspect, the third aspect, or the fifth aspect. Details are not described herein again.

According to a thirteenth aspect, a terminal device is provided. The terminal device has a function of implementing the method according to the second aspect, the fourth aspect, or the sixth aspect. The function may be implemented by hardware, or may be implemented by hardware executing corresponding software. The hardware or software includes one or more modules corresponding to the function.

According to a fourteenth aspect, a terminal device is provided, including a processor and a memory. The memory is configured to store a computer-executable instruction. When the terminal device runs, the processor executes the computer-executable instruction stored in the memory, so that the terminal device performs the reference signal receiving method according to any one of the second aspect, the fourth aspect, or the sixth aspect.

According to a fifteenth aspect, a terminal device is provided, including a processor. The processor is configured to couple to a memory, read an instruction in the memory, and then perform, according to the instruction, the reference signal sending method according to the second aspect, the fourth aspect, or the sixth aspect.

According to a sixteenth aspect, a computer-readable storage medium is provided. The computer-readable storage medium stores an instruction. When the instruction runs on a computer, the computer is enabled to perform the reference signal receiving method according to any one of the second aspect, the fourth aspect, or the sixth aspect.

According to a seventeenth aspect, a computer program product including an instruction is provided. When the computer program product runs on a computer, the computer is enabled to perform the reference signal receiving method according to any one of the second aspect, the fourth aspect, or the sixth aspect.

According to an eighteenth aspect, an apparatus (for example, the apparatus may be a chip system) is provided. The apparatus includes a processor, configured to support a terminal device in implementing a function in the second aspect, the fourth aspect, or the sixth aspect, for example, determining a time domain resource in first duration based on a quantity of paging occasions in a discontinuous reception period. In a possible design, the apparatus further includes a memory. The memory is configured to store a program instruction and data that are necessary for the terminal device. When the apparatus is a chip system, the chip system may include a chip, or may include a chip and another discrete device.

For a technical effect of any design manner in the thirteenth aspect to the eighteenth aspect, refer to technical effects of different design manners in the second aspect, the fourth aspect, or the sixth aspect. Details are not described herein again.

According to a nineteenth aspect, a communications system is provided. The communications system includes a terminal device and a network device. The network device is configured to perform the steps performed by the network device in the first aspect or the solutions provided in the embodiments of this application, and the terminal device is configured to perform the steps performed by the terminal device in the second aspect or the solutions provided in the embodiments of this application. Alternatively, the network device is configured to perform the steps performed by the network device in the third aspect or the solutions provided in the embodiments of this application, and the terminal device is configured to perform the steps performed by the terminal device in the fourth aspect or the solutions provided in the embodiments of this application. Alternatively, the network device is configured to perform the steps performed by the network device in the fifth aspect or the solutions provided in the embodiments of this application, and the terminal device is configured to perform the steps performed by the terminal device in the sixth aspect or the solutions provided in the embodiments of this application.

These aspects or other aspects of this application are clearer and easier to understand in descriptions of the following embodiments.

DESCRIPTION OF EMBODIMENTS

For ease of understanding the technical solutions in the embodiments of this application, related technologies of this application are first briefly described below.

1. PO

When a terminal device is in an idle state, a network device notifies, by using a paging mechanism, the terminal device of whether the terminal device needs to enter a connected state to exchange information. In this case, the terminal device needs to monitor a PDCCH to perform a subsequent response. However, if the terminal device keeps monitoring the PDCCH in the idle state, great power consumption of the terminal device is caused. In the idle state, an operating mechanism based on a discontinuous reception (discontinuous reception. DRX) period is fixed, and a fixed DRX period is used. To reduce power consumption, the network device and the terminal device negotiate with each other, and the terminal device performs PDCCH detection in a form of blind detection only in a PDCCH search space whose starting subframe is a subframe in which a PO in the DRX period is located (where the subframe may also be referred to as a PO location below). The PDCCH search space is a set of possible candidate (candidate) locations at which a target PDCCH may appear, and the PO location indicates a starting location at which the terminal device monitors the PDCCH, so that a starting location of the PDCCH search space is determined, and then blind PDCCH detection is performed based on the starting location of the PDCCH search space. In the PDCCH search space, a block may be considered as a candidate.

Figure 1:
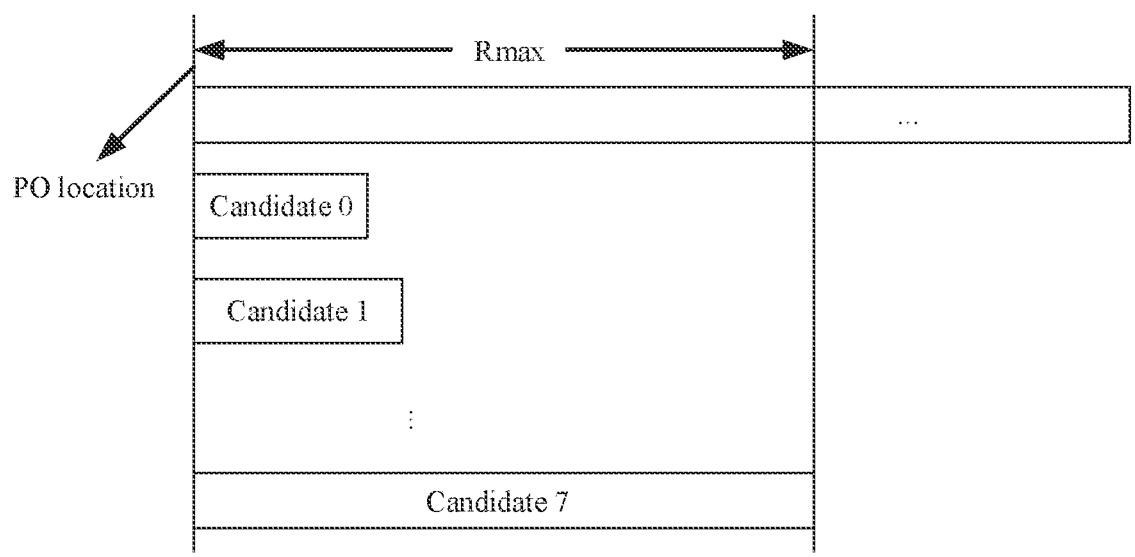
FIG. 1 is a schematic diagram of performing detection in an NPDCCH search space in an NB-IoT system in the current technology.

It should be noted that, in the embodiments of this application, the PDCCH may be a narrowband PDCCH (narrowband PDCCH. NPDCCH) in narrowband internet of things (narrowband internet of things, NB-IoT), or may be another PDCCH. This is not specifically limited in the embodiments of this application. For example, as shown in FIG. 1, in an NB-IoT system, an NPDCCH search space includes a maximum of eight candidate locations, which are denoted as a candidate 0, a candidate 1, a candidate 2, . . . , and a candidate 7. In the embodiments of this application, a candidate location occupies h subframes, where h is a quantity of repetitions of the NPDCCH at the candidate location, and h is a positive integer. This is uniformly described herein, and details are not described below again. In the current technology, a terminal device sequentially performs blind detection on different candidates in an NPDCCH search space whose starting subframe is a subframe corresponding to a PO, until a detection succeeds. If no detection succeeds, in a next DRX period, the terminal device continues monitoring an NPDCCH in an NPDCCH search space whose starting subframe is a subframe corresponding to a PO, and so on. Rmax in FIG. 1 indicates a length of the NPDCCH search space whose starting subframe is the subframe corresponding to the PO, and may also be understood as a maximum quantity of repetitions of the NPDCCH. This is uniformly described herein, and details are not described below again.

In the embodiments of this application, a DRX period may be preconfigured on a terminal device, or may be configured by a network device for the terminal device by using a system message. This is not specifically limited in the embodiments of this application. The DRX period may also be considered as a period based on which a terminal device in an idle state periodically wakes up. This is uniformly described herein, and details are not described below again.

Figure 2:
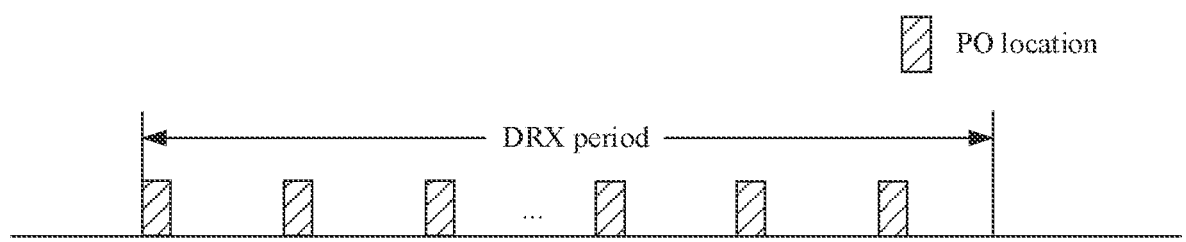
FIG. 2 is a schematic diagram of PO locations configured on a network device in a DRX period in the current technology.

FIG. 2 is a schematic diagram of PO locations configured on a network device in a DRX period. It can be learned from FIG. 2 that a plurality of POs may be configured in one DRX period for the network device. For any one of a plurality of terminal devices communicating with the network device, the terminal device wakes up only at one PO location in a DRX period. Therefore, if DRX is configured, the terminal device needs to accurately calculate a time when the terminal device needs to wake up in the DRX period, to monitor possible paging. The following provides a manner of determining a PO location at which the terminal device wakes up.

The PO location is determined by using both a system frame number (system frame number, SFN) and a subframe number. In other words, the SFN and the subframe number may be used to identify the PO location, that is, a starting location of an NPDCCH search space at which a paging scheduling message should appear. The SFN identifies a system frame location of the starting location of the NPDCCH search space at which the paging scheduling message should appear. The subframe number identifies a subframe location, in the system frame, of the starting location of the NPDCCH search space at which the paging scheduling message should appear. One system frame includes 10 subframes, for example, a subframe 0, a subframe 1, a subframe 2, a subframe 3, . . . , a subframe 8, and a subframe 9. This is uniformly described herein, and details are not described below again.

In the embodiments of this application, the terminal device may determine, based on a paging configuration parameter sent by the network device, an SFN and a subframe number that correspond to a PO. For example, an SFN satisfying the following formula (1) may be used as an SFN corresponding to a PO.

$$\text{SFN mod } T = (T \text{ div } N) \times (\text{UEID mod } N) \quad \text{Formula (1)}$$

mod indicates modulo; div indicates exact division, that is, rounding; T indicates a DRX period; a value of N is equal to min(T, nB), that is, a smaller value of T and nB, and a value range is $\{T, T/2, T/4, T/8, T/16, T/32, T/64, T/128, T/256, T/512, T/1024\}$; nB indicates paging density, that is, a quantity of POs in a DRX period, and a value range is $\{4T, 2T, T/2, T/4, T/8, T/16, T/32, T/64, T/128, T/256, T/512, T/1024\}$; a value of UEID is equal to (an international mobile subscriber identity (international mobile subscriber identity, IMSI) mod 4096), where each terminal device has a unique IMSI.

For example, a subframe number corresponding to a PO may be determined by using the following formula (2):

$$i\_s = \text{floor}(\text{UEID}/N) \text{ mod } Ns \quad \text{Formula (2)}$$

floor indicates rounding down; Ns=max(1, nB/T), and indicates a quantity of POs in a system frame with POs, and a value range is (4, 2, 1); i_s indicates an index of a subframe number, that is, after i_s is calculated, a subframe number corresponding to a PO may be obtained through table lookup; for related descriptions of mod, N, and UEID, refer to the formula (1), and details are not described herein again.

It can be learned from the formula (1) and the formula (2) that, once the T, nB, and UEID parameters are determined, the terminal device may determine only one SFN in one DRX period based on the formula (1), and the terminal device may determine only one subframe number in one system frame based on the formula (2), so that the terminal device may determine, based on the system frame number and the subframe number, only one PO location at which the terminal device wakes up in the DRX period.

Similarly, for any one of the plurality of terminal devices communicating with the network device, the network device may also determine, based on the formula (1) and the formula (2), only one PO location at which the terminal device wakes up in one DRX period. Details are not described herein again.

Figure 3:
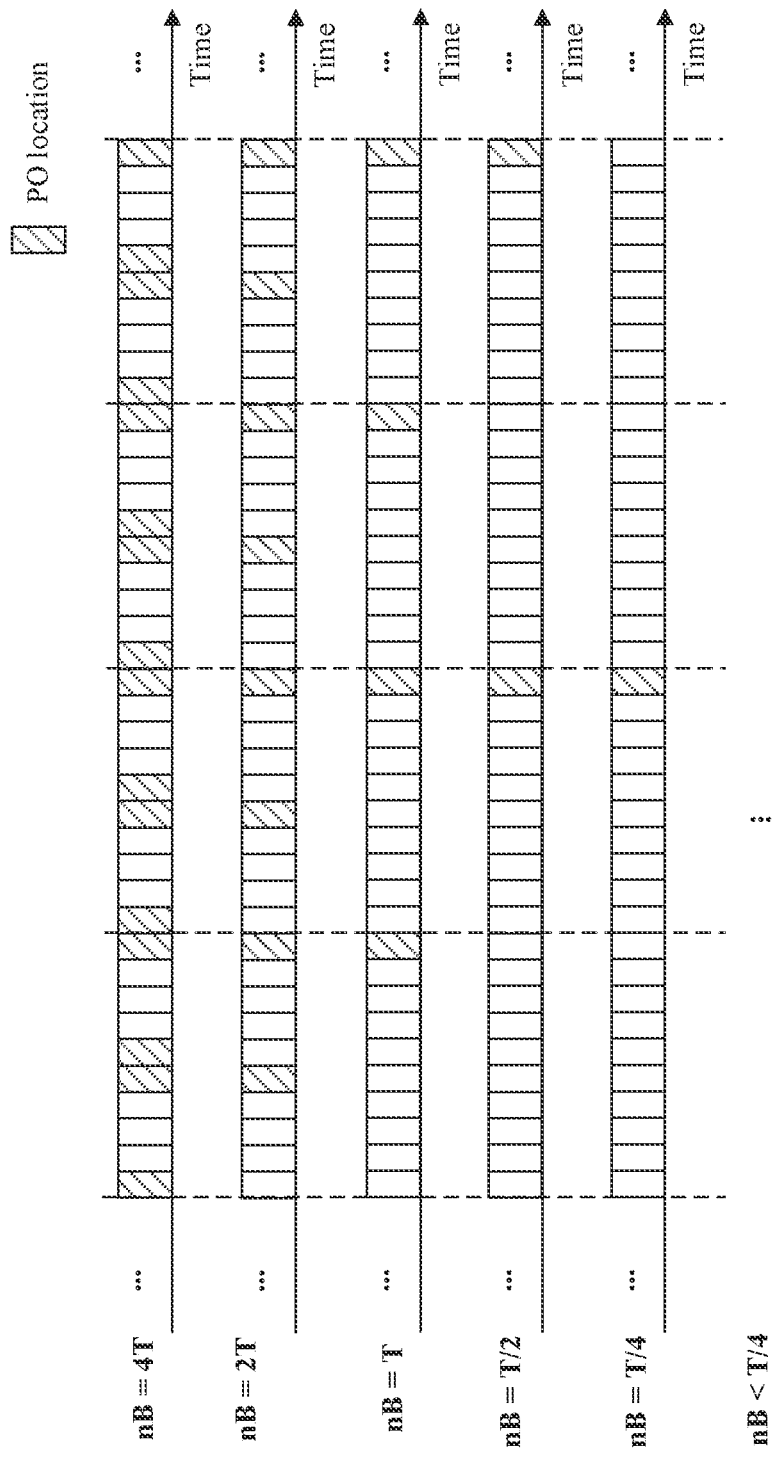
FIG. 3 is a schematic diagram of PO locations that correspond to different nB and that are configured on a network device in a DRX period in an NB-IoT system in the current technology.

In addition, in the current technology, both the terminal device and the network device may determine, by using the T, nB, and UEID parameters, all PO locations configured on the network device in one DRX period. For example, as shown in FIG. 3, using the NB-IoT system as an example, nB=4T indicates that one system frame includes four POs, and time domain resources of the four POs are a subframe 0, a subframe 4, a subframe 5, and a subframe 9, nB=2T indicates that one system frame includes two POs, and time domain resources of the two POs are a subframe 4 and a subframe 9, nB=T indicates that one system frame includes one PO, and a time domain resource of the PO is a subframe 9, nB=T/2 indicates that two system frames include one PO, and a time domain resource of the PO is a subframe 9 in one of the two system frames. In FIG. 3, descriptions are provided by using an example in which the time domain resource of the PO is a subframe 9 of the $2^{nd}$ system frame that is shown and a subframe 9 of the $4^{th}$ system frame that is shown, nB=T/4 indicates that four system frames include one PO, and a time domain resource of the PO is a subframe 9 in one of the four system frames. In FIG. 2, descriptions are provided by using an example in which the time domain resource of the PO is a subframe 9 of the $2^{nd}$ system frame that is shown. Other cases may be obtained by analogy.

The current NB-IoT system includes two types of carriers: an anchor (anchor) carrier and a non-anchor (non-anchor) carrier. The anchor carrier is a carrier that carries a narrowband primary synchronization signal (narrowband primary synchronization signal, NPSS), a narrowband secondary synchronization signal (narrowband secondary synchronization signal, NSSS), a narrowband physical broadcast channel (narrowband physical broadcast channel, NPBCH), an NPDCCH, and a narrowband physical downlink shared channel (narrowband physical downlink shared channel, NPDSCH). The non-anchor carrier is a carrier that carries only an NPDCCH and an NPDSCH, but does not carry an NPSS, an NSSS, or an NPBCH. On the non-anchor carrier, when the terminal device calculates a PO location by using the formula (1) and the formula (2), the terminal device does not know whether a paging scheduling message exists in an NPDCCH search space whose starting subframe is a subframe corresponding to the PO. Therefore, the terminal device needs to perform blind NPDCCH detection. When a paging scheduling message exists in the NPDCCH search space whose starting subframe is the subframe corresponding to the PO, the network device sends a narrowband reference signal (narrowband reference signal, NRS) at a candidate location at which the terminal device can detect the paging scheduling message, and sends an NRS at the candidate location at which the paging scheduling message is detected, in 10 subframes before the $1^{st}$ subframe at the candidate location, and in four subframes after the last subframe at the candidate location. When no paging scheduling message exists in the NPDCCH search space whose starting subframe is the subframe corresponding to the PO, the network device does not send an NRS at the foregoing locations.

Therefore, in the current technology, when no paging scheduling message exists in the NPDCCH search space whose starting subframe is the subframe corresponding to the PO, even if the terminal device is a terminal device with a good channel condition, the terminal device needs to perform blind detection on all candidate locations starting from the $1^{st}$ candidate location in the NPDCCH search space, and then can determine that no paging scheduling message exists. However, the terminal device with the good channel condition has a strong detection capability, and does not need to perform detection on repeated NPDCCHs to know whether a paging scheduling message exists. This causes extra power consumption of the terminal device with the good channel condition.

In the embodiments of this application, the terminal device with the good channel condition is a terminal device with relatively good performance in some indicators, for example, a reference signal received power (reference signal received power, RSRP) is relatively good. This is uniformly described herein, and details are not described below again.

2. WUS

Currently, a network device may transmit a WUS to a terminal device before a PO. The WUS is used to indicate whether the terminal device needs to monitor a PDCCH. When the terminal device detects a WUS before the PO, the terminal device needs to continue monitoring the PDCCH. If the terminal device does not detect a WUS before the PO, it indicates that the network device does not send a corresponding paging scheduling message in a PDCCH search space whose starting subframe is a subframe corresponding to the PO, and the terminal device does not need to monitor the PDCCH.

When the network device needs to send a WUS, the network device indicates related parameters to the terminal device by using a system message. The parameters include a first scaling factor (scaling factor), a gap (gap) between an ending location of a WUS and a PO location, and Rmax. The gap between the ending location of the WUS and the PO location may be at least one of a gap for DRX, a short gap for eDRX (extended DRX, eDRX), and a long gap for eDRX. A range of the first scaling factor is {$\frac{1}{128}$, $\frac{1}{64}$, $\frac{1}{32}$, $\frac{1}{16}$, $\frac{1}{8}$, $\frac{1}{4}$, $\frac{1}{2}$}. For related descriptions of Rmax, refer to FIG. 1. Details are not described herein again.

The terminal device obtains maximum WUS duration (maximum WUS duration) based on the following formula (3):

$$\text{Maximum WUS duration} = R\text{max} \times \text{First scaling factor} \quad \text{Formula (3)}$$

Figure 4:
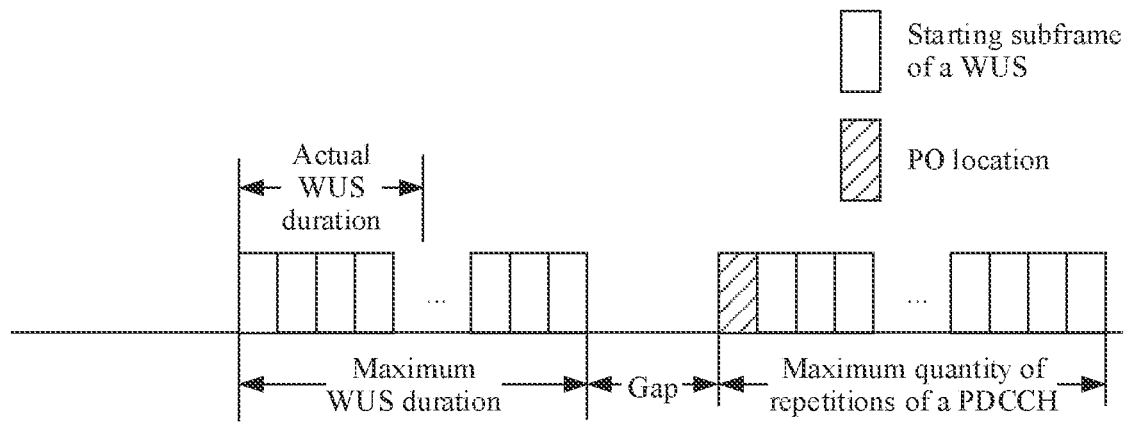
FIG. 4 is a schematic diagram of determining a starting subframe of a WUS in the current technology.

Because the PO location can be determined by using the formula (1) and the formula (2), when the PO location, the gap, and the maximum WUS duration are known, the terminal device may determine a starting location of the WUS (or a starting subframe of the WUS), as shown in FIG. 4. Actual WUS duration (WUS actual duration) in FIG. 4 includes subframes whose quantity is equal to an exponential multiple of 2, for example, 1, 2, 4, 8, . . . , or the maximum WUS duration.

Similarly, for any one of a plurality of terminal devices communicating with the network device, the network device may also determine a starting location of a WUS in the foregoing manner. Details are not described herein again.

In addition, it can be learned from the foregoing descriptions of the PO that both the terminal device and the network device may determine, by using the T, nB, and UEID parameters, all PO locations configured on the network device in one DRX period. Therefore, according to the foregoing manner of determining the starting location of the WUS, both the terminal device and the network device may determine starting locations of all WUSs configured on the network device in one DRX period. This is uniformly described herein, and details are not described below again.

Currently, in the current technology, when a terminal device detects whether a WUS exists before a paging occasion, even if a network device does not send a WUS before the paging occasion and the terminal device is a terminal device with a good channel condition, the terminal device needs to start to perform monitoring from a starting subframe of a WUS, and only after maximum WUS duration (maximum WUS duration) ends, the terminal device knows that no WUS exists. This also causes extra power consumption of the terminal device with the good channel condition.

The following describes the technical solutions in the embodiments of this application with reference to the accompanying drawings in the embodiments of this application. In the descriptions of this application, unless otherwise specified, "/" indicates an "or" relationship between associated objects. For example, A/B may indicate A or B. In this application, "and/or" describes only an association relationship for describing associated objects and indicates that three relationships may exist. For example, A and/or B may indicate the following three cases: Only A exists, both A and B exist, and only B exists. A and B may be singular or plural. In addition, in the descriptions of this application, "a plurality of" means two or more than two. "At least one of the following" or a similar expression thereof indicates any combination of the following, and includes any combination of one or more of the following. For example, at least one of a, b, or c may indicate a, b, c, a and b, a and c, b and c, or a b, and c, where a, b, and c may be singular or plural. In addition, to clearly describe the technical solutions in the embodiments of this application, terms such as "first" and "second" are used in the embodiments of this application to distinguish between same items or similar items that have a basically same function and usage. A person skilled in the art can understand that the terms such as "first" and "second" are not intended to limit a quantity or an execution sequence, and the terms such as "first" and "second" do not indicate a definite difference.

In addition, the network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 5:
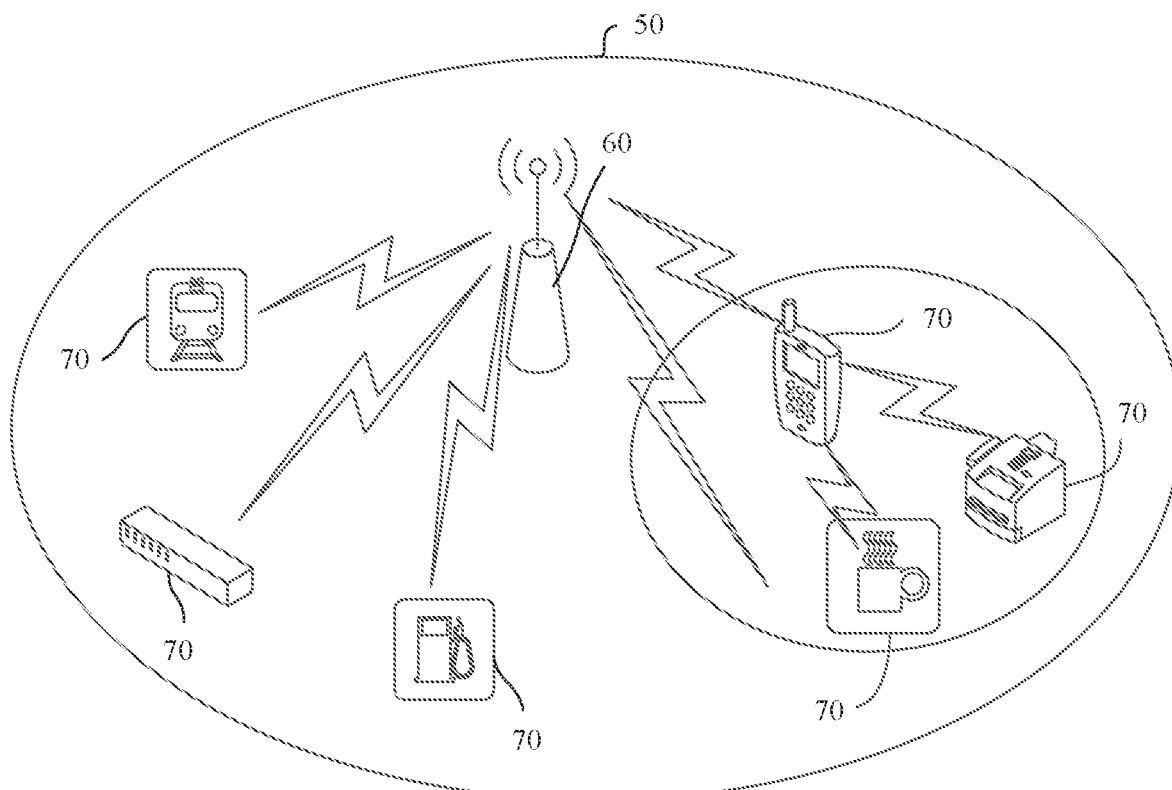
FIG. 5 is a schematic architectural diagram of a communications system according to an embodiment of this application.

FIG. 5 shows a communications system 50 according to an embodiment of this application. The communications system 50 includes a network device 60 and one or more terminal devices 70 connected to the network device 60. The following provides descriptions by using an example in which the network device 60 interacts with any terminal device 70.

When whether a paging scheduling message exists in a PDCCH search space whose starting subframe is a subframe corresponding to a PO needs to be detected, and/or whether a WUS exists before a PO is detected, the network device 60 determines a time domain resource in first duration based on a quantity of paging occasions in a discontinuous reception period, where the time domain resource is a time domain resource in a time-frequency resource used to transmit a reference signal; and then the network device 60 sends the reference signal to the terminal device 70 on the time-frequency resource. In this case, the terminal device 70 determines the time domain resource in the first duration based on the quantity of paging occasions in the discontinuous reception period, and then the terminal device 70 receives the reference signal from the network device 60 on the time-frequency resource.

Alternatively, optionally, when whether a paging scheduling message exists in a PDCCH search space whose starting subframe is a subframe corresponding to a PO needs to be detected, and/or whether a WUS exists before a PO is detected, the network device 60 determines a time domain resource in first duration, where the time domain resource is a time domain resource in a time-frequency resource used to transmit a reference signal; and then the network device 60 sends the reference signal to the terminal device 70 on the time-frequency resource. In this case, the terminal device 70 determines the time domain resource in the first duration, and then the terminal device 70 receives the reference signal from the network device 60 on the time-frequency resource. The time domain resource includes at least one of a first time domain resource and a second time domain resource. The first time domain resource includes a subframe corresponding to one or more paging occasions in the first duration, X3 subframes before a subframe corresponding to each of the one or more paging occasions, and Y3 subframes after the subframe corresponding to each of the one or more paging occasions, where X3 is an integer greater than or equal to 0, Y3 is an integer greater than or equal to 0, and a sum of X3 and Y3 is related to a third specified value. The second time domain resource includes a starting subframe of one or more wake-up signals in the first duration, X3 subframes before a starting subframe of each wake-up signal in the one or more wake-up signals, and Y3 subframes after the starting subframe of each wake-up signal in the one or more wake-up signals, where X3 is an integer greater than or equal to 0, Y3 is an integer greater than or equal to 0, and a sum of X3 and Y3 is related to a fourth specified value.

Alternatively, optionally, when whether a paging scheduling message exists in a PDCCH search space whose starting subframe is a subframe corresponding to a PO needs to be detected, and/or whether a WUS exists before a PO is detected, the network device 60 sends information about a measurement subframe to the terminal device 70, the network device 60 determines a time domain resource in first duration based on the information about the measurement subframe, where the time domain resource is a time domain resource in a time-frequency resource used to transmit a reference signal; and the network device 60 sends the reference signal to the terminal device 70 on the time-frequency resource. The terminal device 70 receives the information about the measurement subframe from the network device 60, and determines the time domain resource in the first duration based on the information about the measurement subframe, where the time domain resource is a time domain resource in the time-frequency resource used to transmit the reference signal. Then the terminal device 70 receives the reference signal from the network device 60 on the time-frequency resource.

Specific implementations of the foregoing solutions are described in detail in the following embodiments, and details are not described herein.

According to the communications system provided in this embodiment of this application, in one aspect, when detecting whether a paging scheduling message exists in a PDCCH search space whose starting subframe is a subframe corresponding to a paging occasion, and waking up at the paging occasion to monitor a PDCCH, the terminal device may perform measurement by using several reference signals in the first duration. Therefore, when a measurement result satisfies a specific condition, the terminal device may be considered as a terminal device with a good channel condition. Further, in the PDCCH search space whose starting subframe is the subframe corresponding to the paging occasion, the terminal device may determine whether a paging scheduling message exists by performing blind detection only on some candidate locations, without performing blind detection on all candidate locations, thereby reducing power consumption of the terminal device. In another aspect, when detecting whether a WUS exists before a paging occasion, the terminal device may perform measurement by using several reference signals in the first duration. Therefore, when a measurement result satisfies a specific condition, the terminal device may be considered as a terminal device with a good channel condition. The terminal device starts to perform monitoring from a starting subframe of a WUS, and may terminate WUS monitoring in advance, without waiting until maximum WUS duration ends to know that no WUS exists, thereby reducing power consumption of the terminal device.

Figure 6:
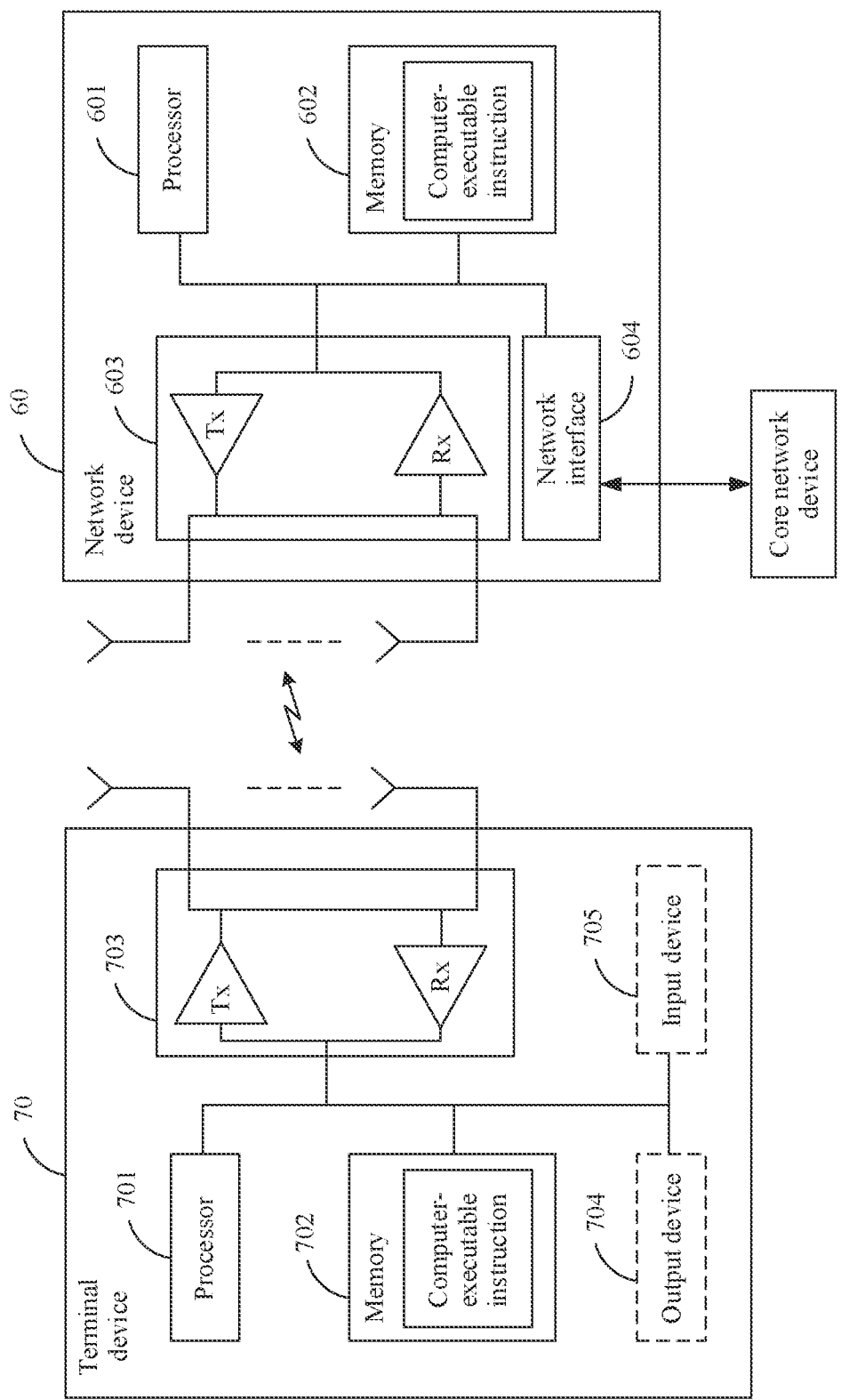
FIG. 6 is a schematic diagram of hardware structures of a terminal device and a network device according to an embodiment of this application.

FIG. 6 is a schematic diagram of hardware structures of a network device 60 and a terminal device 70 according to an embodiment of this application.

The terminal device 70 includes at least one processor 701 (in FIG. 6, descriptions are provided by using an example in which one processor 701 is included), at least one memory 702 (in FIG. 6, descriptions are provided by using an example in which one memory 702 is included), and at least one transceiver 703 (in FIG. 6, descriptions are provided by using an example in which one transceiver 703 is included). Optionally, the terminal device 70 may further include an output device 704 and an input device 705.

The processor 701, the memory 702, and the transceiver 703 are connected by using a communications line. The communications line may include a channel for transmitting information between the foregoing components.

The processor 701 may be a general-purpose central processing unit (central processing unit, CPU), a microprocessor, an application-specific integrated circuit (application-specific integrated circuit, ASIC), or one or more integrated circuits configured to control execution of programs in the solutions of this application. In a specific implementation, in an embodiment, the processor 701 may alternatively include a plurality of CPUs, and the processor 701 may be a single-CPU (single-CPU) processor or a multi-CPU (multi-CPU) processor. The processor herein may be one or more devices, a circuit, or a processing core configured to process data (for example, a computer program instruction).

The memory 702 may be a read-only memory (read-only memory, ROM), another type of static storage device that can store static information and instructions, a random access memory (random access memory, RAM), or another type of dynamic storage device that can store information and instructions; or may be an electrically erasable programmable read-only memory (electrically erasable programmable read-only memory, EEPROM), a compact disc read-only memory (compact disc read-only memory, CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this does not constitute a limitation herein. The memory 702 may exist independently and is connected to the processor 701 by using the communications line. Alternatively, the memory 702 may be integrated with the processor 701.

The memory 702 is configured to store a computer-executable instruction for executing the solutions of this application, and the processor 701 controls execution of the computer-executable instruction. Specifically, the processor 701 is configured to execute the computer-executable instruction stored in the memory 702, to implement a reference signal receiving method in the embodiments of this application. Optionally, the computer-executable instruction in this embodiment of this application may also be referred to as application program code or computer program code. This is not specifically limited in this embodiment of this application.

The transceiver 703 may be configured to communicate, by using any apparatus like a transceiver, with another device or a communications network, for example, Ethernet, a radio access network (radio access network, RAN), or a wireless local area network (wireless local area network, WLAN). The transceiver 703 includes a transmitter Tx and a receiver Rx.

The output device 704 communicates with the processor 701, and may display information in a plurality of manners. For example, the output device 704 may be a liquid crystal display (liquid crystal display, LCD), a light emitting diode (light emitting diode, LED) display device, a cathode ray tube (cathode ray tube, CRT) display device, or a projector (projector).

The input device 705 communicates with the processor 701, and may receive user input in a plurality of manners. For example, the input device 705 may be a mouse, a keyboard, a touchscreen device, or a sensing device.

The network device 60 includes at least one processor 601 (in FIG. 6, descriptions are provided by using an example in which one processor 601 is included), at least one memory 602 (in FIG. 6, descriptions are provided by using an example in which one memory 602 is included), at least one transceiver 603 (in FIG. 6, descriptions are provided by using an example in which one transceiver 603 is included), and at least one network interface 604 (in FIG. 6, descriptions are provided by using an example in which one network interface 604 is included). The processor 6A, the memory 602, the transceiver 603, and the network interface 604 are connected by using a communications line. The network interface 604 is configured to connect to a core network device by using a link (for example, an S1 interface), or connect to a network interface of another network device by using a wired or wireless link (for example, an X2 interface)(not shown in FIG. 6). This is not specifically limited in this embodiment of this application. In addition, for related descriptions of the processor 601, the memory 602, and the transceiver 603, refer to the descriptions of the processor 701, the memory 702, and the transceiver 703 in the terminal device 70. Details are not described herein again.

Optionally, the network device 60 in this embodiment of this application is a device that accesses a core network. For example, the network device 60 may be a base station, a broadband network gateway (broadband network gateway, BNG), an aggregation switch, a non-3GPP network device, or a device with a structure similar to that in FIG. 6 in a long term evolution (LTE) system (for example, the foregoing NB-IoT system), a global system for mobile communications (global system for mobile communications, GSM), a universal mobile telecommunications system (universal mobile telecommunications system, UMTS), a code division multiple access (code division multiple access, CDMA) system, or a future evolved public land mobile network (public land mobile network, PLMN). The base station may include base stations in various forms, for example, a macro base station, a micro base station (also referred to as a small cell), a relay station, or an access point. This is not specifically limited in this embodiment of this application.

Optionally, the terminal device 70 in this embodiment of this application may be a terminal, a chip, or the like. This is not specifically limited in this embodiment of this application. The terminal may be user equipment (user equipment, UE), an access terminal, a terminal unit, a terminal station, a mobile station, a mobile console, a remote station, a remote terminal, a mobile device, a wireless terminal, a terminal agent, a terminal apparatus, or a device with a structure similar to that shown in FIG. 6 in an LTE system (for example, the foregoing NB-IoT system), a GSM, a UMTS, a CDMA system, or a future evolved PLMN. The wireless terminal may be a mobile phone (or referred to as a "cellular" phone) cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, or a terminal device in a future 5G network, and or the like. This is not limited in the embodiments of this application.

The following describes in detail a reference signal sending and receiving method provided in the embodiments of this application with reference to FIG. 1 to FIG. 6.

It should be noted that names of messages between network elements in the following embodiments of this application, names of parameters in messages, or the like are merely examples, and there may be other names in a specific implementation. This is not specifically limited in the embodiments of this application.

Figure 7:
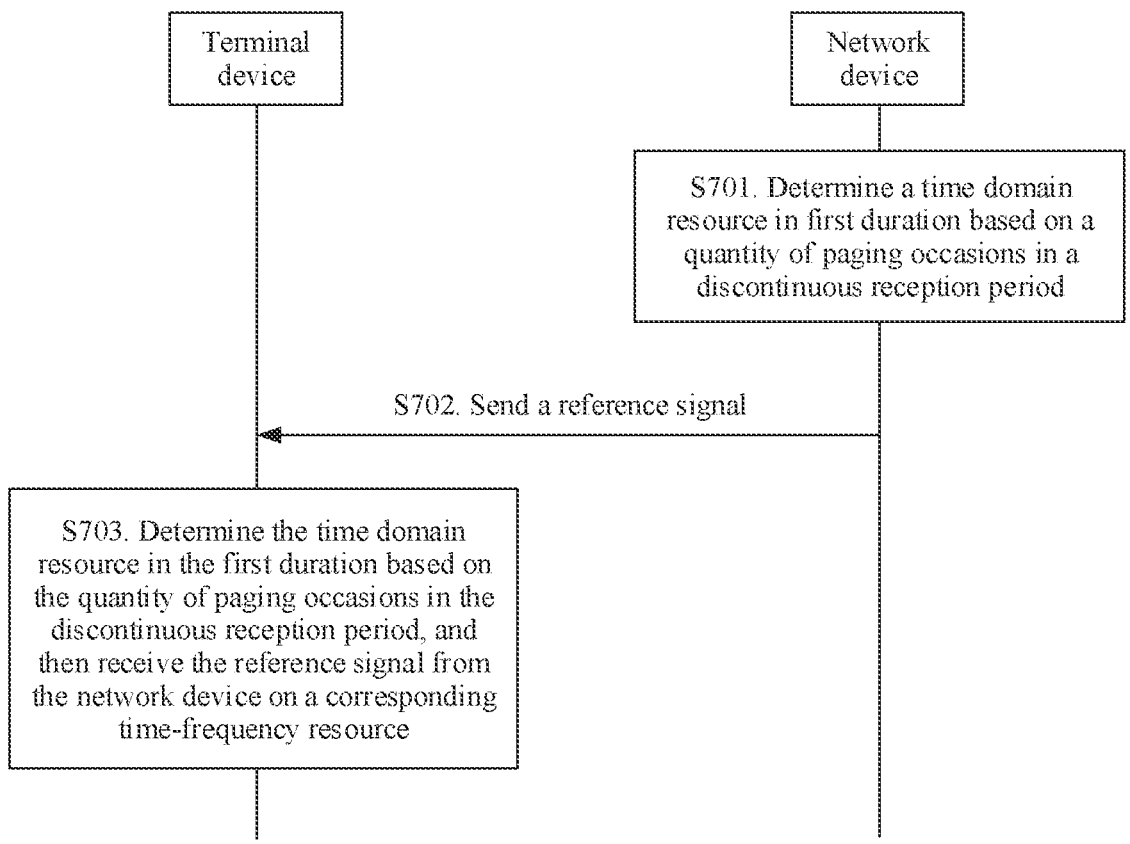
FIG. 7 is a schematic flowchart 1 of a reference signal sending and receiving method according to an embodiment of this application.

FIG. 7 shows a reference signal sending and receiving method according to an embodiment of this application. The method includes the following steps.

S701. A network device determines a time domain resource in first duration based on a quantity of paging occasions (that is, the foregoing PO) in a discontinuous reception period (that is, the foregoing DRX period), where the time domain resource is a time domain resource in a time-frequency resource used to transmit a reference signal.

S702. The network device sends the reference signal to a terminal device on the time-frequency resource.

S703. The terminal device determines the time domain resource in the first duration based on the quantity of paging occasions in the discontinuous reception period, and then receives the reference signal from the network device on the corresponding time-frequency resource.

Optionally, for example, the reference signal in steps S701 to S703 may be an NRS in an NB-IoT system, or may be another reference signal. This is not specifically limited in this embodiment of this application.

Optionally, for example, the first duration in steps S701 to S703 may be a period of time in a first period. For example, the first duration is equal to a second scaling factor multiplied by the first period. The second scaling factor herein may be equal to 1, or may be a decimal greater than 0 and less than 1. For example, the second scaling factor is equal to 0.5 or ⅓. This is not specifically limited in this embodiment of this application. The first period herein is a period related to the DRX period. For example, the first period is equal to a third scaling factor multiplied by the DRX period. The third scaling factor herein may be an integer greater than or equal to 1, for example, 1, 2, 3, . . . ; or may be a decimal greater than 0, for example, 0.5 or 1.5. This is not specifically limited in this embodiment of this application. The second scaling factor and/or the third scaling factor in this embodiment of this application may be indicated by the network device to the terminal device, or may be agreed upon in a protocol. This is not specifically limited in this embodiment of this application.

Optionally, for example, a frequency domain resource in the time-frequency resource in steps S701 to S703 may be a frequency domain resource in a time-frequency resource in which a paging occasion or a wake-up signal is currently located. In other words, the frequency domain resource in the time-frequency resource for transmitting the reference signal and the frequency domain resource in the time-frequency resource in which the paging occasion or the wake-up signal is currently located may be a same frequency domain resource.

Optionally, a frequency domain resource in the time-frequency resource in steps S701 to S703 may be alternatively not a frequency domain resource in a time-frequency resource in which a paging occasion or a wake-up signal is currently located. In other words, the frequency domain resource in the time-frequency resource for transmitting the reference signal and the frequency domain resource in the time-frequency resource in which the paging occasion or the wake-up signal is currently located may be different frequency domain resources. In this case, the network device may indicate, to the terminal device by using a first frequency domain resource indication parameter, the frequency domain resource in the time-frequency resource for transmitting the reference signal. This is not specifically limited in this embodiment of this application.

Optionally, the time domain resource in the time-frequency resource in steps S701 to S703 may include at least one of a first time domain resource and a second time domain resource. The first time domain resource includes at least one of a subframe corresponding to one or more paging occasions in the first duration, X1 subframes before a subframe corresponding to each of the one or more paging occasions, or Y subframes after the subframe corresponding to each of the one or more paging occasions, where X is an integer greater than or equal to 0, Y1 is an integer greater than or equal to 0, and a sum of X1 and Y1 is related to the quantity of paging occasions in the DRX period. In a specific implementation, the first time domain resource includes a subframe corresponding to one or more paging occasions in the first duration, X1 subframes before a subframe corresponding to each of the one or more paging occasions, and Y1 subframes after the subframe corresponding to each of the one or more paging occasions, where X1 is an integer greater than or equal to 0, Y1 is an integer greater than or equal to 0, and a sum of X1 and Y1 is related to the quantity of paging occasions in the DRX period.

The second time domain resource includes at least one of a starting subframe of one or more wake-up signals in the first duration, X2 subframes before a starting subframe of each wake-up signal in the one or more wake-up signals, or Y2 subframes after the starting subframe of each wake-up signal in the one or more wake-up signals, where X2 is an integer greater than or equal to 0, Y2 is an integer greater than or equal to 0, and a sum of X2 and Y2 is related to the quantity of paging occasions in the DRX period. In a specific implementation method, the second time domain resource includes a starting subframe of one or more wake-up signals in the first duration. X2 subframes before a starting subframe of each wake-up signal in the one or more wake-up signals, and Y2 subframes after the starting subframe of each wake-up signal in the one or more wake-up signals, where X2 is an integer greater than or equal to 0, Y2 is an integer greater than or equal to 0, and a sum of X2 and Y2 is related to the quantity of paging occasions in the DRX period.

It should be noted that, in this embodiment of this application, descriptions are provided by using an example in which a quantity of subframes before a subframe corresponding to each paging occasion is the same and is X1, a quantity of subframes after a subframe corresponding to each paging occasion is the same and is Y1, a quantity of subframes before a starting subframe of each wake-up signal is the same and is X2, and a quantity of subframes after a starting subframe of each wake-up signal is the same and is Y2. Certainly, quantities of subframes before subframes corresponding to different paging occasions may be different, or quantities of subframes after subframes corresponding to different paging occasions may be different, or quantities of subframes before starting subframes of different wake-up signals may be different, or quantities of subframes after starting subframes of different wake-up signals may be different. This is not specifically limited in this embodiment of this application.

Optionally, in this embodiment of this application, that a sum of X1 and Y1 is related to the quantity of paging occasions in the DRX period may include: The sum of X1 and Y1 is related to the quantity of paging occasions in the DRX period, the DRX period, and a first specified value. In this embodiment of this application, at least one of the quantity of paging occasions in the DRX period, the DRX period, and the first specified value may be agreed upon in a protocol, or may be configured by the network device for the terminal device. This is not specifically limited in this embodiment of this application.

Optionally, in this embodiment of this application, that a sum of X2 and Y2 is related to the quantity of paging occasions in the DRX period may include: The sum of X2 and Y2 is related to the quantity of paging occasions in the DRX period, the DRX period, and a second specified value. In this embodiment of this application, at least one of the quantity of paging occasions in the DRX period, the DRX period, and the second specified value may be agreed upon in a protocol, or may be configured by the network device for the terminal device. This is not specifically limited in this embodiment of this application.

Optionally, the time domain resource in the time-frequency resource in steps S701 to S703 may include at least one of a third time domain resource and a fourth time domain resource. The third time domain resource includes at least one of subframes corresponding to N3 paging occasions in every M3 paging occasions of all paging occasions in the first duration, X5 subframes before a subframe corresponding to each of the N3 paging occasions in every M3 paging occasions, or Y5 subframes after the subframe corresponding to each of the N3 paging occasions in every M3 paging occasions, where M3 is an integer greater than or equal to 1, N3 is an integer greater than or equal to 1, M3 is greater than or equal to N3, X5 is an integer greater than or equal to 0, Y5 is an integer greater than or equal to 0, and M3 is related to the quantity of paging occasions in the discontinuous reception period. The fourth time domain resource includes at least one of starting subframes of N4 wake-up signals in every M4 wake-up signals of all wake-up signals in the first duration, X6 subframes before a starting subframe of each of the N4 wake-up signals in every M4 wake-up signals, or Y6 subframes after the starting subframe of each of the N4 wake-up signals in every M4 wake-up signals, where M4 is an integer greater than or equal to 1. N4 is an integer greater than or equal to 1, M4 is greater than or equal to N4. X6 is an integer greater than or equal to 0. Y6 is an integer greater than or equal to 0, and M4 is related to the quantity of paging occasions in the discontinuous reception period.

It should be noted that, in this embodiment of this application, descriptions are provided by using an example in which a quantity of subframes before a subframe corresponding to each paging occasion is the same and is X5, a quantity of subframes after a subframe corresponding to each paging occasion is the same and is Y5, a quantity of subframes before a starting subframe of each wake-up signal is the same and is X6, and a quantity of subframes after a starting subframe of each wake-up signal is the same and is Y6. Certainly, quantities of subframes before subframes corresponding to different paging occasions may be different, or quantities of subframes after subframes corresponding to different paging occasions may be different, or quantities of subframes before starting subframes of different wake-up signals may be different, or quantities of subframes after starting subframes of different wake-up signals may be different. This is not specifically limited in this embodiment of this application.

Optionally, in this embodiment of this application, that M3 is related to the quantity of paging occasions in the DRX period may include: M3 is related to the quantity of paging occasions in the DRX period, the DRX period, and a fifth specified value. In this embodiment of this application, at least one of the quantity of paging occasions in the DRX period, the DRX period, and the fifth specified value may be agreed upon in a protocol, or may be configured by the network device for the terminal device. This is not specifically limited in this embodiment of this application.

Optionally, in this embodiment of this application, that M4 is related to the quantity of paging occasions in the DRX period may include: M4 is related to the quantity of paging occasions in the DRX period, the DRX period, and a sixth specified value. In this embodiment of this application, at least one of the quantity of paging occasions in the DRX period, the DRX period, and the sixth specified value may be agreed upon in a protocol, or may be configured by the network device for the terminal device. This is not specifically limited in this embodiment of this application.

Scenario 1: The time domain resource in the time-frequency resource in steps S701 to S703 may include the first time domain resource.

For example, the time domain resource in the time-frequency resource in steps S701 to S703 includes the first time domain resource. In this case, the X1 subframes may be X1 consecutive subframes that are before and consecutive to the subframe corresponding to each of the one or more paging occasions, and the Y1 subframes may be Y consecutive subframes that are after and consecutive to the subframe corresponding to each of the one or more paging occasions. Alternatively, the X1 subframes may be first X1 (consecutive) subframes in Z1 subframes before the subframe corresponding to each of the one or more paging occasions, where Z1 may be notified by the network device, or may be agreed upon in a protocol, for example, it is agreed upon in the protocol that Z1 is equal to 10: and the Y1 subframes may be Y1 consecutive subframes that are after and consecutive to the subframe corresponding to each of the one or more paging occasions.

For example, the sum of X1 and Y1 satisfies the following formula (4):

$$X1+Y1=\min\{4T/nB, a\}-1 \qquad \text{Formula (4)}$$

nB indicates the quantity of paging occasions in the DRX period, and may also be referred to as paging density, T indicates the DRX period, and a is the first specified value. It is assumed that PO locations are shown in FIG. 3 and $16 \leq a < 32$.

Figure 8:
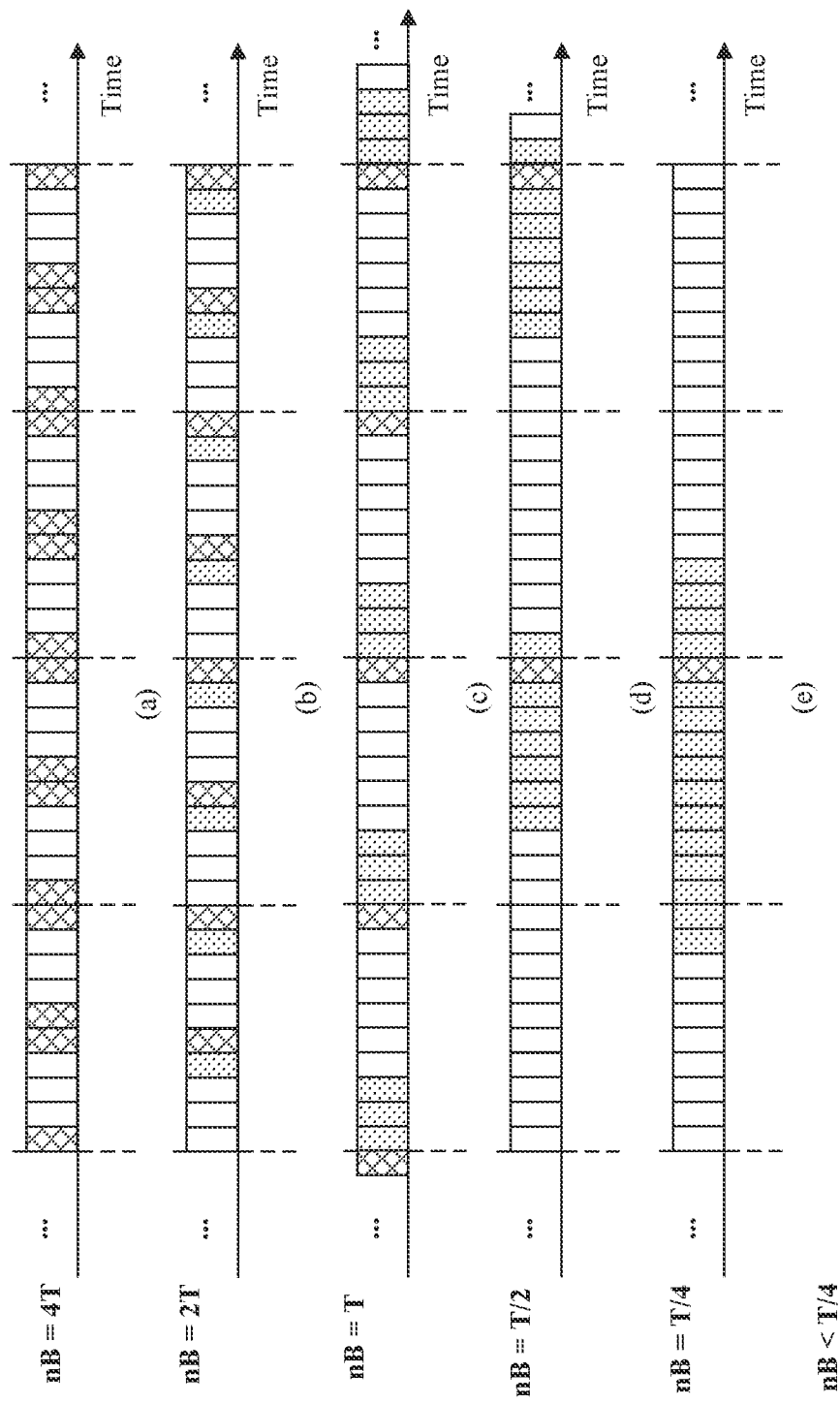
FIG. 8 is a schematic diagram 1 of a time domain resource corresponding to a reference signal according to an embodiment of this application.

When nB=4T and X1+Y1=0, the time domain resource corresponding to the reference signal may be shown in (a) in FIG. 8, that is, the time domain resource includes a subframe corresponding to each paging occasion in the first duration, for example, a subframe 0, a subframe 4, a subframe 5, and a subframe 9 in a system frame in which the paging occasion is located.

When nB=2T and X1+Y1=1, assuming that X1=1 and Y1=0, the time domain resource corresponding to the reference signal may be shown in (b) in FIG. 8, that is, the time domain resource includes a subframe corresponding to each paging occasion in the first duration and one subframe that is before and consecutive to the subframe corresponding to each paging occasion, for example, a subframe 3, a subframe 4, a subframe 8, and a subframe 9 in a system frame in which the paging occasion is located.

When nB=T and X1+Y1=3, assuming that X1=0 and Y1=3, the time domain resource corresponding to the reference signal may be shown in (c) in FIG. 8, that is, the time domain resource includes a subframe corresponding to each paging occasion in the first duration and three consecutive subframes that are after and consecutive to the subframe corresponding to each paging occasion, for example, a subframe 9 in a system frame in which the paging occasion is located, and a subframe 0, a subframe 1, and a subframe 2 in a next system frame that is consecutive to the system frame in which the paging occasion is located.

When nB=T/2 and X1+Y1=7, assuming that X1=6 and Y1=1, the time domain resource corresponding to the reference signal may be shown in (d) in FIG. 8, that is, the time domain resource includes a subframe corresponding to each paging occasion in the first duration, six consecutive subframes that are before and consecutive to the subframe corresponding to each paging occasion, and one subframe that is after and consecutive to the subframe corresponding to each paging occasion, for example, a subframe 3 to a subframe 9 in a system frame in which the paging occasion is located, and a subframe 0 in a next system frame that is consecutive to in the system frame in which the paging occasion is located.

When nB=T/4 and X1+Y1=15, assuming that X1=11 and Y1=4, the time domain resource corresponding to the reference signal may be shown in (e) in FIG. 8, that is, the time domain resource includes a subframe corresponding to each paging occasion in the first duration, 11 consecutive subframes that are before and consecutive to the subframe corresponding to each paging occasion, and four consecutive subframes that are after and consecutive to the subframe corresponding to each paging occasion, for example, a subframe 8 and a subframe 9 in a previous system frame that is consecutive to a system frame in which the paging occasion is located, a subframe 0 to a subframe 9 in the system frame in which the paging occasion is located, and a subframe 0 to a subframe 3 in a next system frame that is consecutive to the system frame in which the PO is located.

When nB<T/4 and X1+Y1=a−1, for details about the time domain resource corresponding to the reference signal, refer to (a) to (e) in FIG. 8. Details are not described herein again.

Optionally, in this embodiment of this application, the sum of X1 and Y1 may be determined by the network device based on the quantity of paging occasions in the DRX period, the DRX period, and the first specified value, for example, determined based on the formula (4); or the sum of X1 and Y1 is a specified value corresponding to the quantity of paging occasions in the DRX period, for example, as shown in Table 1 or Table 2. This is not specifically limited in this embodiment of this application.

TABLE 1

| nB | X1 + Y1 + 1 |
|---|---|
| 4T | 1 |
| 2T | 2 |
| T | 4 |
| T/2 | 8 |
| T/4 | 16 |
| <T/4 | a |

TABLE 2

| nB | X1 + Y1 |
|---|---|
| 4T | 0 |
| 2T | 1 |
| T | 3 |
| T/2 | 7 |
| T/4 | 15 |
| <T/4 | a − 1 |

Optionally in this embodiment of this application, a subframe on the first time domain resource may include a normal subframe, or may include a valid (valid) subframe. This is not specifically limited in this embodiment of this application. When all subframes on the first time domain resource are valid subframes, a subframe corresponding to a paging occasion may be a subframe in which the paging occasion is located, or may be the $1^{st}$ valid subframe after the paging occasion, the X1 (consecutive) subframes are X1 (consecutive) valid subframes, and the Y1 (consecutive) subframes are Y1 (consecutive) valid subframes. This is uniformly described herein, and details are not described below again.

Figure 9:
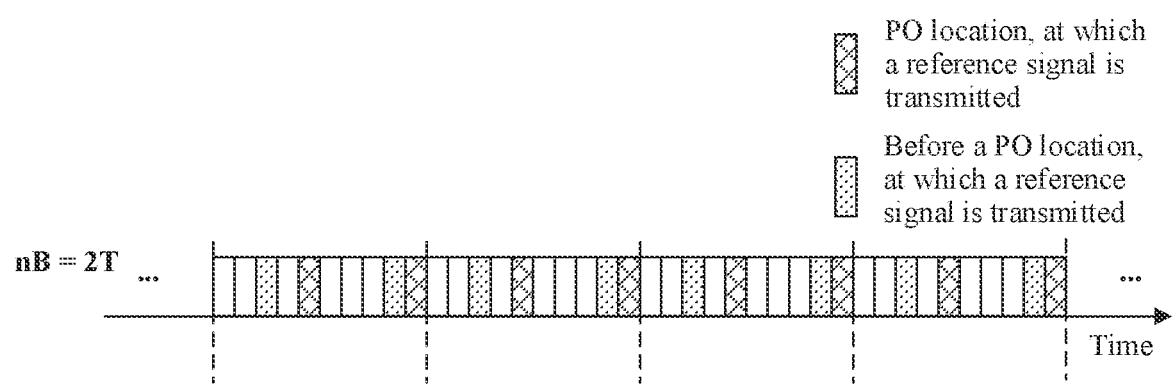
FIG. 9 is a schematic diagram 2 of a time domain resource corresponding to a reference signal according to an embodiment of this application.

In this embodiment of this application, consecutive valid subframes mean that no other valid subframe exists between two valid subframes. For example, it is assumed that, in (b) in FIG. 8, the subframe 3 in the system frame in which the paging occasion is located is not a valid subframe and a subframe 2 in the system frame in which the paging occasion is located is a valid subframe. In this case, the time domain resource corresponding to the reference signal may include the subframe 2, the subframe 4, the subframe 8, and the subframe 9 in the system frame in which the paging occasion is located, as shown in FIG. 9.

Optionally in the scenario 1, the reference signal sending and receiving method provided in this embodiment of this application may further include: The network device sends first configuration information of the reference signal to the terminal device. The first configuration information includes at least one of X1, Y1, the first period (period), the first duration, an offset (offset) of the first duration in the first period, and a quantity of repetitions of the first duration. This is not specifically limited in this embodiment of this application.

For related descriptions of the first period and the first duration, refer to the foregoing part. Details are not described herein again. The offset of the first duration in the first period may be S1 system frames or S2 subframes, where S1 is 0 or a positive integer, and S2 is 0 or a positive integer. The quantity of repetitions of the first duration is a positive integer, (the first duration×the quantity of repetitions of the first duration) is less than or equal to duration of the first period, and the offset of the first duration in the first period is less than or equal to a difference between the duration of the first period and (the first duration×the quantity of repetitions of the first duration). This is uniformly described herein, and details are not described below again.

In this way, after receiving the first configuration information from the network device, the terminal device may determine the time domain resource in the first duration or a time domain resource in the first period based on the first configuration information and the quantity of paging occasions in the DRX period. For example, assuming that the first configuration information includes the first duration and at least one of X1 and Y1, the terminal device may determine the time domain resource in the first duration based on the first configuration information and the quantity of paging occasions in the DRX period. Alternatively, for example, assuming that the first configuration information includes at least one of X1 and Y1, at least one of the offset of the first duration in the first period and the quantity of repetitions of the first duration, the first period, and the first duration, the terminal device may determine the time domain resource in the first period based on the first configuration information and the quantity of paging occasions in the DRX period. This is not specifically limited in this embodiment of this application.

Figure 10:
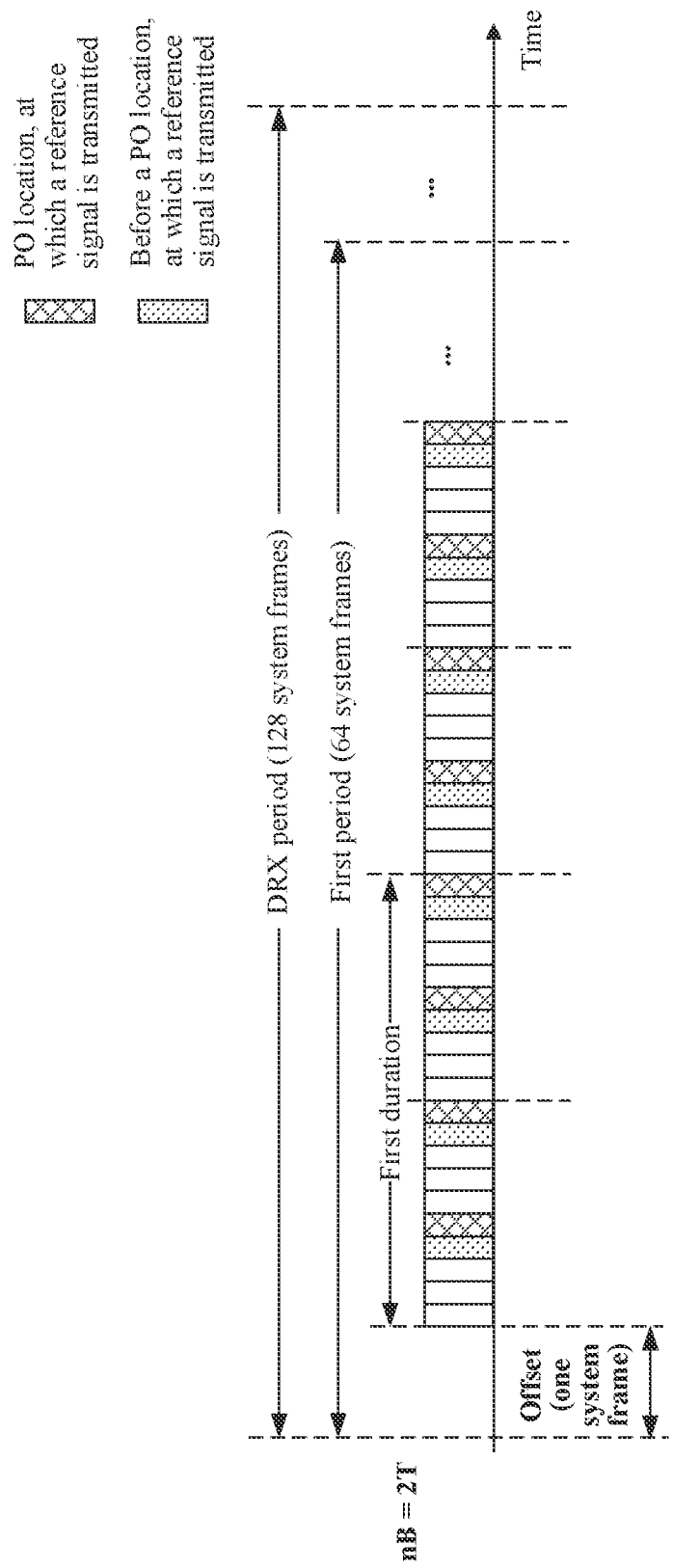
FIG. 10 is a schematic diagram 3 of a time domain resource corresponding to a reference signal according to an embodiment of this application.

For example, it is assumed that the DRX period=128 system frames, the first period=0.5×the DRX period=64 system frames, the first duration=(1/32)×the first period, the offset of the first duration in the first period is one system frame, the quantity of repetitions of the first duration is 2, and when nB=2T, the time domain resource corresponding to the reference signal is shown in (b) in FIG. 8. In this case, when nB=2T, the time domain resource in the first period may include a subframe 3, a subframe 4, a subframe 8, and a subframe 9 in the $2^{nd}$ system frame to the $5^{th}$ system frame in the first period, as shown in FIG. 10.

Optionally, the foregoing embodiment is described by using an example in which the network device sends the first configuration information to the terminal device. The network device may send the first configuration information to the terminal device in a system message or higher layer signaling. For example, the system message may be a system information block (system information block, SIB) or a master information block (master information block, MIB), and the higher layer signaling may be radio resource control (radio resource control, RRC) signaling. This is not specifically limited in this embodiment of this application.

Optionally, all information of X, Y1, the first period, the first duration, the offset of the first duration in the first period, and the quantity of repetitions of the first duration may be configured by the network device for the terminal device, that is, the first configuration information includes X1, Y1, the first period, the first duration, the offset of the first duration in the first period, and the quantity of repetitions of the first duration. Alternatively, all information of X1, Y1, the first period, the first duration, the offset of the first duration in the first period, and the quantity of repetitions of the first duration may be agreed upon in a protocol. In this case, the network device does not need to send the first configuration information to the terminal device. Alternatively, some information of X1, Y1, the first period, the first duration, the offset of the first duration in the first period, and the quantity of repetitions of the first duration may be configured by the network device for the terminal device, and some information of X1, Y1, the first period, the first duration, the offset of the first duration in the first period, and the quantity of repetitions of the first duration may be agreed upon in a protocol. For example, the first configuration information may include at least one of X1 or Y1, and the first period, the first duration, the offset of the first duration in the first period, and the quantity of repetitions of the first duration may be agreed upon in the protocol. This is not specifically limited in this embodiment of this application.

Optionally, if the reference signal sending and receiving method provided in this embodiment of this application is used in an NB-IoT system, on a non-anchor carrier, when no paging scheduling message exists in an NPDCCH search space whose starting subframe is a subframe corresponding to a PO, the network device may send an NRS to the terminal device on a corresponding time-frequency resource, where a time domain resource in the time-frequency resource is the first time domain resource, so that the terminal device may perform measurement based on the NRS. When a paging scheduling message exists in an NPDCCH search space whose starting subframe is a subframe corresponding to a PO, the network device may send an NRS to the terminal device on a corresponding time-frequency resource, where a time domain resource in the time-frequency resource is the first time domain resource, so that the terminal device may perform measurement based on the NRS. In addition, the network device sends an NRS at a candidate location at which the paging scheduling message can be detected, in 10 subframes before the $1^{st}$ subframe at the candidate location, and in four subframes after the last subframe at the candidate location, so that the terminal device may perform demodulation based on the NRS. When the NRS used for demodulation and the NRS used for measurement overlap (overlap), the network device sends the NRSs by using a union set of the time-frequency resource, and the candidate location at which the paging scheduling message can be detected, the 10 subframes before the $1^{st}$ subframe at the candidate location, and the four subframes after the last subframe at the candidate location.

Figure 11:
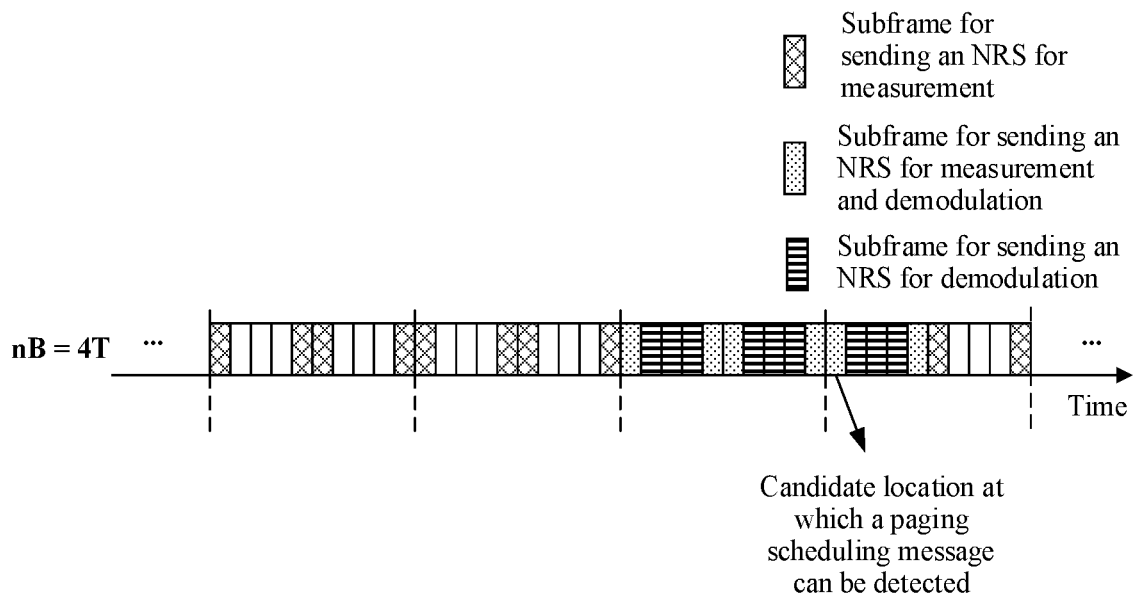
FIG. 11 is a schematic diagram 4 of a time domain resource corresponding to a reference signal according to an embodiment of this application.

For example, as shown in FIG. 11, nB=4T, and the first duration is four system frames. In this case, according to the foregoing manner of determining the first time domain resource, it is assumed that the network device may send an NRS at each PO in the first duration for measurement. When a subframe 0 in the $4^{th}$ system frame in FIG. 11 is the candidate location at which the paging scheduling message can be detected (that is, assuming that the candidate location at which the paging scheduling message can be detected occupies one subframe), the network device may send an NRS in the subframe 0 in the $4^{th}$ system frame in FIG. 11, 10 subframes before the subframe 0 in the $4^{th}$ system frame in FIG. 11, and four subframes after the subframe 0 in the $4^{th}$ system frame in FIG. 11 for demodulation. To sum up, the network device may send an NRS in a subframe 0, a subframe 4, a subframe 5, and a subframe 9 in the $1^1$ system frame and the $2^{nd}$ system frame, all subframes in the $3^{rd}$ system frame, and the subframe 0, a subframe 1, a subframe 2, a subframe 3, a subframe 4, a subframe 5, and a subframe 9 in the $4^{th}$ system frame. In this case, a subframe 0, a subframe 4, a subframe 5, and a subframe 9 in the $3^{rd}$ system frame, and the subframe 0 and the subframe 4 in the $4^{th}$ system frame may be used to not only send an NRS for measurement, but also send an NRS for demodulation, in other words, the network device sends an NRS in the foregoing subframes for both measurement and demodulation.

When the terminal device monitors a PDCCH in a PDCCH search space whose starting subframe is a subframe corresponding to a paging occasion, because the terminal device does not know whether a paging scheduling message exists, the terminal device performs measurement by using an NRS that definitely exists in a subframe, and performs demodulation by using an NRS that possibly exists at a candidate location at which a paging scheduling message can be detected, in 10 subframes before the $1^{st}$ subframe at the candidate location, and in four subframes after the last subframe at the candidate location. This is uniformly described herein, and details are not described below again.

Figure 12:
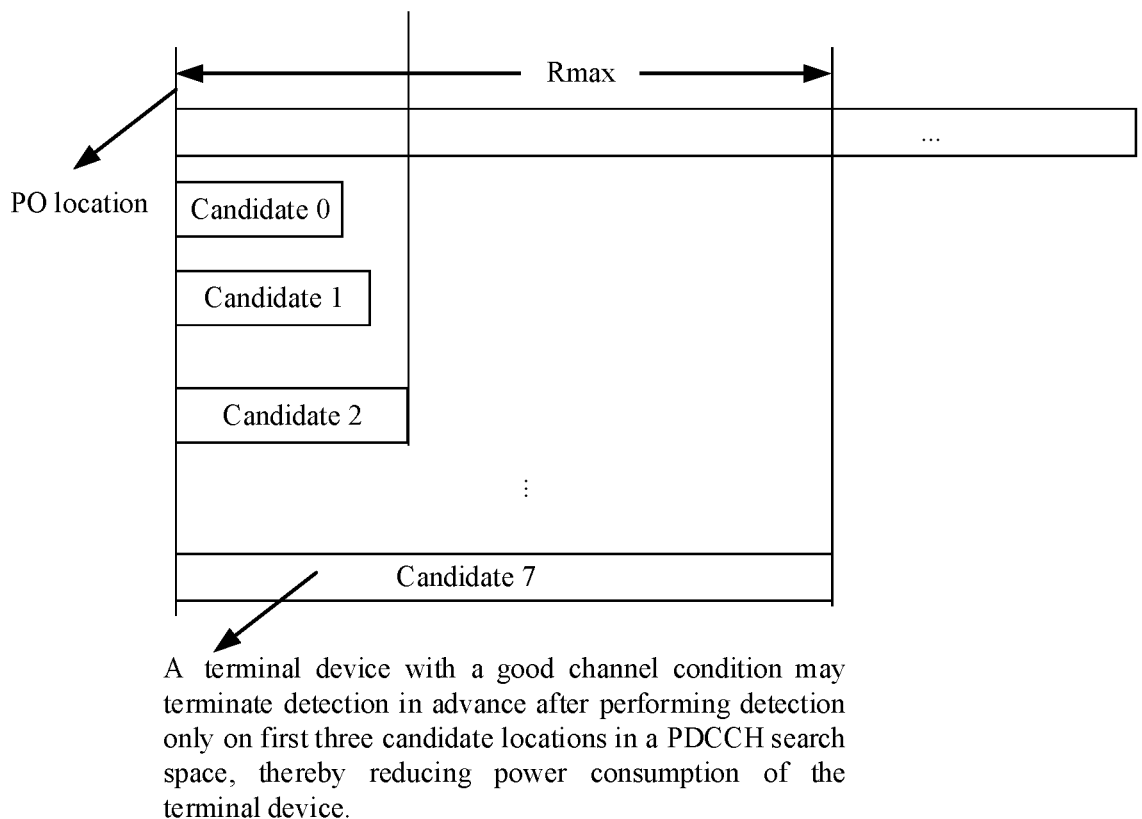
FIG. 12 is a schematic diagram of performing detection in an NPDCCH search space in an NB-IoT system according to an embodiment of this application.

Optionally, in this embodiment of this application, when detecting whether a paging scheduling message exists in a PDCCH search space whose starting subframe is a subframe corresponding to a PO, and waking up at the paging occasion to monitor a PDCCH, the terminal device may determine a time domain resource in the first duration based on the quantity of paging occasions in the discontinuous reception period, receive a reference signal from the network device on a corresponding time-frequency resource, and then perform measurement by using the reference signal to obtain a measurement result, for example, perform RSRP measurement to obtain a signal to interference plus noise ratio (signal to interference plus noise ratio. SINR). When the measurement result satisfies a specific condition, the terminal device may be considered as a terminal device with a good channel condition. Further, in the PDCCH search space whose starting subframe is the subframe corresponding to the paging occasion, the terminal device may determine whether a paging scheduling message exists by performing blind detection only on some candidate locations, without performing blind detection on all candidate locations. For example, as shown in FIG. 12, a covered terminal device may terminate detection in advance after performing detection only on first three candidate locations in a PDCCH search space, thereby reducing power consumption of the terminal device.

Scenario 2: The time domain resource in the time-frequency resource in steps S701 to S703 may include the second time domain resource.

For example, the time domain resource in the time-frequency resource in steps S701 to S703 includes the second time domain resource. In this case, the X2 subframes may be X2 consecutive subframes that are before and consecutive to the starting subframe of each of the one or more wake-up signals, and the Y2 subframes may be Y2 consecutive subframes that are after and consecutive to the starting subframe of each of the one or more wake-up signals. Alternatively, the X2 subframes may be first X2 consecutive subframes in Z2 subframes before the starting subframe of each of the one or more paging wake-up signals, where Z2 may be notified by the network device, or may be agreed upon in a protocol, for example, it is agreed upon in the protocol that Z2 is equal to 10; and the Y2 subframes may be Y2 consecutive subframes that are after and consecutive to the starting subframe of each of the one or more wake-up signals.

For example, the sum of X2 and Y2 satisfies the following formula (5).

$$X2+Y2=\min\{4T/nB,b\}-1 \qquad \text{Formula (5)}$$

nB indicates the quantity of paging occasions in the DRX period, and may also be referred to as paging density. T indicates the DRX period, and b is the second specified value, and may be agreed upon in a protocol, or may be configured by the network device, where this is not specifically limited in this embodiment of this application.

For example, it is assumed that PO locations are shown in FIG. 3, 16≤a<32, a gap=30 ms, and maximum WUS duration=2 ms.

Figure 13:
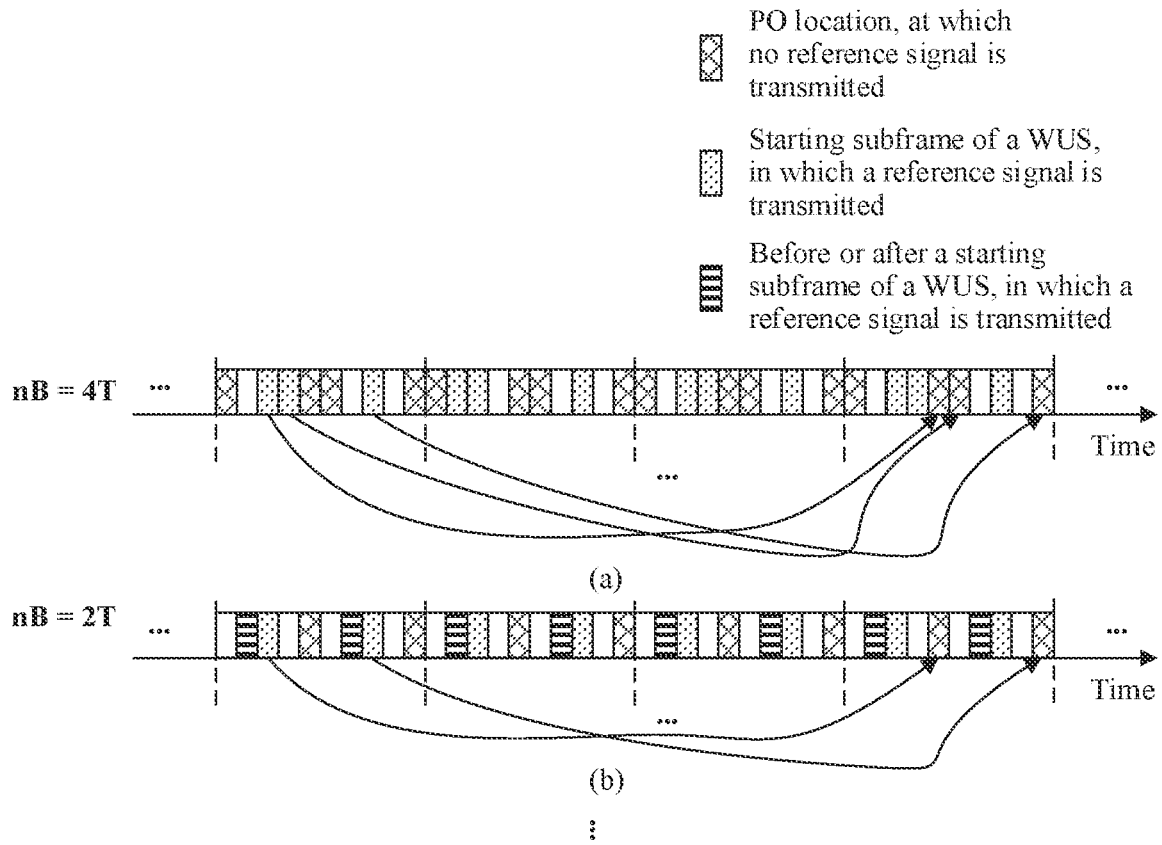
FIG. 13 is a schematic diagram 5 of a time domain resource corresponding to a reference signal according to an embodiment of this application.

When nB=4T and X2+Y2=0, it is assumed that a starting subframe of a WUS corresponding to each PO location is shown in (a) in FIG. 13. A starting subframe of a WUS corresponding to a subframe 4 in the $4^{th}$ system frame that is shown is a subframe 2 in the $1^{st}$ system frame that is shown, a starting subframe of a WUS corresponding to a subframe 5 in the $4^{th}$ system frame that is shown is a subframe 3 in the $1^{st}$ system frame that is shown, a starting subframe of a WUS corresponding to a subframe 9 in the $4^{th}$ system frame that is shown is a subframe 7 in the $1^{st}$ system frame that is shown, a starting subframe of a WUS corresponding to a subframe 4 in the $5^{th}$ system frame that is not shown is a subframe 2 in the $2^{nd}$ system frame that is shown, a starting subframe of a WUS corresponding to a subframe 5 in the $5^{th}$ system frame that is not shown is a subframe 3 in the $2^{nd}$ system frame that is shown, a starting subframe of a WUS corresponding to a subframe 9 in the $5^{th}$ system frame that is not shown is a subframe 7 in the $2^{nd}$ system frame that is shown, a starting subframe of a WUS corresponding to a subframe 4 in the $6^{th}$ system frame that is not shown is a subframe 2 in the $3^{rd}$ system frame that is shown, a starting subframe of a WUS corresponding to a subframe 5 in the $6^{th}$ system frame that is not shown is a subframe 3 in the $3^{rd}$ system frame that is shown, a starting subframe of a WUS corresponding to a subframe 9 in the $6^{th}$ system frame that is not shown is a subframe 7 in the $3^{rd}$ system frame that is shown, a starting subframe of a WUS corresponding to a subframe 4 in the $7^{th}$ system frame that is not shown is a subframe 2 in the $4^{th}$ system frame that is shown, a starting subframe of a WUS corresponding to a subframe 5 in the $7^{th}$ system frame that is not shown is a subframe 3 in the $4^{th}$ system frame that is shown, and a starting subframe of a WUS corresponding to a subframe 9 in the $7^{th}$ system frame that is not shown is a subframe 7 in the $4^{th}$ system frame that is shown. In this case, the time domain resource corresponding to the reference signal may be shown in (a) in FIG. 13, that is, the time domain resource includes a starting subframe of each wake-up signal in the first duration, for example, a subframe 2, a subframe 3, and a subframe 7 in a system frame in which the starting subframe of the wake-up signal is located.

When nB=2T and X1+Y1=1, it is assumed that a starting subframe of a WUS corresponding to each PO location is shown in (b) in FIG. 13. A starting subframe of a WUS corresponding to a subframe 4 in the $4^{th}$ system frame that is shown is a subframe 2 in the $1^{st}$ system frame that is shown, a starting subframe of a WUS corresponding to a subframe 9 in the $4^{th}$ system frame that is shown is a subframe 7 in the $1^{st}$ system frame that is shown, a starting subframe of a WUS corresponding to a subframe 4 in the $5^{th}$ system frame that is not shown is a subframe 2 in the $2^{nd}$ system frame that is shown, a starting subframe of a WUS corresponding to a subframe 9 in the $5^{th}$ system frame that is not shown is a subframe 7 in the $2^{nd}$ system frame that is shown, a starting subframe of a WUS corresponding to a subframe 4 in the $6^{th}$ system frame that is not shown is a subframe 2 in the $3^{rd}$ system frame that is shown, a starting subframe of a WUS corresponding to a subframe 9 in the $6^{th}$ system frame that is not shown is a subframe 7 in the $3^{rd}$ system frame that is shown, a starting subframe of a WUS corresponding to a subframe 4 in the $7^{th}$ system frame that is not shown is a subframe 2 in the $4^{th}$ system frame that is shown, and a starting subframe of a WUS corresponding to a subframe 9 in the $7^{th}$ system frame that is not shown is a subframe 7 in the $4^{th}$ system frame that is shown. In this case, the time domain resource corresponding to the reference signal may be shown in (b) in FIG. 13, that is, the time domain resource includes a starting subframe of each wake-up signal in the first duration and one subframe that is before and consecutive to the starting subframe of each wake-up signal, for example, a subframe 1, a subframe 2, a subframe 6, and a subframe 7 in a system frame in which the starting subframe of the wake-up signal is located.

When nB=T and X2+Y2=3, or nB=T/2 and X2+Y2=7, or nB=T/4 and X2+Y2=15, or nB<T/4 and X2+Y2=a−1, for details about the time domain resource corresponding to the reference signal, refer to (a) and (b) in FIG. 13. Details are not described herein again.

Optionally, in this embodiment of this application, the sum of X2 and Y2 may be determined by the network device based on the quantity of paging occasions in the DRX period, the DRX period, and the second specified value, for example, determined based on the formula (5); or the sum of X2 and Y2 is a specified value corresponding to the quantity of paging occasions in the DRX period, for example, as shown in Table 3 or Table 4. This is not specifically limited in this embodiment of this application.

TABLE 3

| nB | X1 + Y1 + 1 |
|---|---|
| 4T | 1 |
| 2T | 2 |
| T | 4 |
| T/2 | 8 |
| T/4 | 16 |
| <T/4 | b |

TABLE 4

| nB | X1 + Y1 |
|---|---|
| 4T | 0 |
| 2T | 1 |
| T | 3 |
| T/2 | 7 |
| T/4 | 15 |
| <T/4 | b − 1 |

Optionally, in this embodiment of this application, a subframe on the second time domain resource may include a normal subframe, or may include a valid (valid) subframe. This is not specifically limited in this embodiment of this application. Because a starting subframe of a wake-up signal is a valid subframe, when all subframes on the second time domain resource are valid subframes, the X2 (consecutive) subframes are X2 (consecutive) valid subframes, and the Y2 (consecutive) subframes are Y2 (consecutive) valid subframes. This is uniformly described herein, and details are not described below again.

Figure 14:
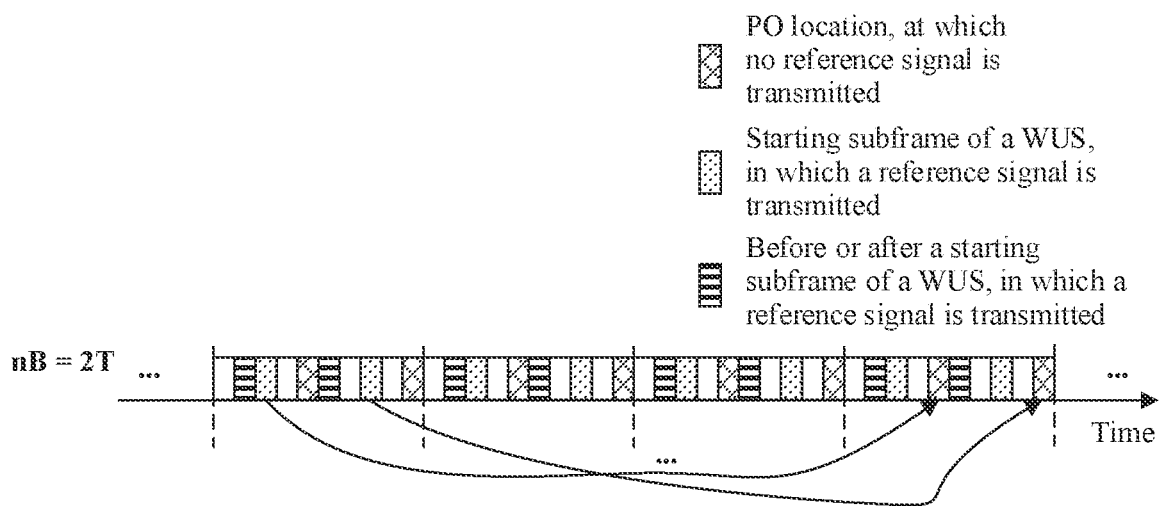
FIG. 14 is a schematic diagram 6 of a time domain resource corresponding to a reference signal according to an embodiment of this application.

In this embodiment of this application, consecutive valid subframes mean that no other valid subframe exists between two valid subframes. For example, it is assumed that, in (b) in FIG. 13, the subframe 6 in the system frame in which the starting subframe of the wake-up signal is located is not a valid subframe, and a subframe 5 in the system frame in which the starting subframe of the wake-up signal is located is a valid subframe. In this case, the time domain resource corresponding to the reference signal may include the subframe 1, the subframe 2, the subframe 5, and the subframe 7 in the system frame in which the starting subframe of the wake-up signal is located, as shown in FIG. 14.

Optionally, in the scenario 2, the reference signal sending and receiving method provided in this embodiment of this application may further include: The network device sends second configuration information of the reference signal to the terminal device. The second configuration information includes at least one of X2. Y2, the first period, the first duration, an offset of the first duration in the first period, and a quantity of repetitions of the first duration. This is not specifically limited in this embodiment of this application.

For related descriptions of the first period, the first duration, and the offset of the first duration in the first period, refer to the scenario 1. Details are not described herein again.

In this way, after receiving the second configuration information from the network device, the terminal device may determine the time domain resource in the first duration or a time domain resource in the first period based on the second configuration information and the quantity of paging occasions in the DRX period. For example, assuming that the second configuration information includes the first duration and at least one of X2 and Y2, the terminal device may determine the time domain resource in the first duration based on the second configuration information and the quantity of paging occasions in the DRX period. Alternatively, for example, assuming that the second configuration information includes at least one of X2 and Y2, at least one of the offset of the first duration in the first period and the quantity of repetitions of the first duration, the first period, and the first duration, the terminal device may determine the time domain resource in the first period based on the second configuration information and the quantity of paging occasions in the DRX period. This is not specifically limited in this embodiment of this application.

Figure 15:
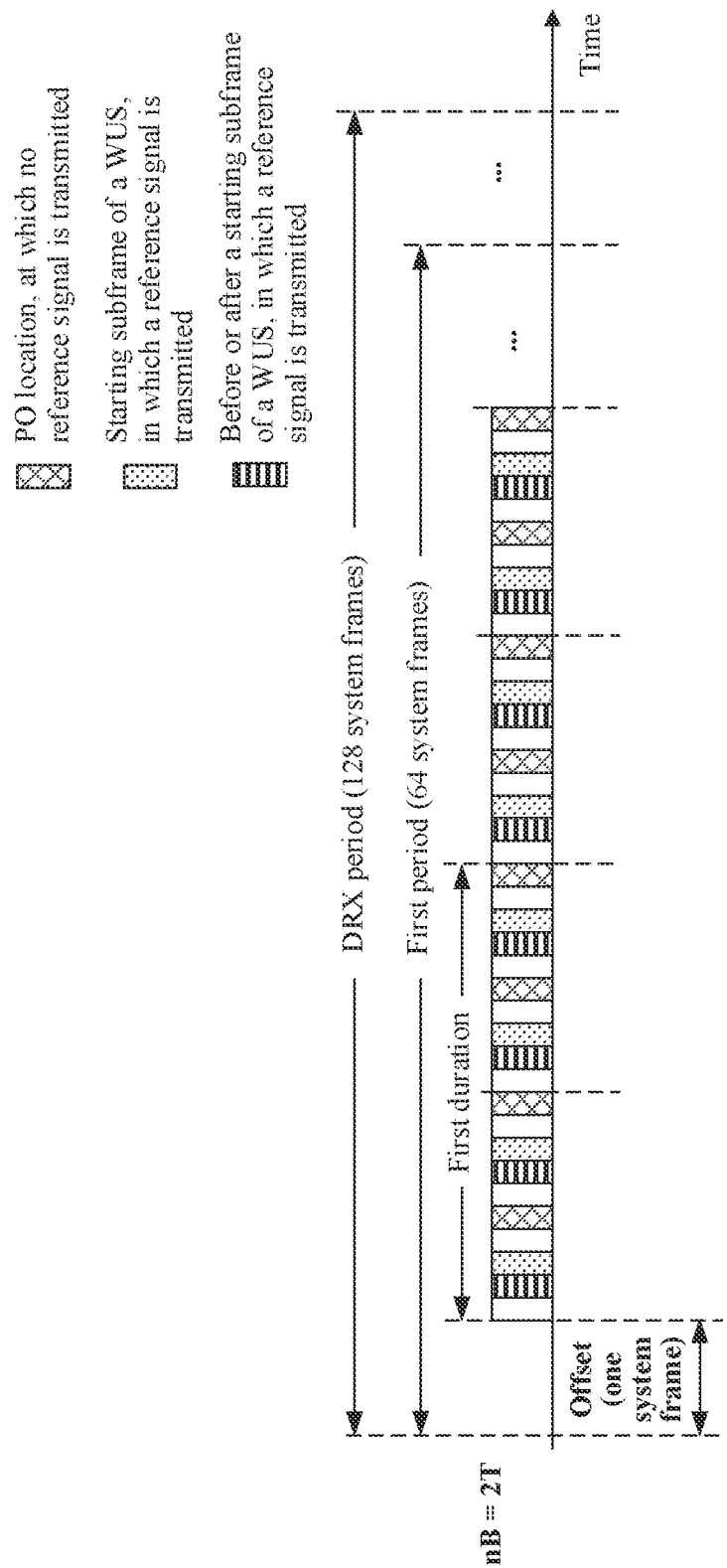
FIG. 15 is a schematic diagram 7 of a time domain resource corresponding to a reference signal according to an embodiment of this application.

For example, it is assumed that the DRX period=128 system frames, the first period=0.5×the DRX period=64 system frames, the first duration=(1/32)×the first period, the offset of the first duration in the first period is one system frame, the quantity of repetitions of the first duration is 2, and when nB=2T, the time domain resource corresponding to the reference signal is shown in (b) in FIG. 13. In this case, when nB=2T, the time domain resource in the first period may include a subframe 1, a subframe 2, a subframe 6, and a subframe 7 in the $2^{nd}$ system frame to the $5^{th}$ system frame in the first period, as shown in FIG. 15.

Optionally, the foregoing embodiment is described by using an example in which the network device sends the second configuration information to the terminal device. The network device may send the second configuration information to the terminal device in a system message or higher layer signaling. For example, the system message may be a SIB or a MIB, and the higher layer signaling may be RRC signaling. This is not specifically limited in this embodiment of this application.

Optionally, all information of X2, Y2, the first period, the first duration, the offset of the first duration in the first period, and the quantity of repetitions of the first duration may be configured by the network device for the terminal device, that is, the second configuration information includes X2, Y2, the first period, the first duration, the offset of the first duration in the first period, and the quantity of repetitions of the first duration. Alternatively, all information of X2, Y2, the first period, the first duration, the offset of the first duration in the first period, and the quantity of repetitions of the first duration may be agreed upon in a protocol. In this case, the network device does not need to send the second configuration information to the terminal device. Alternatively, some information of X2, Y2, the first period, the first duration, the offset of the first duration in the first period, and the quantity of repetitions of the first duration may be configured by the network device for the terminal device, and some information of X2. Y2, the first period, the first duration, the offset of the first duration in the first period, and the quantity of repetitions of the first duration may be agreed upon in a protocol. For example, the second configuration information may include at least one of X2 and Y2, and the first period, the first duration, the offset of the first duration in the first period, and the quantity of repetitions of the first duration may be agreed upon in the protocol. This is not specifically limited in this embodiment of this application.

Optionally, in this embodiment of this application, when detecting whether a WUS exists before a PO, a terminal device supporting a WUS may determine a time domain resource in the first duration based on the quantity of paging occasions in the discontinuous reception period, receive a reference signal from the network device on a corresponding time-frequency resource, and then perform measurement by using the reference signal to obtain a measurement result, for example, perform RSRP measurement to obtain an SINR. When the measurement result satisfies a specific condition, the terminal device may be considered as a terminal device with a good channel condition. The terminal device starts to perform monitoring from a starting subframe of a WUS, and may terminate WUS monitoring in advance, without waiting until maximum WUS duration ends to know that no WUS exists, thereby reducing power consumption of the terminal device.

Scenario 3: The time domain resource in the time-frequency resource in steps S701 to S703 may include the first time domain resource and the second time domain resource.

In this scenario, the first time domain resource (that is, a time domain resource for transmitting a reference signal related to a paging occasion) may be determined in the manner of the scenario 1, and the second time domain resource (that is, a time domain resource for transmitting a reference signal related to a starting subframe of a wake-up signal) may be determined in the manner of the scenario 2. For related descriptions, refer to the descriptions of the scenario 1 and the scenario 2. Details are not described herein again.

Figure 16:
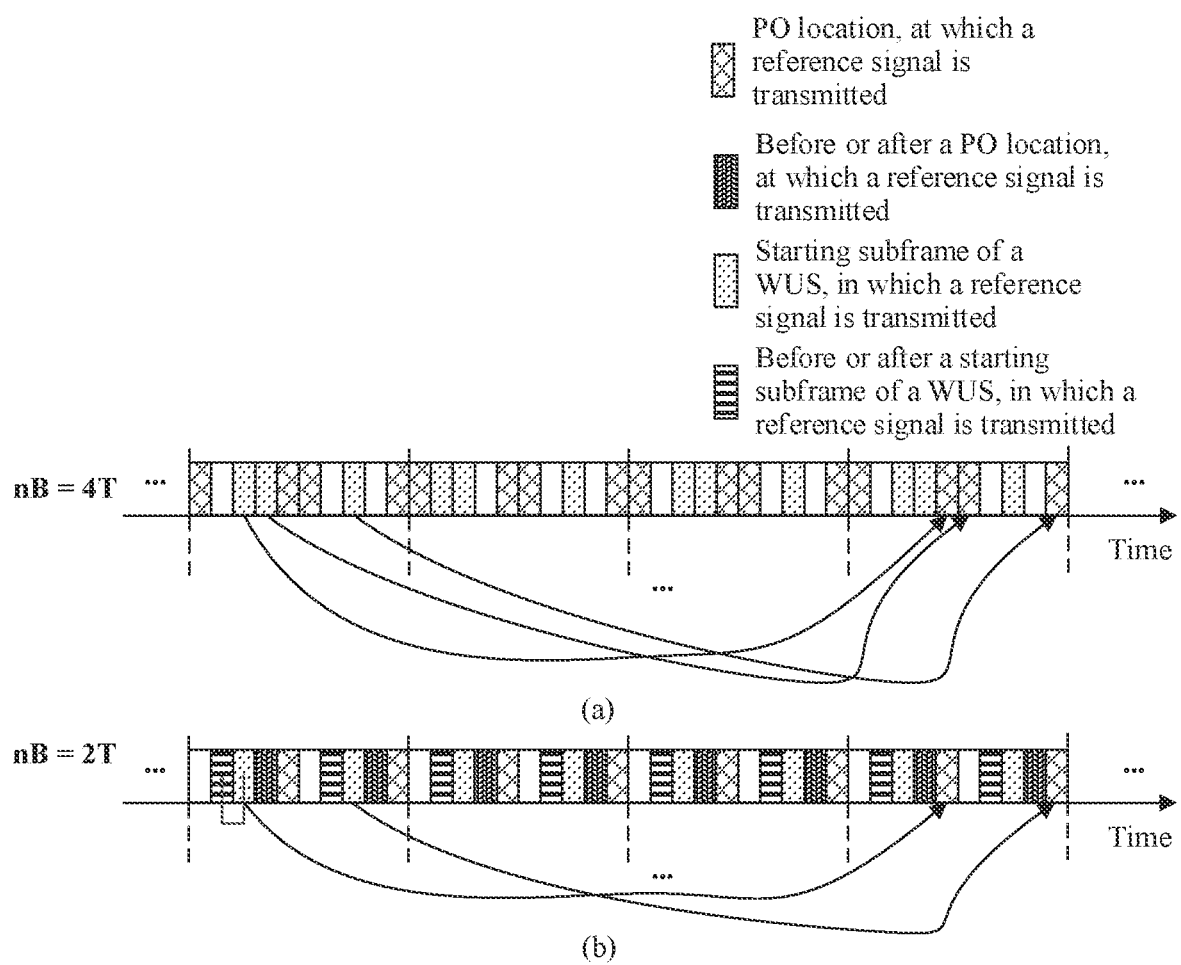
FIG. 16 is a schematic diagram 8 of a time domain resource corresponding to a reference signal according to an embodiment of this application.

For example, it is assumed that, when nB=4T, the first time domain resource is shown in (a) in FIG. 8, and the second time domain resource is shown in (a) in FIG. 13. In this scenario, the time domain resource corresponding to the reference signal may be shown in (a) in FIG. 16, that is, the time domain resource includes a subframe corresponding to each paging occasion in the first duration and a starting subframe of each wake-up signal, for example, a subframe 0, a subframe 4, a subframe 5, and a subframe 9 in a system frame in which the paging occasion is located, and a subframe 2, a subframe 3, and a subframe 7 in a system frame in which the starting subframe of the wake-up signal is located.

Alternatively, for example, it is assumed that, when nB=2T, the first time domain resource is shown in (b) in FIG. 8, and the second time domain resource is shown in (b) in FIG. 13. In this scenario, the time domain resource corresponding to the reference signal may be shown in (b) in FIG. 16, that is, the time domain resource includes a subframe corresponding to each paging occasion in the first duration, one subframe that is before and consecutive to the subframe corresponding to each paging occasion, a starting subframe of each wake-up signal, and one subframe that is before and consecutive to the starting subframe of each wake-up signal, for example, a subframe 3, a subframe 4, a subframe 8, and a subframe 9 in a system frame in which the paging occasion is located, and a subframe 1, a subframe 2, a subframe 6, and a subframe 7 in a system frame in which the starting subframe of the wake-up signal is located.

Optionally, in the scenario 3, the reference signal sending and receiving method provided in this embodiment of this application may further include: The network device sends fifth configuration information of the reference signal to the terminal device. The fifth configuration information includes at least one of X1, Y1, X2, Y2, the first period, the first duration, an offset of the first duration in the first period, and a quantity of repetitions of the first duration. This is not specifically limited in this embodiment of this application.

For related descriptions of the first period, the first duration, and the offset of the first duration in the first period, refer to the scenario 1. Details are not described herein again.

In this way, after receiving the fifth configuration information from the network device, the terminal device may determine a time domain resource in the first period based on the fifth configuration information and the quantity of paging occasions in the DRX period. For related descriptions, refer to the scenario 1 and the scenario 2. Details are not described herein again.

Optionally, the foregoing embodiment is described by using an example in which the network device sends the fifth configuration information to the terminal device. The network device may send the fifth configuration information to the terminal device in a system message or higher layer signaling. For example, the system message may be a SIB or a MIB, and the higher layer signaling may be RRC signaling. This is not specifically limited in this embodiment of this application.

Optionally, all information of X1, Y1, X2, Y2, the first period, the first duration, the offset of the first duration in the first period, and the quantity of repetitions of the first duration may be configured by the network device for the terminal device, that is, the fifth configuration information includes X1, Y1, X2, Y2, the first period, the first duration, the offset of the first duration in the first period, and the quantity of repetitions of the first duration. Alternatively, all information of X1, Y1, X2, Y2, the first period, the first duration, the offset of the first duration in the first period, and the quantity of repetitions of the first duration may be agreed upon in a protocol. In this case, the network device does not need to send the fifth configuration information to the terminal device. Alternatively, some information of X1, Y1, X2, Y2, the first period, the first duration, the offset of the first duration in the first period, and the quantity of repetitions of the first duration may be configured by the network device for the terminal device, and some information of X1, Y1, X2, Y2, the first period, the first duration, the offset of the first duration in the first period, and the quantity of repetitions of the first duration may be agreed upon in a protocol. For example, the fifth configuration information may include at least one of X1, Y1, X2, and Y2, and the first period, the first duration, the offset of the first duration in the first period, and the quantity of repetitions of the first duration may be agreed upon in the protocol. This is not specifically limited in this embodiment of this application.

Optionally, in this embodiment of this application, X1 may be the same as Y1, and X2 may be the same as Y2. This is not specifically limited in this embodiment of this application. In this case, the fifth configuration information may include at least one of X1 (or X2), Y1 (or Y2), the first period, the first duration, the offset of the first duration in the first period, and the quantity of repetitions of the first duration. This is not specifically limited in this embodiment of this application.

In the scenario 1 to the scenario 3, related descriptions are provided by using an example in which the time domain resource in the time-frequency resource in steps S701 to S703 may include the first time domain resource, the second time domain resource, or the first time domain resource and the second time domain resource. All the given examples are described by using an example in which the one or more paging occasions in the first duration include all paging occasions in the first duration, and/or the one or more wake-up signals in the first duration include all wake-up signals in the first duration. Optionally, the one or more paging occasions in the first duration may include some of all paging occasions in the first duration, and/or the one or more wake-up signals in the first duration include some of all wake-up signals in the first duration. Details are described below.

First, that the one or more paging occasions in the first duration may include some of all paging occasions in the first duration is described below.

In a possible implementation, some of all the paging occasions in the first duration may be represented by a bitmap. For example, assuming that a quantity of all the paging occasions in the first duration is F1, the paging occasions may be represented by an F1-bit bitmap, where each bit in the F1-bit bitmap is used to indicate whether the reference signal is transmitted in a subframe corresponding to each of the F1 paging occasions, and F1 is a positive integer.

Figure 17:
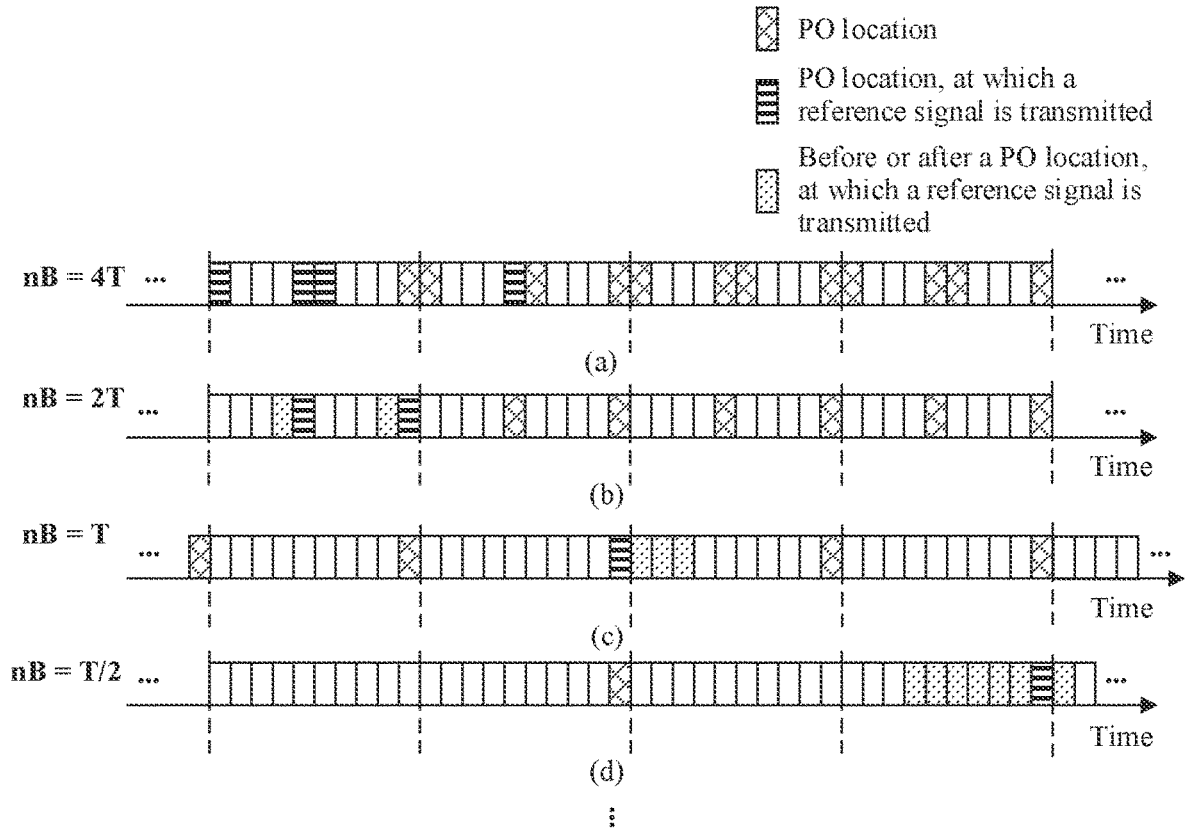
FIG. 17 is a schematic diagram 9 of a time domain resource corresponding to a reference signal according to an embodiment of this application.

For example, when nB=4T, it is assumed that the first duration is four system frames. With reference to (a) in FIG. 8, the four system frames include 16 paging occasions. It is assumed that the bitmap is 1110 0100 0000 0000, a bit value "1" indicates that a reference signal is transmitted, and a bit value "0" indicates that no reference signal is transmitted. In this case, the time domain resource corresponding to the reference signal may include a subframe 0, a subframe 4, and a subframe 5 in the $1^{st}$ system frame, and a subframe 4 in the $2^{nd}$ system frame, as shown in (a) in FIG. 17.

Alternatively, for example, when nB=2T, it is assumed that the first duration is four system frames. With reference to (b) in FIG. 8, the four system frames include eight paging occasions. It is assumed that the bitmap is 1100 0000, a bit value "1" indicates that a reference signal is transmitted, and a bit value "0" indicates that no reference signal is transmitted. In this case, the time domain resource corresponding to the reference signal may include a subframe 3, a subframe 4, a subframe 8, and a subframe 9 in the $1^{st}$ system frame, as shown in (b) in FIG. 17.

Alternatively, for example, when nB=T, it is assumed that the first duration is four system frames. With reference to (c) in FIG. 8, the four system frames include four paging occasions. It is assumed that the bitmap is 0100, a bit value "1" indicates that a reference signal is transmitted, and a bit value "0" indicates that no reference signal is transmitted. In this case, the time domain resource corresponding to the reference signal may include a subframe 9 in the $2^{nd}$ system frame, and a subframe 0, a subframe 1, and a subframe 2 in the $3^{rd}$ system frame, as shown in (c) in FIG. 17.

Alternatively, for example, when nB=T/2, it is assumed that the first duration is four system frames. With reference to (d) in FIG. 8, the four system frames include four paging occasions. It is assumed that the bitmap is 01, a bit value "1"

indicates that a reference signal is transmitted, and a bit value "0" indicates that no reference signal is transmitted. In this case, the time domain resource corresponding to the reference signal may include a subframe 3 to a subframe 9 in the 4$^{th}$ system frame, and a subframe 1 in the 5$^{th}$ system frame, as shown in (d) in FIG. 17.

Alternatively, for example, when nB<T/2, for a related example, refer to the foregoing descriptions. Details are not described herein again.

In another possible implementation, the one or more paging occasions in the first duration include N1 paging occasions in every M1 paging occasions of all the paging occasions in the first duration, where M1 is an integer greater than or equal to 1, N1 is an integer greater than or equal to 1, and M1 is greater than or equal to N1.

Optionally, in this embodiment of this application, the N1 paging occasions may be first N1 consecutive paging occasions in every M1 paging occasions; or the N1 paging occasions may be last N consecutive paging occasions in every M1 paging occasions; or the N1 paging occasions are represented by an M1-bit bitmap, where each bit in the M1-bit bitmap is used to indicate whether the reference signal is transmitted in a subframe corresponding to each of every M1 paging occasions.

For example, it is assumed that nB=2T and the first duration is four system frames. With reference to (b) in FIG. 8, the four system frames include eight paging occasions. It is assumed that M1=4 and N1=2.

Figure 18:
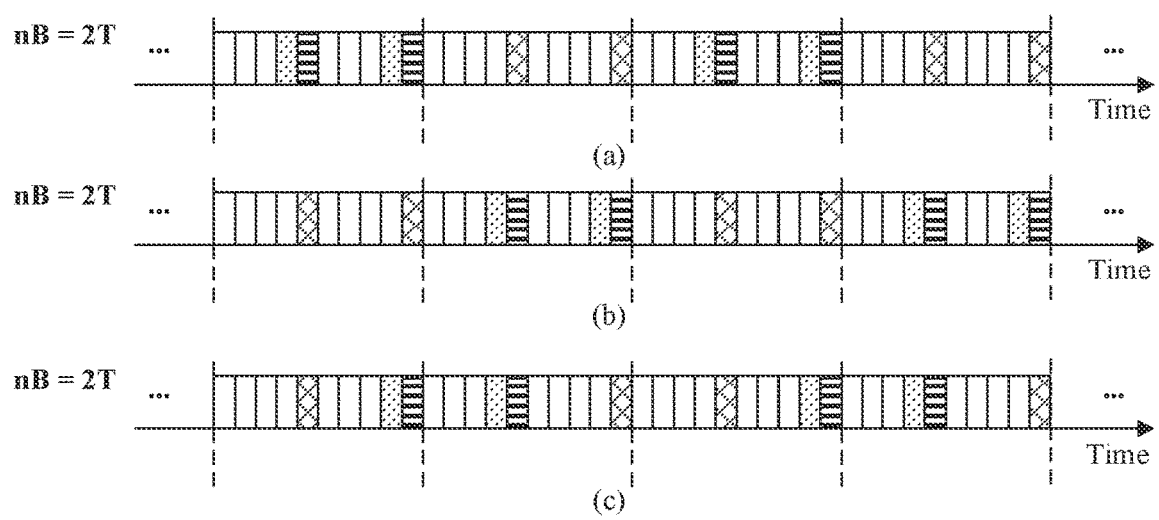
FIG. 18 is a schematic diagram 10 of a time domain resource corresponding to a reference signal according to an embodiment of this application.

Two paging occasions may be first two paging occasions in every four paging occasions. In this case, a first time-frequency resource includes a subframe 3, a subframe 4, a subframe 8, and a subframe 9 in the 1$^{st}$ system frame and the 3$^{rd}$ system frame, as shown in (a) in FIG. 18.

Alternatively, two paging occasions may be last two paging occasions in every four paging occasions. In this case, a first time-frequency resource includes a subframe 3, a subframe 4, a subframe 8, and a subframe 9 in the 2$^{nd}$ system frame and the 4$^{th}$ system frame, as shown in (b) in FIG. 18.

Alternatively, two paging occasions may be represented by a 4-bit bitmap. It is assumed that the 4-bit bitmap is 0110, a bit value "1" indicates that a reference signal is transmitted, and a bit value "0" indicates that no reference signal is transmitted. In this case, a first time-frequency resource includes a subframe 8 and a subframe 9 in the 1$^{st}$ system frame and the 3$^{rd}$ system frame, and a subframe 3 and a subframe 4 in the 2$^{nd}$ system frame and the 4$^{th}$ system frame, as shown in (c) in FIG. 18.

It should be noted that all the foregoing examples in this embodiment of this application are described by using an example in which a bit value "1" indicates that a reference signal is transmitted, and a bit value "0" indicates that no reference signal is transmitted. Certainly, alternatively, a bit value "0" may indicate that a reference signal is transmitted, and a bit value "1" may indicate that no reference signal is transmitted. This is not specifically limited in this embodiment of this application. The descriptions are also applicable to the following embodiments. This is uniformly described herein, and details are not described below again.

Optionally, the reference signal sending and receiving method provided in this embodiment of this application may further include: The network device sends third configuration information of the reference signal to the terminal device. The third configuration information includes M1 and N1, or includes the M1-bit bitmap. For example, when the N1 paging occasions may be first N1 consecutive paging occasions in every M1 paging occasions, or the N1 paging occasions may be last N1 consecutive paging occasions in every M1 paging occasions, the third configuration information may include M1 and N1; or when the N1 paging occasions are represented by the M1-bit bitmap, the third configuration information may include the M1-bit bitmap. This is not specifically limited in this embodiment of this application.

In this way, after receiving the third configuration information from the network device, the terminal device may determine the time domain resource in the first duration with reference to the third configuration information. For details, refer to the example shown in FIG. 18. Details are not described herein again.

Optionally, the foregoing embodiment is described by using an example in which the network device sends the third configuration information to the terminal device. The network device may send the third configuration information to the terminal device in a system message or higher layer signaling. For example, the system message may be a SIB or a MIB, and the higher layer signaling may be RRC signaling. This is not specifically limited in this embodiment of this application. Certainly, M1 and N1, or the M1-bit bitmap may be alternatively agreed upon in a protocol. This is not specifically limited in this embodiment of this application.

Optionally, the first configuration information and the third configuration information in this embodiment of this application may be configured by the network device for the terminal device by using one message or one piece of signaling, or may be configured by the network device for the terminal device by using different messages or signaling. This is not specifically limited in this embodiment of this application.

Next, that the one or more wake-up signals in the first duration may include some of all wake-up signals in the first duration is described below.

In a possible implementation, some of all the wake-up signals in the first duration may be represented by a bitmap. For example, assuming that a quantity of all the wake-up signals in the first duration is F2, the wake-up signals may be represented by an F2-bit bitmap, where each bit in the F2-bit bitmap is used to indicate whether the reference signal is transmitted in a starting subframe of each of the F2 wake-up signals, and F2 is a positive integer. For a related example, refer to FIG. 17. Details are not described herein again.

In another possible implementation, the one or more wake-up signals in the first duration include N2 wake-up signals in every M2 wake-up signals of all the wake-up signals in the first duration, where M2 is an integer greater than or equal to 1, N2 is an integer greater than or equal to 1, and M2 is greater than or equal to N2.

Optionally, in this embodiment of this application, the N2 wake-up signals may be first N2 consecutive wake-up signals in every M2 wake-up signals; or the N2 wake-up signals may be last N2 consecutive wake-up signals in every M2 wake-up signals; or the N2 wake-up signals are represented by an M2-bit bitmap, where each bit in the M2-bit bitmap is used to indicate whether the reference signal is transmitted in a starting subframe of each of every M2 wake-up signals. For a related example, refer to FIG. 18. Details are not described herein again.

Optionally, the reference signal sending and receiving method provided in this embodiment of this application may further include: The network device sends fourth configuration information of the reference signal to the terminal device. The fourth configuration information includes M2 and N2, or includes the M2-bit bitmap. For example, when the N2 wake-up signals may be first N2 consecutive wake-up signals in every M2 wake-up signals, or the N2 wake-up signals may be last N2 consecutive wake-up signals in every M2 wake-up signals, the fourth configuration information may include M2 and N2; or when the N2 wake-up signals are represented by the M2-bit bitmap, the fourth configuration information may include the M2-bit bitmap, his is not specifically limited in this embodiment of this application.

In this way, after receiving the fourth configuration information from the network device, the terminal device may determine the time domain resource in the first duration with reference to the fourth configuration information. For details, refer to the example shown in FIG. 18. Details are not described herein again.

Optionally, the foregoing embodiment is described by using an example in which the network device sends the fourth configuration information to the terminal device. The network device may send the fourth configuration information to the terminal device in a system message or higher layer signaling. For example, the system message may be a SIB or a MIB, and the higher layer signaling may be RRC signaling. This is not specifically limited in this embodiment of this application. Certainly, M2 and N2, or the M2-bit bitmap may be alternatively agreed upon in a protocol. This is not specifically limited in this embodiment of this application.

Optionally, the second configuration information and the fourth configuration information in this embodiment of this application may be configured by the network device for the terminal device by using one message or one piece of signaling, or may be configured by the network device for the terminal device by using different messages or signaling. This is not specifically limited in this embodiment of this application.

Optionally, in this embodiment of this application, M1 may be the same as M2, and N1 may be the same as N2. This is not specifically limited in this embodiment of this application.

Scenario 4: The time domain resource in the time-frequency resource in steps S701 to S703 may include the third time domain resource.

For example, the time domain resource in the time-frequency resource in steps S701 to S703 includes the third time domain resource. In this case, the X5 subframes may be X5 consecutive subframes that are before and consecutive to the subframe corresponding to each of the N3 paging occasions in every M3 paging occasions, and the Y5 subframes are Y5 consecutive subframes that are after and consecutive to the subframe corresponding to each of the N3 paging occasions in every M3 paging occasions. Alternatively, the X5 subframes may be first X5 consecutive subframes in Z3 subframes before a subframe corresponding to each of the N3 paging occasions in every M3 paging occasions, where Z3 may be configured by a network, or may be agreed upon in a protocol, for example, it is agreed upon in the protocol that Z3 is equal to 10; and the Y5 subframes are Y5 consecutive subframes that are after and consecutive to the subframe corresponding to each of the N3 paging occasions in every M3 paging occasions.

For example, M3 satisfies the following formula (6):

$$M3=\max\{\text{alpha } 1\times(4/T)\times nB,1\} \quad \text{Formula (6)}$$

nB indicates the quantity of paging occasions in the discontinuous reception period, T indicates the discontinuous reception period, and alpha 1 is the fifth specified value. It is assumed that PO locations are shown in FIG. 3, alpha 1=1, and N3=1.

Figure 24:
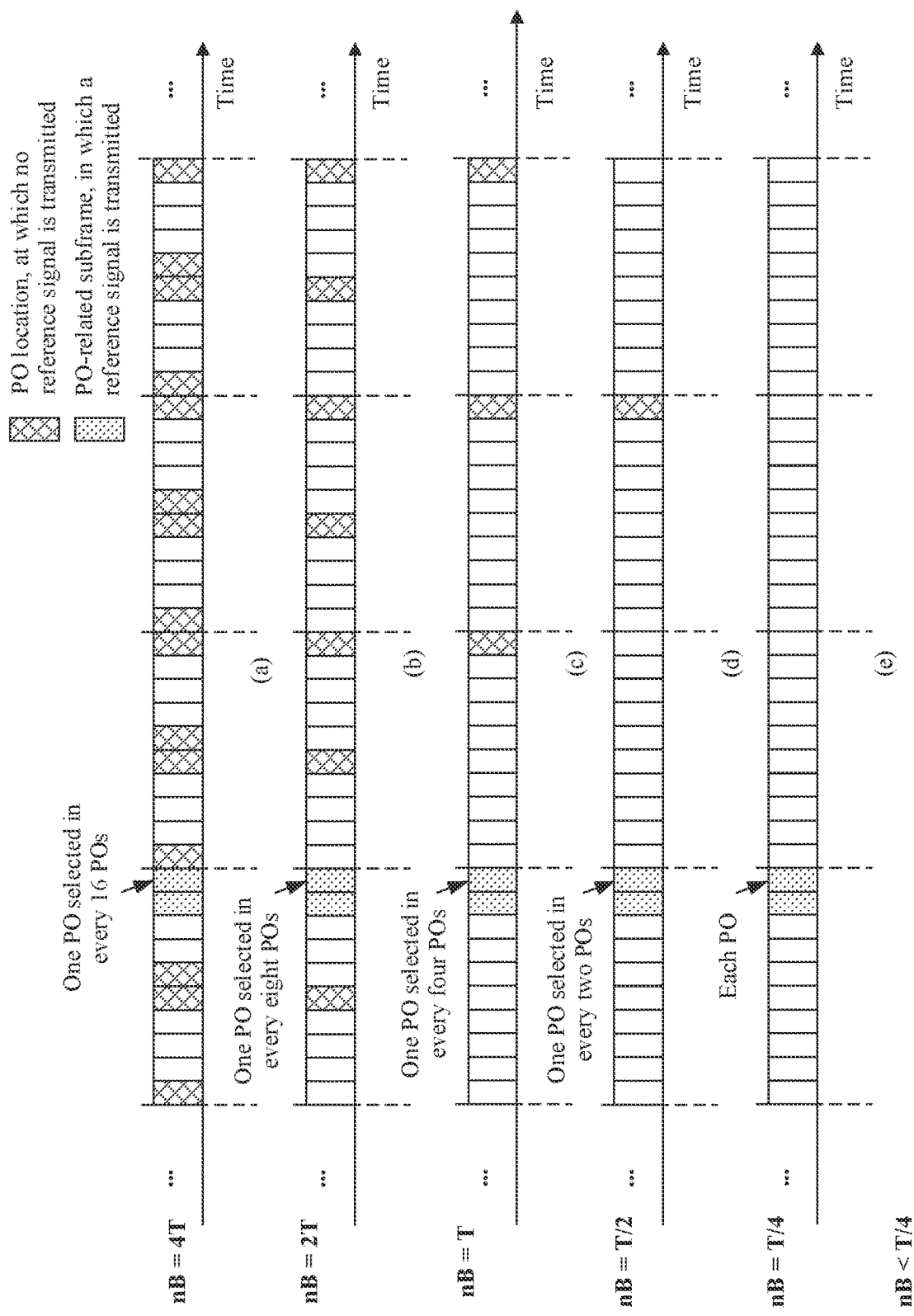
FIG. 24 is a schematic diagram 12 of a time domain resource corresponding to a reference signal according to an embodiment of this application.

When nB=4T and M3=16, the time domain resource corresponding to the reference signal may be shown in (a) in FIG. 24, that is, subframes related to one of every 16 paging occasions of all paging occasions in the first duration, where the subframes related to the paging occasion include a subframe corresponding to the paging occasion, X5 subframes before the subframe corresponding to the paging occasion, and Y5 subframes after the subframe corresponding to the paging occasion. (a) in FIG. 24 and (b) to (e) in FIG. 24 are described by using an example in which X5=1 and Y5=0. Certainly. X5 and Y5 may be alternatively other values. This is not specifically limited in this embodiment of this application.

When nB=2T and M3=8, the time domain resource corresponding to the reference signal may be shown in (b) in FIG. 24, that is, subframes related to one of every eight paging occasions of all paging occasions in the first duration, where the subframes related to the paging occasion include a subframe corresponding to the paging occasion, X5 subframes before the subframe corresponding to the paging occasion, and Y5 subframes after the subframe corresponding to the paging occasion.

When nB=T and M3=4, the time domain resource corresponding to the reference signal may be shown in (c) in FIG. 24, that is, subframes related to one of every four paging occasions of all paging occasions in the first duration, where the subframes related to the paging occasion include a subframe corresponding to the paging occasion, X5 subframes before the subframe corresponding to the paging occasion, and Y5 subframes after the subframe corresponding to the paging occasion.

When nB=T/2 and M3=2, the time domain resource corresponding to the reference signal may be shown in (d) in FIG. 24, that is, subframes related to one of every two paging occasions of all paging occasions in the first duration, where the subframes related to the paging occasion include a subframe corresponding to the paging occasion, X5 subframes before the subframe corresponding to the paging occasion, and Y5 subframes after the subframe corresponding to the paging occasion.

When nB=T/4 and M3=1, the time domain resource corresponding to the reference signal may be shown in (e) in FIG. 24, that is, subframes related to each of all paging occasions in the first duration, where the subframes related to the paging occasion include a subframe corresponding to the paging occasion, X5 subframes before the subframe corresponding to the paging occasion, and Y5 subframes after the subframe corresponding to the paging occasion.

When nB<T/4 and M3=1, the time domain resource corresponding to the reference signal may be shown in (e) in FIG. 24, that is, subframes related to each of all paging occasions in the first duration, where the subframes related to the paging occasion include a subframe corresponding to the paging occasion. X5 subframes before the subframe corresponding to the paging occasion, and Y5 subframes after the subframe corresponding to the paging occasion.

For different values of nB, X5 subframes before a subframe corresponding to a paging occasion may be the same or different. This is not specifically limited in this embodiment of this application. In addition, X5 and Y5 may be configured by a network, or may be agreed upon in a protocol. This is not specifically limited in this embodiment of this application.

Optionally, in this embodiment of this application, M3 may be determined by the network device based on the quantity of paging occasions in the DRX period, the DRX period, and the fifth specified value, for example, determined based on the formula (6); or M3 is a specified value corresponding to the quantity of paging occasions in the DRX period, for example, as shown in Table 5.

TABLE 5

| nB | M3 |
|---|---|
| 4T | 16 |
| 2T | 8 |
| T | 4 |
| T/2 | 2 |
| T/4 | 1 |
| <T/4 | 1 |

Optionally, in this embodiment of this application, a subframe on the third time domain resource may include a normal subframe, or may include a valid (valid) subframe. This is not specifically limited in this embodiment of this application. When all subframes on the third time domain resource are valid subframes, a subframe corresponding to a paging occasion may be a subframe in which the paging occasion is located, or may be the $1^{st}$ valid subframe after the paging occasion, the X5 (consecutive) subframes are X5 (consecutive) valid subframes, and the Y5 (consecutive) subframes are Y5 (consecutive) valid subframes. This is uniformly described herein, and details are not described below again.

In this embodiment of this application, consecutive valid subframes mean that no other valid subframe exists between two valid subframes. For details, refer to the descriptions in the scenario 1, as shown in FIG. 9.

Optionally, in the scenario 4, the reference signal sending and receiving method provided in this embodiment of this application may further include: The network device sends sixth configuration information of the reference signal to the terminal device. The sixth configuration information includes at least one of X5. Y5, the first period, the first duration, an offset of the first duration in the first period, and a quantity of repetitions of the first duration. This is not specifically limited in this embodiment of this application.

For related descriptions of the first period, the first duration, and the offset of the first duration in the first period, refer to the scenario 1. Details are not described herein again.

In this way, after receiving the sixth configuration information from the network device, the terminal device may determine the time domain resource in the first duration or a time domain resource in the first period based on the sixth configuration information and the quantity of paging occasions in the DRX period. For example, assuming that the sixth configuration information includes the first duration and at least one of X5 and Y5, the terminal device may determine the time domain resource in the first duration based on the sixth configuration information and the quantity of paging occasions in the DRX period. Alternatively, for example, assuming that the sixth configuration information includes at least one of X5 and Y5, at least one of the offset of the first duration in the first period and the quantity of repetitions of the first duration, the first period, and the first duration, the terminal device may determine the time domain resource in the first period based on the sixth configuration information and the quantity of paging occasions in the DRX period. This is not specifically limited in this embodiment of this application.

Optionally, the foregoing embodiment is described by using an example in which the network device sends the sixth configuration information to the terminal device. The network device may send the sixth configuration information to the terminal device in a system message or higher layer signaling. For example, the system message may be a SIB or a MIB, and the higher layer signaling may be RRC signaling. This is not specifically limited in this embodiment of this application.

Optionally, all information of X5, Y5, the first period, the first duration, the offset of the first duration in the first period, and the quantity of repetitions of the first duration may be configured by the network device for the terminal device, that is, the sixth configuration information includes X5, Y5, the first period, the first duration, the offset of the first duration in the first period, and the quantity of repetitions of the first duration. Alternatively, all information of X5, Y5, the first period, the first duration, the offset of the first duration in the first period, and the quantity of repetitions of the first duration may be agreed upon in a protocol. In this case, the network device does not need to send the sixth configuration information to the terminal device. Alternatively, some information of X5, Y5, the first period, the first duration, the offset of the first duration in the first period, and the quantity of repetitions of the first duration may be configured by the network device for the terminal device, and some information of X5, Y5, the first period, the first duration, the offset of the first duration in the first period, and the quantity of repetitions of the first duration may be agreed upon in a protocol. For example, the sixth configuration information may include at least one of X5 and Y5, and the first period, the first duration, the offset of the first duration in the first period, and the quantity of repetitions of the first duration may be agreed upon in the protocol. This is not specifically limited in this embodiment of this application.

Optionally, in this embodiment of this application, for a value of a sum of X5 and Y5, refer to the related descriptions of the sum of X1 and Y1 in the scenario 1. Details are not described herein again.

Optionally, in this embodiment of this application, when detecting whether a paging scheduling message exists in a PDCCH search space whose starting subframe is a subframe corresponding to a PO, and waking up at the paging occasion to monitor a PDCCH, the terminal device may determine a time domain resource in the first duration based on the quantity of paging occasions in the discontinuous reception period, receive a reference signal from the network device on a corresponding time-frequency resource, and then perform measurement by using the reference signal to obtain a measurement result, for example, perform RSRP measurement to obtain an SINR. When the measurement result satisfies a specific condition, the terminal device may be considered as a terminal device with a good channel condition. Further, in the PDCCH search space whose starting subframe is the subframe corresponding to the paging occasion, the terminal device may determine whether a paging scheduling message exists by performing blind detection only on some candidate locations, without performing blind detection on all candidate locations. For example, as shown in FIG. 12, a covered terminal device may terminate detection in advance after performing detection only on first three candidate locations in a PDCCH search space, thereby reducing power consumption of the terminal device.

Scenario 5: The time domain resource in the time-frequency resource in steps S701 to S703 may include the fourth time domain resource.

For example, the time domain resource in the time-frequency resource in steps S701 to S703 includes the fourth time domain resource. In this case, the X6 subframes may be X6 consecutive subframes that are before and consecutive to the starting subframe of each of the N4 wake-up signals in every M4 wake-up signals, and the Y6 subframes are Y6 consecutive subframes that are after and consecutive to the starting subframe of each of the N4 wake-up signals in every M4 wake-up signals. Alternatively, the X6 subframes may be first X6 consecutive subframes in Z4 subframes before the starting subframe of each of the N4 wake-up signals in every M4 wake-up signals, where Z4 may be notified by the network device, or may be agreed upon in a protocol, for example, it is agreed upon in the protocol that Z4 is equal to 10; and the Y6 subframes are Y6 consecutive subframes that are after and consecutive to the starting subframe of each of the N4 wake-up signals in every M4 wake-up signals.

For example, M4 satisfies the following formula (7):

$$M4=\max\{\text{alpha } 2\times(4/T)\times nB, 1\} \quad \text{Formula (7)}$$

nB indicates the quantity of paging occasions in the discontinuous reception period, T indicates the discontinuous reception period, and alpha 2 is the sixth specified value. It is assumed that PO locations are shown in FIG. 3, alpha 2=1, and N4=1.

Figure 25:
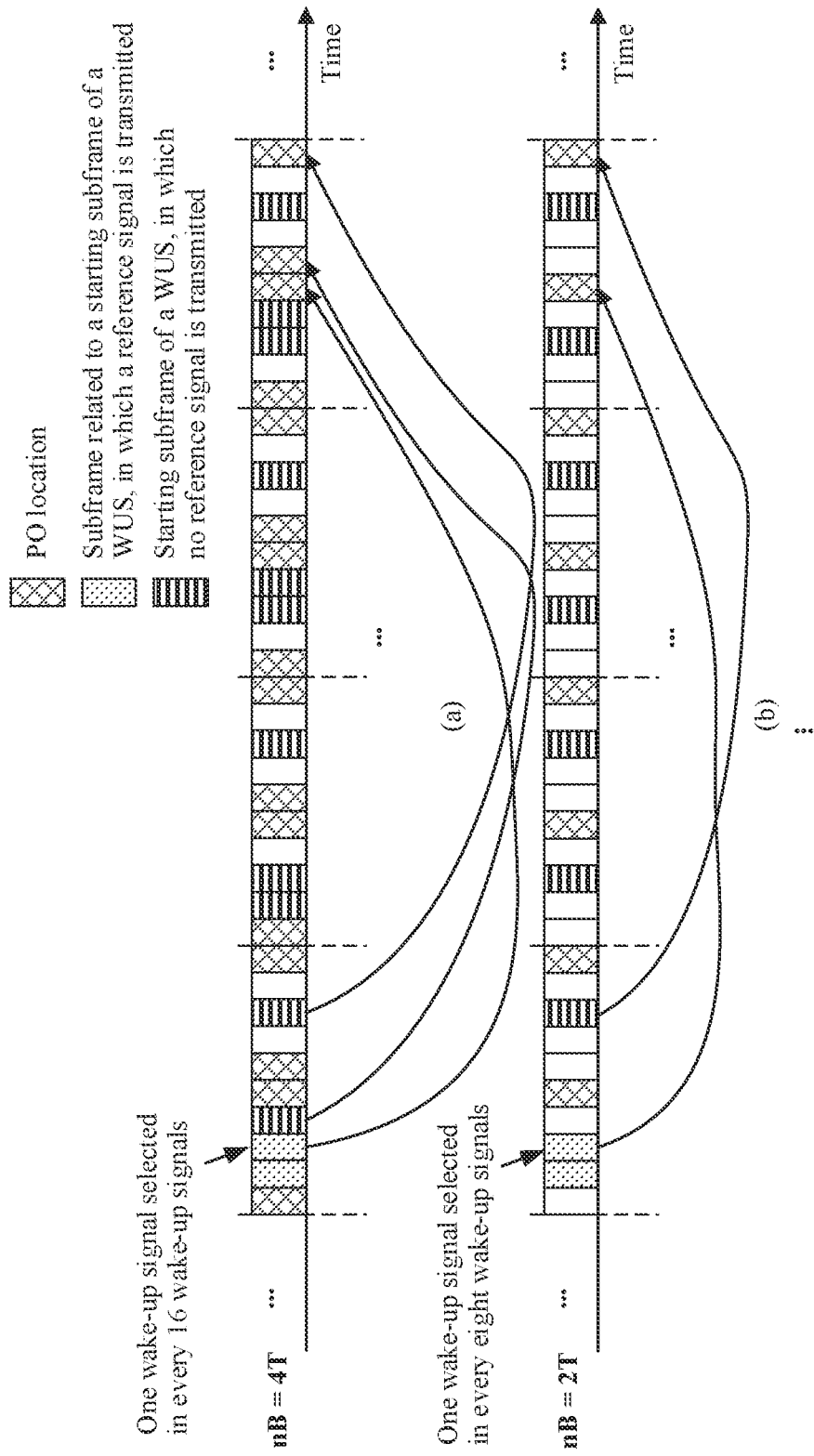
FIG. 25 is a schematic diagram 13 of a time domain resource corresponding to a reference signal according to an embodiment of this application.

When nB=4T and M4=16, the time domain resource corresponding to the reference signal may be shown in (a) in FIG. 25, that is, subframes related to one of every 16 wake-up signals of all wake-up signals in the first duration, where the subframes related to the wake-up signal include a starting subframe of the wake-up signal, X6 subframes before the starting subframe of the wake-up signal, and Y6 subframes after the starting subframe of the wake-up signal. (a) in FIG. 25 and (b) in FIG. 25 are described by using an example in which X6=1 and Y6=0. Certainly, X6 and Y6 may be alternatively other values. This is not specifically limited in this embodiment of this application.

When nB=2T and M4=8, the time domain resource corresponding to the reference signal may be shown in (b) in FIG. 25, that is, subframes related to one of every eight wake-up signals of all wake-up signals in the first duration, where the subframes related to the wake-up signal include a starting subframe of the wake-up signal, X6 subframes before the starting subframe of the wake-up signal, and Y6 subframes after the starting subframe of the wake-up signal.

When nB=T and M4=4, or nB=T/2 and M4=2, or nB=T/4 and M4=1, or nB<T/4 and M4=1, for details about the time domain resource corresponding to the reference signal, refer to (a) and (b) in FIG. 25. Details are not described herein again.

For different values of nB, X6 subframes before a starting subframe of a wake-up signal may be the same or different. This is not specifically limited in this embodiment of this application. In addition. X6 and Y6 may be configured by a network, or may be agreed upon in a protocol. This is not specifically limited in this embodiment of this application.

Optionally, in this embodiment of this application, M4 may be determined by the network device based on the quantity of paging occasions in the DRX period, the DRX period, and the sixth specified value, for example, determined based on the formula (7); or M4 is a specified value corresponding to the quantity of paging occasions in the DRX period, for example, as shown in Table 6.

TABLE 6

| nB | M4 |
|---|---|
| 4T | 16 |
| 2T | 8 |

TABLE 6-continued

| nB | M4 |
|---|---|
| T | 4 |
| T/2 | 2 |
| T/4 | 1 |
| <T/4 | 1 |

Optionally, in this embodiment of this application, a subframe on the fourth time domain resource may include a normal subframe, or may include a valid (valid) subframe. This is not specifically limited in this embodiment of this application. Because a starting subframe of a wake-up signal is a valid subframe, when all subframes on the fourth time domain resource are valid subframes, the X6 (consecutive) subframes are X6 (consecutive) valid subframes, and the Y6 (consecutive) subframes are Y6 (consecutive) valid subframes. This is uniformly described herein, and details are not described below again.

In this embodiment of this application, consecutive valid subframes mean that no other valid subframe exists between two valid subframes. For details, refer to the descriptions in the scenario 2, as shown in FIG. 13.

Optionally, in the scenario 5, the reference signal sending and receiving method provided in this embodiment of this application may further include: The network device sends seventh configuration information of the reference signal to the terminal device. The seventh configuration information includes at least one of X6. Y6, the first period, the first duration, an offset of the first duration in the first period, and a quantity of repetitions of the first duration. This is not specifically limited in this embodiment of this application.

For related descriptions of the first period, the first duration, and the offset of the first duration in the first period, refer to the scenario 1. Details are not described herein again.

In this way, after receiving the seventh configuration information from the network device, the terminal device may determine the time domain resource in the first duration or a time domain resource in the first period based on the seventh configuration information and the quantity of paging occasions in the DRX period. For example, assuming that the seventh configuration information includes the first duration and at least one of X6 and Y6, the terminal device may determine the time domain resource in the first duration based on the seventh configuration information and the quantity of paging occasions in the DRX period. Alternatively, for example, assuming that the seventh configuration information includes at least one of X6 and Y6, at least one of the offset of the first duration in the first period and the quantity of repetitions of the first duration, the first period, and the first duration, the terminal device may determine the time domain resource in the first period based on the seventh configuration information and the quantity of paging occasions in the DRX period. This is not specifically limited in this embodiment of this application.

Optionally, the foregoing embodiment is described by using an example in which the network device sends the seventh configuration information to the terminal device. The network device may send the seventh configuration information to the terminal device in a system message or higher layer signaling. For example, the system message may be a SIB or a MIB, and the higher layer signaling may be RRC signaling. This is not specifically limited in this embodiment of this application.

Optionally, all information of X6, Y6, the first period, the first duration, the offset of the first duration in the first period, and the quantity of repetitions of the first duration may be configured by the network device for the terminal device, that is, the seventh configuration information includes X6, Y6, the first period, the first duration, the offset of the first duration in the first period, and the quantity of repetitions of the first duration. Alternatively, all information of X6, Y6, the first period, the first duration, the offset of the first duration in the first period, and the quantity of repetitions of the first duration may be agreed upon in a protocol. In this case, the network device does not need to send the seventh configuration information to the terminal device. Alternatively, some information of X6, Y6, the first period, the first duration, the offset of the first duration in the first period, and the quantity of repetitions of the first duration may be configured by the network device for the terminal device, and some information of X6, Y6, the first period, the first duration, the offset of the first duration in the first period, and the quantity of repetitions of the first duration may be agreed upon in a protocol. For example, the seventh configuration information may include at least one of X6 and Y6, and the first period, the first duration, the offset of the first duration in the first period, and the quantity of repetitions of the first duration may be agreed upon in the protocol. This is not specifically limited in this embodiment of this application.

Optionally, in this embodiment of this application, for a value of a sum of X6 and Y6, refer to the related descriptions of the sum of X2 and Y2 in the scenario 2. Details are not described herein again.

Optionally, in this embodiment of this application, when detecting whether a WUS exists before a PO, a terminal device supporting a WUS may determine a time domain resource in the first duration based on the quantity of paging occasions in the discontinuous reception period, receive a reference signal from the network device on a corresponding time-frequency resource, and then perform measurement by using the reference signal to obtain a measurement result, for example, perform RSRP measurement to obtain an SINR. When the measurement result satisfies a specific condition, the terminal device may be considered as a terminal device with a good channel condition. The terminal device starts to perform listening from a starting subframe of a WUS, and may terminate WUS listening in advance, without waiting until maximum WUS duration ends to know that no WUS exists, thereby reducing power consumption of the terminal device.

Scenario 6: The time domain resource in the time-frequency resource in steps S701 to S703 may include the third time domain resource and the fourth time domain resource.

In this scenario, the third time domain resource (that is, a time domain resource for transmitting a reference signal related to a paging occasion) may be determined in the manner of the scenario 4, and the fourth time domain resource (that is, a time domain resource for transmitting a reference signal related to a starting subframe of a wake-up signal) may be determined in the manner of the scenario 5. For related descriptions, refer to the descriptions of the scenario 4 and the scenario 5. Details are not described herein again.

Optionally, in the scenario 6, the reference signal sending and receiving method provided in this embodiment of this application may further include: The network device sends eighth configuration information of the reference signal to the terminal device. The eighth configuration information includes at least one of X5, Y5, X6, Y6, the first period, the first duration, an offset of the first duration in the first period, and a quantity of repetitions of the first duration. This is not specifically limited in this embodiment of this application.

For related descriptions of the first period, the first duration, and the offset of the first duration in the first period, refer to the scenario 1. Details are not described herein again.

Optionally, the reference signal sending and receiving method provided in this embodiment of this application may further include: The network device sends ninth configuration information of the reference signal to the terminal device. The ninth configuration information includes N3, or includes an M3-bit bitmap. For example, when the N3 paging occasions may be first N3 consecutive paging occasions in every M3 paging occasions, or the N3 paging occasions may be last N3 consecutive paging occasions in every M3 paging occasions, the ninth configuration information may include N3; or when the N3 paging occasions are represented by the M3-bit bitmap, the ninth configuration information may include the M3-bit bitmap. This is not specifically limited in this embodiment of this application.

In this way, after receiving the ninth configuration information from the network device, the terminal device may determine the time domain resource in the first duration with reference to the ninth configuration information. For details, refer to the example shown in FIG. 18. Details are not described herein again.

Optionally, the reference signal sending and receiving method provided in this embodiment of this application may further include: The network device sends tenth configuration information of the reference signal to the terminal device. The tenth configuration information includes N4, or includes an M4-bit bitmap. For example, when the N4 wake-up signals may be first N4 consecutive wake-up signals in every M4 wake-up signals, or the N4 wake-up signals may be last N4 consecutive wake-up signals in every M4 wake-up signals, the tenth configuration information may include N4; or when the N4 wake-up signals are represented by the M4-bit bitmap, the tenth configuration information may include the M4-bit bitmap. This is not specifically limited in this embodiment of this application.

In this way, after receiving the tenth configuration information from the network device, the terminal device may determine the time domain resource in the first duration with reference to the tenth configuration information. For details, refer to the example shown in FIG. 18. Details are not described herein again.

In the scenario 4 to the scenario 6, that M3 is related to the quantity of paging occasions in the discontinuous reception period includes: When the quantity of paging occasions in the discontinuous reception period is greater than a threshold A, M3 is greater than 1; or when the quantity of paging occasions in the discontinuous reception period is less than or equal to the threshold A, M3 is equal to 1. That M4 is related to the quantity of paging occasions in the discontinuous reception period includes: When the quantity of paging occasions in the discontinuous reception period is greater than a threshold B, M4 is greater than 1; or when the quantity of paging occasions in the discontinuous reception period is less than or equal to the threshold B. M4 is equal to 1. The threshold A and the threshold B may be configured by a network, or may be agreed upon in a protocol. This is not limited herein. Values of the threshold A and the threshold B may be the same or different.

Optionally, in the scenario 1 to the scenario 6. Y1 consecutive subframes after a subframe corresponding to a paging occasion may be first Y1 consecutive subframes that do not include the PO and that are in a PDCCH search space whose starting subframe is the PO; Y3 consecutive subframes after a subframe corresponding to a paging occasion may be first Y3 consecutive subframes that do not include the PO and that are in a PDCCH search space whose starting subframe is the PO; Y5 consecutive subframes after a subframe corresponding to a paging occasion may be first Y5 consecutive subframes that do not include the PO and that are in a PDCCH search space whose starting subframe is the PO. This is uniformly described herein, and details are not described below again.

Optionally, the reference signal sending and receiving method provided in this embodiment of this application may further include: The network device sends first indication information to the terminal device, so that the terminal device receives the first indication information from the network device. The first indication information is used to indicate that the network device supports determining the time domain resource in the first duration based on the quantity of paging occasions in the first duration.

Optionally, in this embodiment of this application, the first indication information may be explicit indication information, or may be implicit indication information. This is not specifically limited in this embodiment of this application.

For example, the first indication information may be represented by a candidate value in a bit. The bit includes two candidate values, for example, 0 or 1. The candidate value 0 may indicate that the network device supports determining the time domain resource in the first duration based on the quantity of paging occasions in the first duration, and the candidate value 1 may indicate that the network device does not support determining the time domain resource in the first duration based on the quantity of paging occasions in the first duration. Alternatively, the candidate value 0 may indicate that the network device does not support determining the time domain resource in the first duration based on the quantity of paging occasions in the first duration, and the candidate value 1 may indicate that the network device supports determining the time domain resource in the first duration based on the quantity of paging occasions in the first duration.

Alternatively, for example, the first indication information may be a specified value. For example, sending the specified value indicates that the network device supports determining the time domain resource in the first duration based on the quantity of paging occasions in the first duration, and not sending the specified value indicates that the network device does not support determining the time domain resource in the first duration based on the quantity of paging occasions in the first duration. Alternatively, sending the specified value indicates that the network device does not support determining the time domain resource in the first duration based on the quantity of paging occasions in the first duration, and not sending the specified value indicates that the network device supports determining the time domain resource in the first duration based on the quantity of paging occasions in the first duration. This is not specifically limited in this embodiment of this application.

Optionally, in this embodiment of this application, the first indication information may be configured by the network device for the terminal device by using a system message, higher layer signaling, or other signaling, or may be predetermined in a protocol. This is not specifically limited in this embodiment of this application. For example, the system message may be a SIB or a MIB, the higher layer signaling may be RRC signaling, and the other signaling may be downlink control information (DCI) signaling. This is not specifically limited in this embodiment of this application.

Optionally, in this embodiment of this application, the first indication information may be configured for the terminal device together with at least one of the first configuration information, the second configuration information, the third configuration information, and the fourth configuration information, or may be separately configured for the terminal device. This is not specifically limited in this embodiment of this application.

Optionally, in this embodiment of this application, alternatively, the first indication information may not be configured, but it is predetermined in a protocol that the network device supports determining the time domain resource in the first duration based on the quantity of paging occasions in the first duration. This is not specifically limited in this embodiment of this application.

Optionally, in this embodiment of this application, the terminal device may further report, to the network device, whether the terminal device is capable of terminating monitoring on at least one of a WUS and a PDCCH in advance. For example, the terminal device may send second indication information to the network device, where the second indication information is used to indicate that the terminal device is capable of terminating monitoring on at least one of a WUS and a PDCCH in advance.

Optionally, in this embodiment of this application, the second indication information may be explicit indication information, or may be implicit indication information. This is not specifically limited in this embodiment of this application.

For example, the second indication information may be represented by a candidate value in a bit. The bit includes two candidate values, for example, 0 or 1. The candidate value 0 may indicate that the terminal device is capable of terminating monitoring on at least one of a WUS and a PDCCH in advance, and the candidate value 1 may indicate that the terminal device is incapable of terminating monitoring on at least one of a WUS and a PDCCH in advance. Alternatively, the candidate value 0 may indicate that the terminal device is incapable of terminating monitoring on at least one of a WUS and a PDCCH in advance, and the candidate value 1 may indicate that the terminal device is capable of terminating monitoring on at least one of a WUS and a PDCCH in advance.

Alternatively, for example, the second indication information may be a specified value. For example, sending the specified value indicates that the terminal device is capable of terminating monitoring on at least one of a WUS and a PDCCH in advance, and not sending the specified value indicates that the terminal device is incapable of terminating monitoring on at least one of a WUS and a PDCCH in advance. Alternatively, sending the specified value indicates that the terminal device is incapable of terminating monitoring on at least one of a WUS and a PDCCH in advance, and not sending the specified value indicates that the terminal device is capable of terminating monitoring on at least one of a WUS and a PDCCH in advance. This is not specifically limited in this embodiment of this application.

Optionally, the reference signal sending and receiving method provided in this embodiment of this application is described by using an example in which a reference signal may be transmitted in a subframe corresponding to a paging occasion and/or a starting subframe of a wake-up signal. Optionally, alternatively, a reference signal may not be transmitted in a subframe corresponding to a paging occasion and/or a starting subframe of a wake-up signal. To be specific, the first time domain resource includes P1 subframes before a subframe corresponding to each of the one or more paging occasions in the first duration and Q1 subframes after the subframe corresponding to each of the one or more paging occasions in the first duration, where P1 is an integer greater than or equal to 0, Q1 is an integer greater than or equal to 0, a sum of P1 and Q1 is related to the quantity of paging occasions in the discontinuous reception period, and the sum of P1 and Q1 is greater than or equal to 1; or the second time domain resource includes P2 subframes before a starting subframe of each of the one or more wake-up signals in the first duration and Q2 subframes after the starting subframe of each of the one or more wake-up signals in the first duration, where P2 is an integer greater than or equal to 0. Q2 is an integer greater than or equal to 0, a sum of P2 and Q2 is related to the quantity of paging occasions in the discontinuous reception period, and the sum of P2 and Q2 is greater than or equal to 1. This case is not specifically limited in this embodiment of this application. For related descriptions corresponding to this case, refer to the foregoing descriptions about that a reference signal may be transmitted in a subframe corresponding to a paging occasion and/or a starting subframe of a wake-up signal. For example, a difference lies in that X1+Y1+1=P1+Q1. Details are not described herein again.

According to the reference signal sending and receiving method provided in this embodiment of this application, regardless of whether the network device sends a corresponding paging scheduling message at a paging occasion, the network device sends the reference signal on the time-frequency resource corresponding to the time domain resource in the first duration that is determined based on the quantity of paging occasions in the discontinuous reception period. Therefore, in one aspect, when detecting whether a paging scheduling message exists in a PDCCH search space whose starting subframe is a subframe corresponding to a paging occasion, and waking up at the paging occasion to monitor a PDCCH, the terminal device may perform measurement by using several reference signals in the first duration to obtain a measurement result, for example, perform RSRP measurement to obtain an SINR. When the measurement result satisfies a specific condition, the terminal device may be considered as a terminal device with a good channel condition. Further, in the PDCCH search space whose starting subframe is the subframe corresponding to the paging occasion, the terminal device may determine whether a paging scheduling message exists by performing blind detection only on some candidate locations, without performing blind detection on all candidate locations. For example, as shown in FIG. 12, a terminal device with a good channel condition may terminate detection in advance after performing detection only on first three candidate locations in a PDCCH search space, thereby reducing power consumption of the terminal device. In another aspect, when detecting whether a WUS exists before a paging occasion, the terminal device may perform measurement by using several reference signals in the first duration. Therefore, when a measurement result satisfies a specific condition, the terminal device may be considered as a terminal device with a good channel condition. The terminal device starts to perform monitoring from a starting subframe of a WUS, and may terminate WUS monitoring in advance, without waiting until maximum WUS duration ends to know that no WUS exists, thereby reducing power consumption of the terminal device.

The actions of the network device in steps S701 to S703 may be performed by the network device instructed by the processor 601 in the network device 60 shown in FIG. 6 by invoking the application program code stored in the memory 602, and the actions of the terminal device in steps S701 to S703 may be performed by the terminal device instructed by the processor 701 in the terminal device 70 shown in FIG. 6 by invoking the application program code stored in the memory 702. This is not limited in this embodiment.

Figure 19:
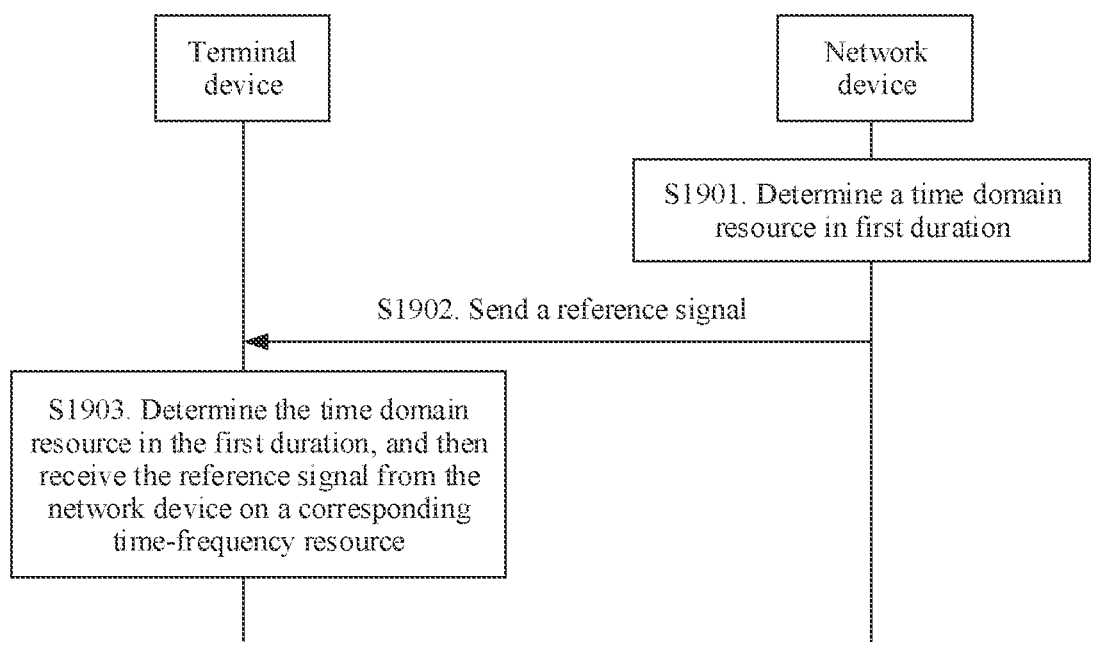
FIG. 19 is a schematic flowchart 2 of a reference signal sending and receiving method according to an embodiment of this application.

Optionally, FIG. 19 shows another reference signal sending and receiving method according to an embodiment of this application. The method includes the following steps.

S1901. A network device determines a time domain resource in first duration, where the time domain resource is a time domain resource in a time-frequency resource used to transmit a reference signal.

The time domain resource includes at least one of a first time domain resource and a second time domain resource. The first time domain resource includes a subframe corresponding to one or more paging occasions in the first duration, X3 subframes before a subframe corresponding to each of the one or more paging occasions, and Y3 subframes after the subframe corresponding to each of the one or more paging occasions, where X3 is an integer greater than or equal to 0, Y3 is an integer greater than or equal to 0, and a sum of X3 and Y3 is related to a third specified value. The second time domain resource includes a starting subframe of one or more wake-up signals in the first duration, X4 subframes before a starting subframe of each wake-up signal in the one or more wake-up signals, and Y4 subframes after the starting subframe of each wake-up signal in the one or more wake-up signals, where X4 is an integer greater than or equal to 0, Y4 is an integer greater than or equal to 0, and a sum of X4 and Y4 is related to a fourth specified value.

S1902. The network device sends the reference signal to a terminal device on the time-frequency resource.

S1903. The terminal device determines the time domain resource in the first duration, and then receives the reference signal from the network device on the corresponding time-frequency resource.

For related descriptions of steps S1901 to S1903, refer to steps S701 to S703. For example, a difference lies in that, in this embodiment of this application, a sum of X3 subframes before a subframe corresponding to a paging occasion and Y3 subframes after the subframe corresponding to the paging occasion is related to the third specified value, and a sum of X4 subframes before a starting subframe of a wake-up signal and Y4 subframes after the starting subframe of the wake-up signal is related to the fourth specified value; however, in steps S701 to S703, a sum of X1 subframes before a subframe corresponding to a paging occasion and Y1 subframes after the subframe corresponding to the paging occasion is related to the quantity of paging occasions in the DRX period, and a sum of X2 subframes before a starting subframe of a wake-up signal and Y2 subframes after the starting subframe of the wake-up signal is related to the quantity of paging occasions in the DRX period. For other related descriptions, refer to steps S701 to S703. Details are not described herein again.

Optionally, in this embodiment of this application, the third specified value and/or the fourth specified value may be configured by the network device for the terminal device by using a system message or higher layer signaling, or may be predetermined in a protocol. This is not specifically limited in this embodiment of this application. For example, the system message may be a SIB or a MIB, and the higher layer signaling may be RRC signaling. This is not specifically limited in this embodiment of this application.

According to the reference signal sending and receiving method provided in this embodiment of this application, regardless of whether the network device sends a corresponding paging scheduling message at a paging occasion, the network device sends the reference signal on the time-frequency resource corresponding to the determined time domain resource in the first duration. Therefore, according to the reference signal sending and receiving method provided in this embodiment of this application, power consumption of the terminal device can be reduced when the terminal device detects whether a paging scheduling message exists in a PDCCH search space whose starting subframe is a subframe corresponding to a paging occasion, and/or detects whether a WUS exists before a paging occasion. For analysis of related technical effects, refer to the embodiment shown in FIG. 7. Details are not described herein again.

The actions of the network device in steps S1901 to S1903 may be performed by the network device instructed by the processor 601 in the network device 60 shown in FIG. 6 by invoking the application program code stored in the memory 602, and the actions of the terminal device in steps S1901 to S1903 may be performed by the network device instructed by the processor 701 in the terminal device 70 shown in FIG. 6 by invoking the application program code stored in the memory 702. This is not limited in this embodiment.

Figure 20:
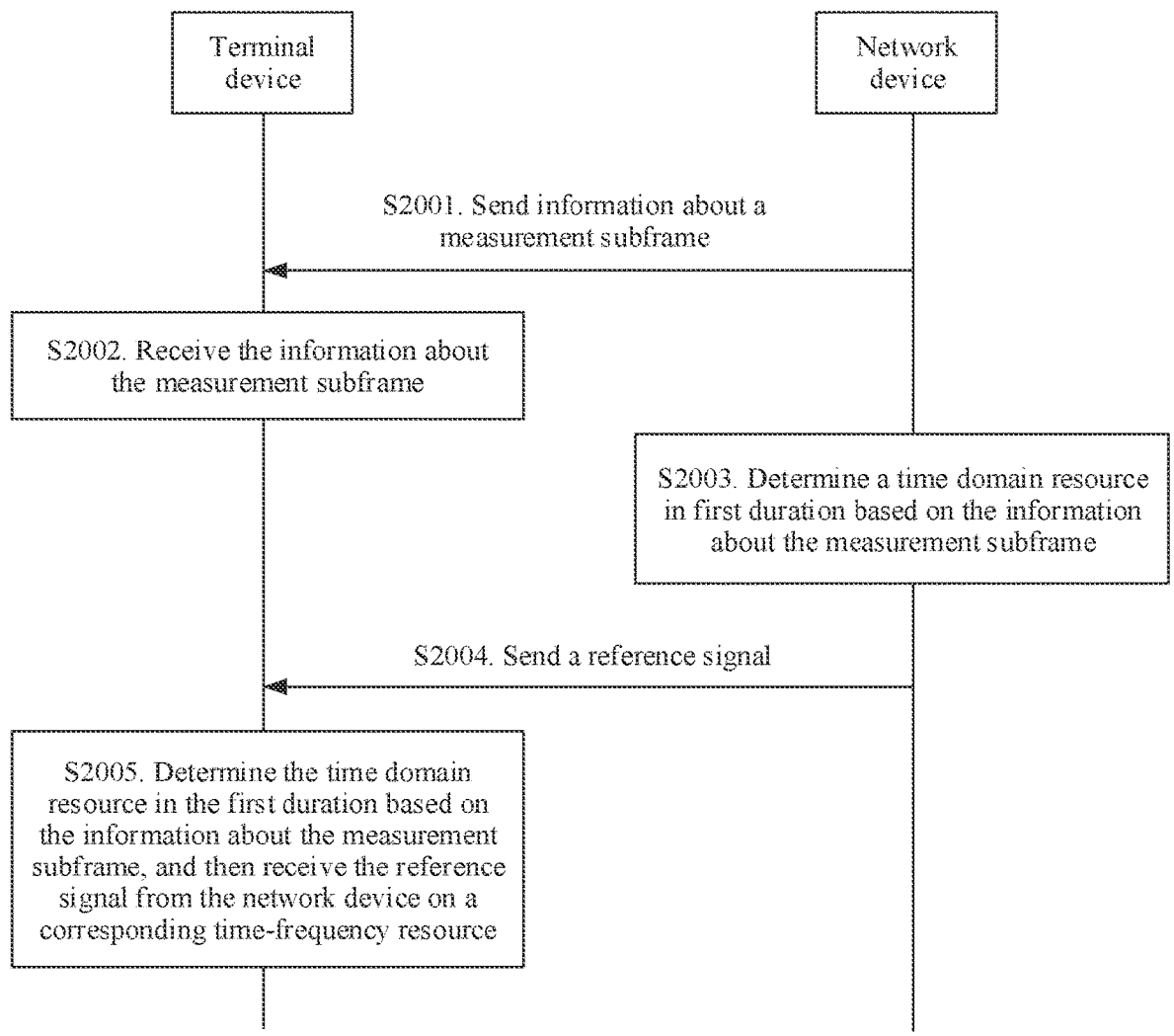
FIG. 20 is a schematic flowchart 3 of a reference signal sending and receiving method according to an embodiment of this application.

Optionally, FIG. 20 shows another reference signal sending and receiving method according to an embodiment of this application. The method includes the following steps.

S2001. A network device sends information about a measurement subframe to a terminal device.

S2002. The terminal device receives the information about the measurement subframe from the network device.

S2003. The network device determines a time domain resource in first duration based on the information about the measurement subframe, where the time domain resource is a time domain resource in a time-frequency resource used to transmit a reference signal.

S2004. The network device sends the reference signal to the terminal device on the time-frequency resource.

S2005. The terminal device determines the time domain resource in the first duration based on the information about the measurement subframe, and then receives the reference signal from the network device on the corresponding time-frequency resource.

For related descriptions of the reference signal, the first duration, and a frequency domain resource in the time-frequency resource in steps S2001 to S2005, refer to the related descriptions in the embodiment shown in FIG. 7. Details are not described herein again.

Optionally, the measurement subframe in steps S2001 to S2005 may be represented by an n-bit bitmap, where each bit in the n-bit bitmap is used to indicate whether the reference signal is transmitted in each of n subframes, and n is a positive integer.

For example, when a candidate value in a bit in the n-bit bitmap is 1, it indicates that a subframe corresponding to the bit is a measurement subframe, and the network device needs to send a reference signal in the subframe; and when a candidate value in a bit is 0, it indicates that a subframe corresponding to the bit is not a measurement subframe, and the network device does not need to send a reference signal in the subframe. Alternatively, when a candidate value in a bit in the n-bit bitmap is 0, it indicates that a subframe corresponding to the bit is a measurement subframe, and the network device needs to send a reference signal in the subframe; and when a candidate value in a bit is 1, it indicates that a subframe corresponding to the bit is not a measurement subframe, and the network device does not need to send a reference signal in the subframe. This is not specifically limited in this embodiment of this application.

Optionally, in this embodiment of this application, the network device may send a reference signal in an intersection set or a union set of a subframe represented by the n-bit bitmap and a valid subframe represented by a valid subframe bitmap. This is not specifically limited in this embodiment of this application.

Optionally, in this embodiment of this application, a period (period), an offset (offset), a quantity of repetitions, and the like may be further flexibly configured for the measurement subframe. This is not specifically limited in this embodiment of this application.

Optionally, in this embodiment of this application, a period of the bitmap may be a positive integer such as 1, 2, . . . , or K1. This is not specifically limited in this embodiment of this application.

Optionally, in this embodiment of this application, an offset of the bitmap may be K2 system frames or K3 subframes, where K2 is 0 or a positive integer, and K3 is 0 or a positive integer. The offset of the bitmap is less than or equal to a difference between the first duration and (a length of the bitmap×a quantity of repetitions of the bitmap). This is uniformly described herein, and details are not described below again.

Optionally, in this embodiment of this application, the quantity of repetitions of the bitmap may be a positive integer such as 1, 2, . . . , or K4. This is not specifically limited in this embodiment of this application.

Figure 21:
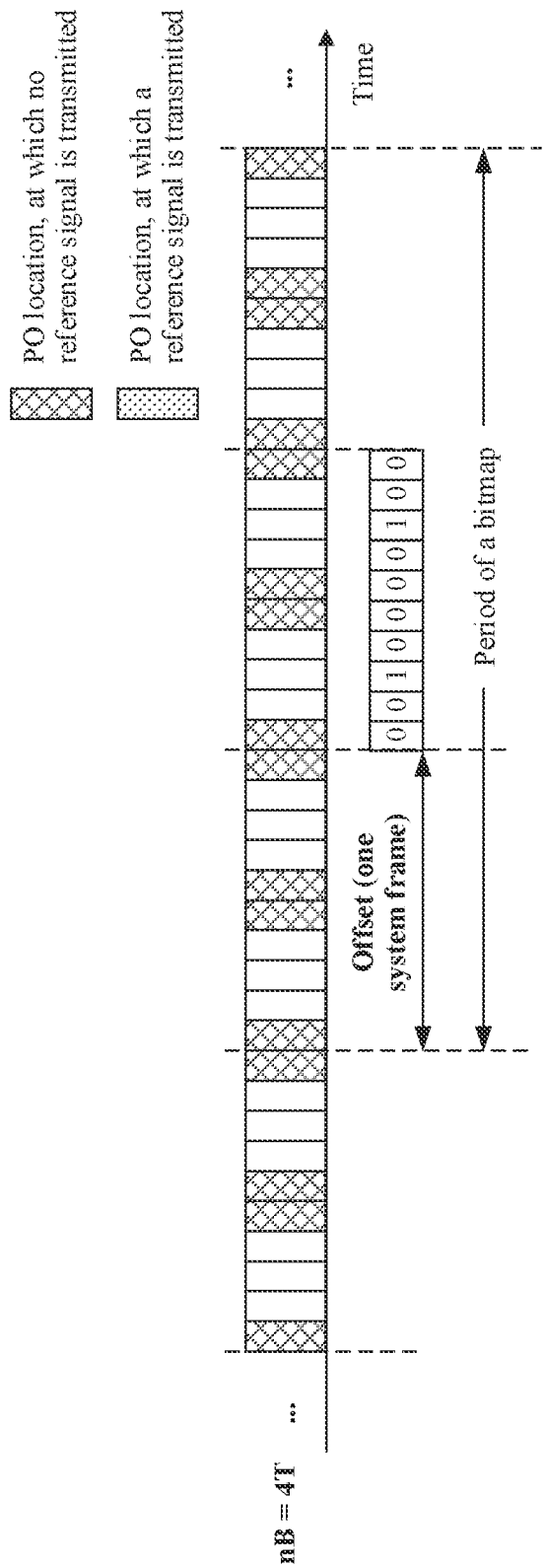
FIG. 21 is a schematic diagram 11 of a time domain resource corresponding to a reference signal according to an embodiment of this application.

For example, the first duration is four system frames; nB=4T, n=10; the period of the bitmap is three system frames; the offset of the bitmap is one system frame; the quantity of repetitions of the bitmap is 1; when a candidate value in a bit in the n-bit bitmap is 1, it indicates that a subframe corresponding to the bit is a measurement subframe, and the network device needs to send a reference signal in the subframe; and when a candidate value in a bit is 0, it indicates that a subframe corresponding to the bit is not a measurement subframe, and the network device does not need to send a reference signal in the subframe. In this case, the time domain resource in the first duration may include a subframe 2 and a subframe 7 in the $3^{rd}$ system frame, as shown in FIG. 21.

Optionally, in this embodiment of this application, when the period (period), the offset (offset), and the quantity of repetitions do not need to be configured for the measurement subframe, the information about the measurement subframe that is sent by the network device to the terminal device may include the n-bit bitmap; or when the period (period), the offset (offset), or the quantity of repetitions needs to be configured for the measurement subframe, the information about the measurement subframe that is sent by the network device to the terminal device may include the n-bit bitmap and at least one of the period of the bitmap, the offset of the bitmap, and the quantity of repetitions of the bitmap. This is uniformly described herein, and details are not described below again.

In other words, in this embodiment of this application, the period of the bitmap, the offset of the bitmap, and the quantity of repetitions of the bitmap may be configured by the network device for the terminal device, or may be agreed upon in a protocol. This is not specifically limited in this embodiment of this application.

Optionally, in this embodiment of this application, the information about the measurement subframe may be sent by the network device to the terminal device in a system message or higher layer signaling. For example, the system message may be a SIB or a MIB, and the higher layer signaling may be RRC signaling. This is not specifically limited in this embodiment of this application.

According to the reference signal sending and receiving method provided in this embodiment of this application, regardless of whether the network device sends a corresponding paging scheduling message at a paging occasion, the network device sends the reference signal on the time-frequency resource corresponding to the time domain resource in the first duration that is determined based on the information about the measurement subframe. Therefore, according to the reference signal sending and receiving method provided in this embodiment of this application, power consumption of the terminal device can be reduced when the terminal device detects whether a paging scheduling message exists in a PDCCH search space whose starting subframe is a subframe corresponding to a paging occasion, and/or detects whether a WUS exists before a paging occasion. For analysis of related technical effects, refer to the embodiment shown in FIG. 7. Details are not described herein again.

The actions of the network device in steps S2001 to S2005 may be performed by the network device instructed by the processor 601 in the network device 60 shown in FIG. 6 by invoking the application program code stored in the memory 602, and the actions of the terminal device in steps S2001 to S2005 may be performed by the terminal device instructed by the processor 701 in the terminal device 70 shown in FIG. 6 by invoking the application program code stored in the memory 702. This is not limited in this embodiment.

The foregoing mainly describes the solutions provided in the embodiments of this application from a perspective of interaction between the network elements. It may be understood that to implement the foregoing functions, the foregoing network device or terminal device includes corresponding hardware structures and/or software modules for implementing the functions. A person skilled in the art should be easily aware that, in combination with the examples of units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, division into function modules may be performed on the network device or the terminal device based on the foregoing method examples. For example, each function module may be obtained through division corresponding to each function, or two or more functions may be integrated into one processing module. The integrated module may be implemented in a form of hardware, or may be implemented in a form of a software function module. It should be noted that, in the embodiments of this application, division into the modules is an example and is merely logical function division. In an actual implementation, another division manner may be used.

Figure 22:
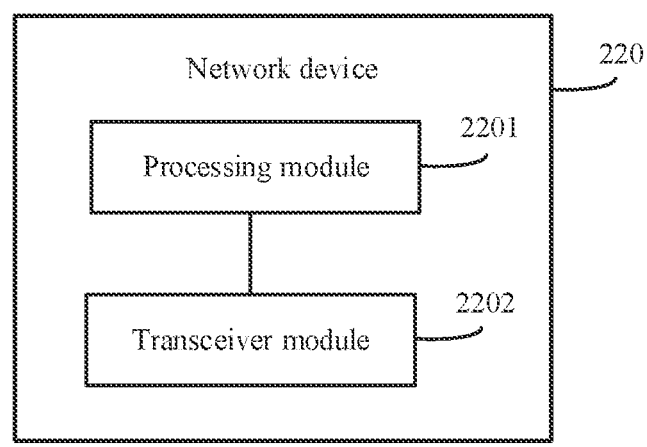
FIG. 22 is a schematic structural diagram of a network device according to an embodiment of this application.

For example, when the function modules are obtained through division in an integrated manner, FIG. 22 is a schematic structural diagram of a network device 220. The network device 220 includes a processing module 2201 and a transceiver module 2202.

In a possible implementation, the processing module 2201 is configured to determine a time domain resource in first duration based on a quantity of paging occasions in a discontinuous reception period, where the time domain resource is a time domain resource in a time-frequency resource used to transmit a reference signal. The transceiver module 2202 is configured to send the reference signal to a terminal device on the time-frequency resource.

Optionally, the time domain resource includes at least one of a first time domain resource and a second time domain resource. The first time domain resource includes at least one of a subframe corresponding to one or more paging occasions in the first duration, X1 subframes before a subframe corresponding to each of the one or more paging occasions, or Y subframes after the subframe corresponding to each of the one or more paging occasions, where X1 is an integer greater than or equal to 0, Y1 is an integer greater than or equal to 0, and a sum of X1 and Y1 is related to the quantity of paging occasions in the DRX period. In a specific implementation, the first time domain resource includes a subframe corresponding to one or more paging occasions in the first duration, X1 subframes before a subframe corresponding to each of the one or more paging occasions, and Y1 subframes after the subframe corresponding to each of the one or more paging occasions, where X1 is an integer greater than or equal to 0, Y1 is an integer greater than or equal to 0, and a sum of X and Y1 is related to the quantity of paging occasions in the discontinuous reception period. The second time domain resource includes at least one of a starting subframe of one or more wake-up signals in the first duration, X2 subframes before a starting subframe of each wake-up signal in the one or more wake-up signals, or Y2 subframes after the starting subframe of each wake-up signal in the one or more wake-up signals, where X2 is an integer greater than or equal to 0, Y2 is an integer greater than or equal to 0, and a sum of X2 and Y2 is related to the quantity of paging occasions in the DRX period. In a specific implementation method, the second time domain resource includes a starting subframe of one or more wake-up signals in the first duration, X2 subframes before a starting subframe of each of the one or more wake-up signals, and Y2 subframes after the starting subframe of each of the one or more wake-up signals, where X2 is an integer greater than or equal to 0, Y2 is an integer greater than or equal to 0, and a sum of X2 and Y2 is related to the quantity of paging occasions in the discontinuous reception period.

Optionally, the X1 subframes are X1 consecutive subframes that are before and consecutive to the subframe corresponding to each paging occasion, and the Y1 subframes are Y1 consecutive subframes that are after and consecutive to the subframe corresponding to each paging occasion. Alternatively, the X1 subframes are first X1 (consecutive) subframes in Z subframes before the subframe corresponding to each paging occasion, and the Y1 subframes are Y1 consecutive subframes that are after and consecutive to the subframe corresponding to each paging occasion.

Optionally, the transceiver module 2202 is further configured to send first configuration information of the reference signal to the terminal device. The first configuration information includes at least one of X1, Y1, a first period, the first duration, an offset of the first duration in the first period, and a quantity of repetitions of the first duration. The first period is a period related to the discontinuous reception period. The first duration is a period of time in the first period.

Optionally, the X2 subframes are X2 consecutive subframes that are before and consecutive to the starting subframe of each wake-up signal, and the Y2 subframes are Y2 consecutive subframes that are after and consecutive to the starting subframe of each wake-up signal. Alternatively, the X2 subframes are first X2 consecutive subframes in Z2 subframes before the starting subframe of each wake-up signal, and the Y2 subframes are Y2 consecutive subframes that are after and consecutive to the starting subframe of each wake-up signal.

Optionally, the transceiver module 2202 is further configured to send second configuration information of the reference signal to the terminal device. The second configuration information includes at least one of X2. Y2, a first period, the first duration, an offset of the first duration in the first period, or a quantity of repetitions of the first duration. The first period is a period related to the discontinuous reception period. The first duration is a period of time in the first period.

Optionally, the one or more paging occasions in the first duration include N1 paging occasions in every M1 paging occasions of all the paging occasions in the first duration, where M1 is an integer greater than or equal to 1, N1 is an integer greater than or equal to 1, and M1 is greater than or equal to N1.

Optionally, the N1 paging occasions are first N1 consecutive paging occasions in every M1 paging occasions; or the N1 paging occasions are last N1 consecutive paging occasions in every M1 paging occasions; or the N1 paging occasions are represented by an M1-bit bitmap, where each bit in the M-bit bitmap is used to indicate whether the reference signal is transmitted in a subframe corresponding to each of every M paging occasions.

Optionally, the transceiver module 2202 is further configured to send third configuration information of the reference signal to the terminal device. The third configuration information includes M1 and N1, or includes the M-bit bitmap.

Optionally, the one or more wake-up signals in the first duration include N2 wake-up signals in every M2 wake-up signals of all the wake-up signals in the first duration, where M2 is an integer greater than or equal to 1. N2 is an integer greater than or equal to 1, and M2 is greater than or equal to N2.

Optionally, the N2 wake-up signals are first N2 consecutive wake-up signals in every M2 wake-up signals; or the N2 wake-up signals are last N2 consecutive wake-up signals in every M2 wake-up signals; or the N2 wake-up signals are represented by an M2-bit bitmap, where each bit in the M2-bit bitmap is used to indicate whether the reference signal is transmitted in a starting subframe of each of every M2 wake-up signals.

Optionally, the transceiver module 2202 is further configured to send fourth configuration information of the reference signal to the terminal device. The fourth configuration information includes M2 and N2, or includes the M2-bit bitmap.

Optionally, that a sum of X1 and Y1 is related to the quantity of paging occasions in the discontinuous reception period includes: The sum of X1 and Y1 is a specified value corresponding to the quantity of paging occasions in the discontinuous reception period; or the sum of X1 and Y1 is determined by the network device based on the quantity of paging occasions in the discontinuous reception period, the discontinuous reception period, and a first specified value.

Optionally, X1 and Y1 satisfy the following formula: $X1+Y1=\min\{4T/nB, a\}-1$, where nB indicates the quantity of paging occasions in the discontinuous reception period, T indicates the discontinuous reception period, and a is the first specified value.

Optionally, that a sum of X2 and Y2 is related to the quantity of paging occasions in the discontinuous reception period includes: The sum of X2 and Y2 is a specified value corresponding to the quantity of paging occasions in the discontinuous reception period; or the sum of X2 and Y2 is determined by the network device based on the quantity of paging occasions in the discontinuous reception period, the discontinuous reception period, and a second specified value.

Optionally, X2 and Y2 satisfy the following formula: $X2+Y2=\min\{4T/nB, b\}-1$, where nB indicates the quantity of paging occasions in the discontinuous reception period, T indicates the discontinuous reception period, and b is the second specified value.

Optionally, the transceiver module 2202 is further configured to send first indication information to the terminal device. The first indication information is used to indicate that the network device supports determining the time domain resource in the first duration based on the quantity of paging occasions in the first duration.

Alternatively, optionally, the time domain resource includes at least one of a third time domain resource or a fourth time domain resource. For related descriptions of the third time domain resource or the fourth time domain resource, refer to the foregoing method embodiments. Details are not described herein again.

Optionally, X5 subframes are X5 consecutive subframes that are before and consecutive to a subframe corresponding to each paging occasion, and Y5 subframes are Y5 consecutive subframes that are after and consecutive to the subframe corresponding to each paging occasion. Alternatively, X5 subframes are first X5 consecutive subframes in Z3 subframes before a subframe corresponding to each paging occasion, and Y5 subframes are Y5 consecutive subframes that are after and consecutive to the subframe corresponding to each paging occasion.

Optionally, the transceiver module 2202 is further configured to send sixth configuration information of the reference signal to the terminal device. The sixth configuration information includes at least one of X5. Y5, a first period, the first duration, an offset of the first duration in the first period, or a quantity of repetitions of the first duration. The first period is a period related to the discontinuous reception period. The first duration is a period of time in the first period.

Optionally, X6 subframes are X6 consecutive subframes that are before and consecutive to a starting subframe of each wake-up signal, and Y6 subframes are Y6 consecutive subframes that are after and consecutive to the starting subframe of each wake-up signal. Alternatively, X6 subframes are first X6 consecutive subframes in Z4 subframes before a starting subframe of each wake-up signal, and Y6 subframes are Y6 consecutive subframes that are after and consecutive to the starting subframe of each wake-up signal.

Optionally, the transceiver module 2202 is further configured to send seventh configuration information of the reference signal to the terminal device. The seventh configuration information includes at least one of X6, Y6, a first period, the first duration, an offset of the first duration in the first period, or a quantity of repetitions of the first duration.

The first period is a period related to the discontinuous reception period. The first duration is a period of time in the first period.

Optionally, N3 paging occasions are first N3 consecutive paging occasions in every M3 paging occasions; or N3 paging occasions are last N3 consecutive paging occasions in every M3 paging occasions; or N3 paging occasions are represented by an M3-bit bitmap, where each bit in the M3-bit bitmap is used to indicate whether the reference signal is transmitted in a subframe corresponding to each of every M3 paging occasions.

Optionally, the transceiver module 2202 is further configured to send eighth configuration information of the reference signal to the terminal device. The eighth configuration information includes N3, or includes the M3-bit bitmap.

Optionally, N4 wake-up signals are first N4 consecutive wake-up signals in every M4 wake-up signals; or N4 wake-up signals are last N4 consecutive wake-up signals in every M4 wake-up signals; or N4 wake-up signals are represented by an M4-bit bitmap, where each bit in the M4-bit bitmap is used to indicate whether the reference signal is transmitted in a starting subframe of each of every M4 wake-up signals.

Optionally, the transceiver module 2202 is further configured to send ninth configuration information of the reference signal to the terminal device. The ninth configuration information includes N4, or includes the M4-bit bitmap.

Optionally, for related descriptions of values of M3 and M4, refer to the foregoing method embodiments. Details are not described herein again.

In another possible implementation, the transceiver module 2202 is configured to send information about a measurement subframe to a terminal device. The processing module 2201 is configured to determine a time domain resource in first duration based on the information about the measurement subframe, where the time domain resource is a time domain resource in a time-frequency resource used to transmit a reference signal. The transceiver module 2202 is further configured to send the reference signal to the terminal device on the time-frequency resource.

Optionally, the measurement subframe is represented by an n-bit bitmap, where each bit in the n-bit bitmap is used to indicate whether the reference signal is transmitted in each of n subframes, and n is a positive integer.

Optionally, the information about the measurement subframe may include the bitmap.

Optionally, the information about the measurement subframe may further include at least one of a period of the bitmap, an offset of the bitmap, and a quantity of repetitions of the bitmap.

In still another possible implementation, the processing module 2201 is configured to determine a time domain resource in first duration, where the time domain resource is a time domain resource in a time-frequency resource used to transmit a reference signal. The transceiver module 2202 is configured to send the reference signal to a terminal device on the time domain resource. The time domain resource includes at least one of a first time domain resource and a second time domain resource. The first time domain resource includes a subframe corresponding to one or more paging occasions in the first duration, X3 subframes before a subframe corresponding to each of the one or more paging occasions, and Y3 subframes after the subframe corresponding to each of the one or more paging occasions, where X3 is an integer greater than or equal to 0, Y3 is an integer greater than or equal to 0, and a sum of X3 and Y3 is related to a third specified value. The second time domain resource includes a starting subframe of one or more wake-up signals in the first duration, X3 subframes before a starting subframe of each wake-up signal in the one or more wake-up signals, and Y3 subframes after the starting subframe of each wake-up signal in the one or more wake-up signals, where X3 is an integer greater than or equal to 0, Y3 is an integer greater than or equal to 0, and a sum of X3 and Y3 is related to a fourth specified value.

All related content of the steps in the foregoing method embodiments may be cited in function descriptions of corresponding function modules. Details are not described herein again.

In this embodiment, the network device 220 is presented in a form of function modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the network device 220 may be in a form of the network device 60 shown in FIG. 6.

For example, the processor 601 in the network device 60 shown in FIG. 6 may invoke a computer-executable instruction stored in the memory 602, to enable the network device 220 to perform the steps performed by the network device in the reference signal sending and receiving methods in the foregoing method embodiments.

Specifically, functions/implementation processes of the processing module 2201 in FIG. 22 may be implemented by the processor 601 in the network device 60 shown in FIG. 6 by invoking the computer-executable instruction stored in the memory 602. Alternatively, functions/implementation processes of the transceiver module 2202 in FIG. 22 may be implemented by the transceiver 603 in the network device 60 shown in FIG. 6.

The network device provided in this embodiment may perform the steps performed by the network device in the reference signal sending and receiving methods in the foregoing method embodiments. Therefore, for technical effects that can be achieved by the network device, refer to the foregoing method embodiments. Details are not described herein again.

Optionally, an embodiment of this application further provides a chip system. The chip system includes a processor, configured to support a network device in implementing the steps performed by the network device in the reference signal sending and receiving methods in the foregoing method embodiments, for example, determining the time domain resource in the first duration based on the quantity of paging occasions in the discontinuous reception period. In a possible design, the chip system further includes a memory. The memory is configured to store a program instruction and data that are necessary for the network device. Certainly, the memory may alternatively not exist in the chip system. The chip system may include a chip, or may include a chip and another discrete device. This is not specifically limited in this embodiment of this application.

Figure 23:
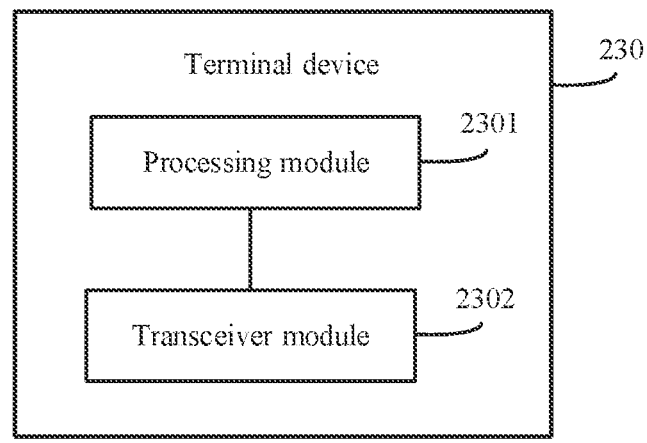
FIG. 23 is a schematic structural diagram of a terminal device according to an embodiment of this application.

For example, when the function modules are obtained through division in an integrated manner, FIG. 23 is a schematic structural diagram of a terminal device 230. The terminal device 230 includes a processing module 2301 and a transceiver module 2302.

In a possible implementation, the processing module 2301 is configured to determine a time domain resource in first duration based on a quantity of paging occasions in a discontinuous reception period, where the time domain resource is a time domain resource in a time-frequency resource used to transmit a reference signal. The transceiver module 2302 is configured to receive the reference signal from a network device on the time-frequency resource.

Optionally, the time domain resource includes at least one of a first time domain resource and a second time domain resource. For related descriptions of the first time domain resource or the second time domain resource, refer to the foregoing method embodiments. Details are not described herein again.

Optionally, X1 subframes are X1 consecutive subframes that are before and consecutive to a subframe corresponding to each paging occasion, and Y1 subframes are Y1 consecutive subframes that are after and consecutive to the subframe corresponding to each paging occasion. Alternatively, X1 subframes are first X1 (consecutive) subframes in Z1 subframes before a subframe corresponding to each paging occasion, and Y1 subframes are Y consecutive subframes that are after and consecutive to the subframe corresponding to each paging occasion.

Optionally, the transceiver module 2302 is further configured to receive first configuration information of the reference signal from the network device. The first configuration information includes at least one of X1, Y1, a first period, the first duration, an offset of the first duration in the first period, and a quantity of repetitions of the first duration. The first period is a period related to the discontinuous reception period. The first duration is a period of time in the first period.

Optionally, X2 subframes are X2 consecutive subframes that are before and consecutive to a starting subframe of each wake-up signal, and Y2 subframes are Y2 consecutive subframes that are after and consecutive to the starting subframe of each wake-up signal. Alternatively, X2 subframes are first X2 consecutive subframes in Z2 subframes before a starting subframe of each wake-up signal, and Y2 subframes are Y2 consecutive subframes that are after and consecutive to the starting subframe of each wake-up signal.

Optionally, the transceiver module 2302 is further configured to receive second configuration information of the reference signal from the network device. The second configuration information includes at least one of X2, Y2, a first period, the first duration, an offset of the first duration in the first period, or a quantity of repetitions of the first duration. The first period is a period related to the discontinuous reception period. The first duration is a period of time in the first period.

Optionally, one or more paging occasions in the first duration include N1 paging occasions in every M1 paging occasions of all the paging occasions in the first duration, where M1 is an integer greater than or equal to 1, N1 is an integer greater than or equal to 1, and M1 is greater than or equal to N1.

Optionally, the N1 paging occasions are first N consecutive paging occasions in every M1 paging occasions; or the N1 paging occasions are last N1 consecutive paging occasions in every M1 paging occasions; or the N1 paging occasions are represented by an M1-bit bitmap, where each bit in the M1-bit bitmap is used to indicate whether the reference signal is transmitted in a subframe corresponding to each of every M1 paging occasions.

Optionally, the transceiver module 2302 is further configured to receive third configuration information of the reference signal from the network device. The third configuration information includes M1 and N1, or includes the M1-bit bitmap.

Optionally, one or more wake-up signals in the first duration include N2 wake-up signals in every M2 wake-up signals of all the wake-up signals in the first duration, where M2 is an integer greater than or equal to 1. N2 is an integer greater than or equal to 1, and M2 is greater than or equal to N2.

Optionally, the N2 wake-up signals are first N2 consecutive wake-up signals in every M2 wake-up signals; or the N2 wake-up signals are last N2 consecutive wake-up signals in every M2 wake-up signals; or the N2 wake-up signals are represented by an M2-bit bitmap, where each bit in the M2-bit bitmap is used to indicate whether the reference signal is transmitted in a starting subframe of each of every M2 wake-up signals.

Optionally, the transceiver module 2302 is further configured to receive fourth configuration information of the reference signal from the network device. The fourth configuration information includes M2 and N2, or includes the M2-bit bitmap.

Optionally, that a sum of X1 and Y1 is related to the quantity of paging occasions in the discontinuous reception period includes: The sum of X1 and Y1 is a specified value corresponding to the quantity of paging occasions in the discontinuous reception period; or the sum of X1 and Y1 is determined by the terminal device based on the quantity of paging occasions in the discontinuous reception period, the discontinuous reception period, and a first specified value.

Optionally, X1 and Y1 satisfy the following formula $X1+Y1=\min\{4T/nB, a\}-1$, where nB indicates the quantity of paging occasions in the discontinuous reception period, T indicates the discontinuous reception period, and a is the first specified value.

Optionally, that a sum of X2 and Y2 is related to the quantity of paging occasions in the discontinuous reception period includes: The sum of X2 and Y2 is a specified value corresponding to the quantity of paging occasions in the discontinuous reception period; or the sum of X2 and Y2 is determined by the terminal device based on the quantity of paging occasions in the discontinuous reception period, the discontinuous reception period, and a second specified value.

Optionally, X2 and Y2 satisfy the following formula: $X2+Y2=\min\{4T/nB, b\}-1$, where nB indicates the quantity of paging occasions in the discontinuous reception period, T indicates the discontinuous reception period, and b is the second specified value.

Optionally, the transceiver module 2302 is further configured to receive first indication information from the network device. The first indication information is used to indicate that the terminal device supports determining the time domain resource in the first duration based on the quantity of paging occasions in the first duration.

In another possible implementation, the transceiver module 2302 is configured to receive information about a measurement subframe from a network device. The processing module 2301 is configured to determine a time domain resource in first duration based on the information about the measurement subframe, where the time domain resource is a time domain resource in a time-frequency resource used to transmit a reference signal. The transceiver module 2302 is further configured to receive the reference signal from the network device on the time-frequency resource.

Optionally, the measurement subframe is represented by an n-bit bitmap, where each bit in the n-bit bitmap is used to indicate whether the reference signal is transmitted in each of n subframes, and n is a positive integer.

Optionally, the information about the measurement subframe may include the bitmap.

Optionally, the information about the measurement subframe may further include at least one of a period of the bitmap, an offset of the bitmap, and a quantity of repetitions of the bitmap.

In still another possible implementation, the processing module 2301 is configured to determine a time domain resource in first duration, where the time domain resource is a time domain resource in a time-frequency resource used to transmit a reference signal. The transceiver module 2302 is configured to receive the reference signal from a network device on the time domain resource. The time domain resource includes at least one of a first time domain resource and a second time domain resource. The first time domain resource includes a subframe corresponding to one or more paging occasions in the first duration, X3 subframes before a subframe corresponding to each of the one or more paging occasions, and Y3 subframes after the subframe corresponding to each of the one or more paging occasions, where X3 is an integer greater than or equal to 0, Y3 is an integer greater than or equal to 0, and a sum of X3 and Y3 is related to a third specified value. The second time domain resource includes a starting subframe of one or more wake-up signals in the first duration, X3 subframes before a starting subframe of each wake-up signal in the one or more wake-up signals, and Y3 subframes after the starting subframe of each wake-up signal in the one or more wake-up signals, where X3 is an integer greater than or equal to 0, Y3 is an integer greater than or equal to 0, and a sum of X3 and Y3 is related to a fourth specified value.

Alternatively, optionally, the time domain resource includes at least one of a third time domain resource or a fourth time domain resource. For related descriptions of the third time domain resource or the fourth time domain resource, refer to the foregoing method embodiments. Details are not described herein again.

Optionally, X5 subframes are X5 consecutive subframes that are before and consecutive to a subframe corresponding to each paging occasion, and Y5 subframes are Y5 consecutive subframes that are after and consecutive to the subframe corresponding to each paging occasion. Alternatively, X5 subframes are first X5 consecutive subframes in Z3 subframes before a subframe corresponding to each paging occasion, and Y5 subframes are Y5 consecutive subframes that are after and consecutive to the subframe corresponding to each paging occasion.

Optionally, the transceiver module 2302 is further configured to receive sixth configuration information of the reference signal from the network device. The sixth configuration information includes at least one of X5, Y5, a first period, the first duration, an offset of the first duration in the first period, or a quantity of repetitions of the first duration. The first period is a period related to the discontinuous reception period. The first duration is a period of time in the first period.

Optionally, X6 subframes are X6 consecutive subframes that are before and consecutive to a starting subframe of each wake-up signal, and Y6 subframes are Y6 consecutive subframes that are after and consecutive to the starting subframe of each wake-up signal. Alternatively, X6 subframes are first X6 consecutive subframes in Z4 subframes before a starting subframe of each wake-up signal, and Y6 subframes are Y6 consecutive subframes that are after and consecutive to the starting subframe of each wake-up signal.

Optionally, the transceiver module 2302 is further configured to receive seventh configuration information of the reference signal from the network device. The seventh configuration information includes at least one of X6, Y6, a first period, the first duration, an offset of the first duration in the first period, or a quantity of repetitions of the first duration. The first period is a period related to the discontinuous reception period. The first duration is a period of time in the first period.

Optionally, N3 paging occasions are first N3 consecutive paging occasions in every M3 paging occasions, or N3 paging occasions are last N3 consecutive paging occasions in every M3 paging occasions; or N3 paging occasions are represented by an M3-bit bitmap, where each bit in the M3-bit bitmap is used to indicate whether the reference signal is transmitted in a subframe corresponding to each of every M3 paging occasions.

Optionally, the transceiver module is further configured to receive eighth configuration information of the reference signal from the network device. The eighth configuration information includes N3, or includes the M3-bit bitmap.

Optionally, N4 wake-up signals are first N4 consecutive wake-up signals in every M4 wake-up signals; or N4 wake-up signals are last N4 consecutive wake-up signals in every M4 wake-up signals; or N4 wake-up signals are represented by an M4-bit bitmap, where each bit in the M4-bit bitmap is used to indicate whether the reference signal is transmitted in a starting subframe of each of every M4 wake-up signals.

Optionally, the transceiver module 2302 is further configured to receive ninth configuration information of the reference signal from the network device. The ninth configuration information includes N4, or includes the M4-bit bitmap.

Optionally, for related descriptions of a value of M3 or M4, refer to the foregoing method embodiments. Details are not described herein again.

All related content of the steps in the foregoing method embodiments may be cited in function descriptions of corresponding function modules. Details are not described herein again.

In this embodiment, the terminal device 230 is presented in a form of function modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the terminal device 230 may be in a form of the terminal device 70 shown in FIG. 6.

For example, the processor 701 in the terminal device 70 shown in FIG. 6 may invoke a computer-executable instruction stored in the memory 702, to enable the terminal device 230 to perform the steps performed by the terminal device in the reference signal sending and receiving methods in the foregoing method embodiments.

Specifically, functions/implementation processes of the processing module 2301 in FIG. 23 may be implemented by the processor 701 in the terminal device 70 shown in FIG. 6 by invoking the computer-executable instruction stored in the memory 702. Alternatively, functions/implementation processes of the transceiver module 2302 in FIG. 23 may be implemented by the transceiver 703 in the terminal device 70 shown in FIG. 6.

The terminal device provided in this embodiment may perform the steps performed by the terminal device in the reference signal sending and receiving methods in the foregoing method embodiments. Therefore, for technical effects that can be achieved by the terminal device, refer to the foregoing method embodiments. Details are not described herein again.

Optionally, an embodiment of this application further provides a chip system. The chip system includes a processor, configured to support a terminal device in implementing the steps performed by the terminal device in the reference signal sending and receiving methods in the foregoing method embodiments, for example, determining the time domain resource in the first duration based on the quantity of paging occasions in the discontinuous reception period. In a possible design, the chip system further includes a memory. The memory is configured to store a program instruction and data that are necessary for the terminal device. Certainly, the memory may alternatively not exist in the chip system. The chip system may include a chip, or may include a chip and another discrete device. This is not specifically limited in this embodiment of this application.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and accompanying claims. In the claims, the term "comprising" (comprising) does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A reference signal sending method, wherein the sending method comprises:
   determining, by an apparatus of a network device, a time domain resource in first duration based on a quantity of paging occasions in a discontinuous reception period, wherein the time domain resource is used to transmit a reference signal, and the first duration is a period of time in a first period associated with the discontinuous reception period; and
   sending, by the apparatus, the reference signal to a terminal device on a time-frequency resource corresponding to the time domain resource in the first duration.

2. The sending method according to claim 1, wherein the time domain resource includes at least one of a first time domain resource or a second time domain resource, and
   wherein the first time domain resource includes P1 subframes before each paging occasion of one or more paging occasions in the first duration, wherein P1 is a positive integer, and wherein P1 relates to a number of paging occasions in the discontinuous reception period;
   wherein the second time domain resource includes P2 subframes before a starting subframe of each wake-up signaling of one or more wakeup signaling in the first duration, and Q2 subframes after the starting subframe of the each wake-up signaling, wherein P2 is an integer which is equal to or larger than 0, wherein Q2 is an integer which is equal to or larger than 0, and wherein a sum of P2 and Q2 relates to the number of paging occasions in the discontinuous reception period.

3. The sending method according to claim 2, wherein the one or more paging occasions in the first duration comprise N1 paging occasions in every M1 paging occasions of all paging occasions in the first duration, wherein M1 is an integer greater than or equal to 1, wherein N1 is an integer greater than or equal to 1, and wherein M1 is greater than or equal to N1.

4. The sending method according to claim 2, wherein P1 is a specified value corresponding to the number of paging occasions in the discontinuous reception period.

5. The sending method according to claim 4, wherein the discontinuous reception period is T, and wherein:
   the number of paging occasions in the discontinuous reception period is equal to 4T, wherein P1 is equal to 1; or
   the number of paging occasions in the discontinuous reception period is equal to 2T, wherein P1 is equal to 2.

6. The sending method according to claim 1, wherein the time domain resource comprises at least one of a third time domain resource or a fourth time domain resource;
   wherein the third time domain resource comprises at least one of:
   subframes corresponding to N3 paging occasions in every M3 paging occasions of all paging occasions in the first duration,
   X5 subframes before a subframe corresponding to each of the N3 paging occasions in every M3 paging occasions, or Y5 subframes after the subframe corresponding to each of the N3 paging occasions in every M3 paging occasions,
wherein M3 is an integer greater than or equal to 1,
wherein N3 is an integer greater than or equal to 1,
wherein M3 is greater than or equal to N3, wherein X5 is an integer greater than or equal to 0, wherein Y5 is an integer greater than or equal to 0, and wherein M3 is related to the quantity of paging occasions in the discontinuous reception period; and
wherein the fourth time domain resource comprises at least one of:
starting subframes of N4 wake-up signals in every M4 wake-up signals of all wake-up signals in the first duration,
X6 subframes before a starting subframe of each of the N4 wake-up signals in every M4 wake-up signals, or
Y6 subframes after the starting subframe of each of the N4 wake-up signals in every M4 wake-up signals,
wherein M4 is an integer greater than or equal to 1, wherein N4 is an integer greater than or equal to 1, wherein M4 is greater than or equal to N4, wherein X6 is an integer greater than or equal to 0, wherein Y6 is an integer greater than or equal to 0, and wherein M4 is related to the quantity of paging occasions in the discontinuous reception period.

7. The sending method according to claim 6, wherein that M3 is related to the quantity of paging occasions in the discontinuous reception period comprises:
M3 is a specified value corresponding to the quantity of paging occasions in the discontinuous reception period; or
M3 is determined by the apparatus based on the quantity of paging occasions in the discontinuous reception period, the discontinuous reception period, and a fifth specified value.

8. The sending method according to claim 7, wherein the discontinuous reception period is T, and wherein:
a number of paging occasions in the discontinuous reception period is equal to T/2, wherein M3 is equal to 2; or
the number of paging occasions in the discontinuous reception period is equal to T/4, wherein M3 is equal to 1.

9. A reference signal receiving method, wherein the receiving method comprises:
determining, by an apparatus of a terminal device, a time domain resource in first duration based on a quantity of paging occasions in a discontinuous reception period, wherein the time domain resource is used to transmit a reference signal, and the first duration is a period of time in a first period associated with the discontinuous reception period; and
receiving, by the apparatus, the reference signal from a network device on a time-frequency resource corresponding to the time domain resource in the first duration.

10. The receiving method according to claim 9, wherein the time domain resource includes at least one of a first time domain resource or a second time domain resource, and
wherein the first time domain resource includes P1 subframes before each paging occasion of one or more paging occasions in the first duration, wherein P1 is a positive integer, and wherein P1 relates to a number of paging occasions in the discontinuous reception period;
wherein the second time domain resource includes P2 subframes before a starting subframe of each wake-up signaling of one or more wakeup signaling in the first duration, and Q2 subframes after the starting subframe of the each wake-up signaling, wherein P2 is an integer which is equal to or larger than 0, wherein Q2 is an integer which is equal to or larger than 0, and wherein a sum of P2 and Q2 relates to the number of paging occasions in the discontinuous reception period.

11. The receiving method according to claim 10, wherein the one or more paging occasions in the first duration comprise N1 paging occasions in every M1 paging occasions of all paging occasions in the first duration, wherein M1 is an integer greater than or equal to 1, wherein N1 is an integer greater than or equal to 1, and wherein M1 is greater than or equal to N1.

12. The receiving method according to claim 10, wherein P1 is a specified value corresponding to the number of paging occasions in the discontinuous reception period.

13. The receiving method according to claim 12, wherein the discontinuous reception period is T, and wherein:
the number of paging occasions in the discontinuous reception period is equal to 4T, wherein P1 is equal to 1; or
the number of paging occasions in the discontinuous reception period is equal to 2T, wherein P1 is equal to 2.

14. The receiving method according to claim 9, wherein the time domain resource comprises at least one of a third time domain resource or a fourth time domain resource;
wherein the third time domain resource comprises at least one of:
subframes corresponding to N3 paging occasions in every M3 paging occasions of all paging occasions in the first duration,
X5 subframes before a subframe corresponding to each of the N3 paging occasions in every M3 paging occasions, or
Y5 subframes after the subframe corresponding to each of the N3 paging occasions in every M3 paging occasions,
wherein M3 is an integer greater than or equal to 1, wherein N3 is an integer greater than or equal to 1, wherein M3 is greater than or equal to N3, wherein X5 is an integer greater than or equal to 0, wherein Y5 is an integer greater than or equal to 0, and wherein M3 is related to the quantity of paging occasions in the discontinuous reception period; and
wherein the fourth time domain resource comprises at least one of:
starting subframes of N4 wake-up signals in every M4 wake-up signals of all wake-up signals in the first duration,
X6 subframes before a starting subframe of each of the N4 wake-up signals in every M4 wake-up signals, or
Y6 subframes after the starting subframe of each of the N4 wake-up signals in every M4 wake-up signals,
wherein M4 is an integer greater than or equal to 1, wherein N4 is an integer greater than or equal to 1, wherein M4 is greater than or equal to N4, wherein X6 is an integer greater than or equal to 0, wherein Y6 is an integer greater than or equal to 0, and wherein M4 is related to the quantity of paging occasions in the discontinuous reception period.

15. The receiving method according to claim 14, wherein that M3 is related to the quantity of paging occasions in the discontinuous reception period comprises:
M3 is a specified value corresponding to the quantity of paging occasions in the discontinuous reception period; or M3 is determined by the network device based on the quantity of paging occasions in the discontinuous reception period, the discontinuous reception period, and a fifth specified value.

16. The receiving method according to claim 15, wherein the discontinuous reception period is T, and wherein a number of paging occasions in the discontinuous reception period is equal to T/2, wherein M3 is equal to 2; or the number of paging occasions in the discontinuous reception period is equal to T/4, wherein M3 is equal to 1.

17. An apparatus of a network device, wherein the apparatus comprises:

at least one processor;

one or more memories coupled to the at least one processor and storing programming instructions for execution by the at least one processor to:

determine a time domain resource in first duration based on a quantity of paging occasions in a discontinuous reception period, wherein the time domain resource is used to transmit a reference signal, and the first duration is a period of time in a first period associated with the discontinuous reception period; and a transceiver, the transceiver configured to send the reference signal to a terminal device on a time-frequency resource corresponding to the time domain resource in the first duration.

18. The apparatus according to claim 17, wherein the transceiver is further configured to send first indication information to the terminal device, wherein the first indication information is used to indicate that the network device supports determining the time domain resource in the first duration based on the quantity of paging occasions in the first duration.

19. An apparatus of a terminal device, wherein the apparatus comprises:

at least one processor;

one or more memories coupled to the at least one processor and storing programming instructions for execution by the at least one processor to:

determine a time domain resource in first duration based on a quantity of paging occasions in a discontinuous reception period, wherein the time domain resource is used to transmit a reference signal, and the first duration is a period of time in a first period associated with the discontinuous reception period; and a transceiver, the transceiver configured to receive the reference signal from a network device on a time-frequency resource corresponding to the time domain resource in the first duration.

20. The apparatus according to claim 19, wherein the transceiver is further configured to receive first indication information from the network device, wherein the first indication information is used to indicate that the network device supports determining the time domain resource in the first duration based on the quantity of paging occasions in the first duration.

* * * * *

UNITED STATES PATENT AND TRADEMARK OFFICE
CERTIFICATE OF CORRECTION

PATENT NO. : 12,349,062 B2  
APPLICATION NO. : 17/186790  
DATED : July 1, 2025  
INVENTOR(S) : Yuwan Su et al.

Page 1 of 1

It is certified that error appears in the above-identified patent and that said Letters Patent is hereby corrected as shown below:

On the Title Page

In Column 1 Item (30) (Foreign Application Priority Data), In Line 1, Delete "(WO)" and insert -- (CN) --.

In the Claims

In Column 69-70, In Line 29-30 (Column 69) 1-5 (Column 70), In Claim 18, delete "the transceiver is further configured to send first indication information to the terminal device, wherein the first indication information is used to indicate that the network device supports determining the time domain resource in the first duration based on the quantity of paging occasions in the first duration." and insert the same on Column 69, Line 30, as a new subpoint.

In Column 70, In Line 23-29, In Claim 20, delete "the transceiver is further configured to receive first indication information from the network device, wherein the first indication information is used to indicate that the network device supports determining the time domain resource in the first duration based on the quantity of paging occasions in the first duration." and insert the same on Column 70, Line 24, as a new subpoint.

Signed and Sealed this  
Twenty-third Day of December, 2025

John A. Squires  
*Director of the United States Patent and Trademark Office*